(12) United States Patent
Dimpfl

(10) Patent No.: US 9,963,251 B2
(45) Date of Patent: May 8, 2018

(54) SYSTEMS AND METHODS FOR ESTIMATING PARAMETERS OF A SPACECRAFT BASED ON EMISSION FROM AN ATOMIC OR MOLECULAR PRODUCT OF A PLUME FROM THE SPACECRAFT

(71) Applicant: THE AEROSPACE CORPORATION, El Segundo, CA (US)

(72) Inventor: William L. Dimpfl, San Pedro, CA (US)

(73) Assignee: The Aerospace Corporation, El Segundo, CA (US)

(*) Notice: Subject to any disclaimer, the term of this patent is extended or adjusted under 35 U.S.C. 154(b) by 378 days.

(21) Appl. No.: 14/723,193

(22) Filed: May 27, 2015

(65) Prior Publication Data
US 2016/0347482 A1 Dec. 1, 2016

(51) Int. Cl.
| | | |
|---|---|---|
| *G06K 9/62* | (2006.01) | |
| *B64G 3/00* | (2006.01) | |
| *B64G 1/66* | (2006.01) | |
| *B64G 1/14* | (2006.01) | |

(52) U.S. Cl.
CPC ............ *B64G 3/00* (2013.01); *B64G 1/66* (2013.01); *B64G 1/14* (2013.01)

(58) Field of Classification Search
CPC ............ B64G 3/00; B64G 1/66; B64G 1/14
See application file for complete search history.

(56) References Cited

U.S. PATENT DOCUMENTS

| | | | | |
|---|---|---|---|---|
| 5,719,396 | A * | 2/1998 | Jack ................. | G01N 21/3504 250/338.5 |
| 9,664,596 | B2 * | 5/2017 | Connolly ............ | G01M 15/108 |
| 2003/0130774 | A1 * | 7/2003 | Tripathi ................ | G07C 5/008 701/31.4 |
| 2007/0039318 | A1 * | 2/2007 | Krajewski ............ | F01N 13/082 60/317 |

(Continued)

OTHER PUBLICATIONS

Becker et al., "A Study of the Chemiluminescence from Oxygen Atom-Hydrazine Flames," J. Phys. Chem. 71(2): 371-377 (1967).

(Continued)

*Primary Examiner* — Sean Motsinger
(74) *Attorney, Agent, or Firm* — Jones Day; Jaime D. Choi

(57) ABSTRACT

A parameter of an actual spacecraft can be estimated based on a spectroscopic image of an emission from an atomic or molecular product of an interaction between an atmospheric gas and an atomic or molecular species in a plume from the actual spacecraft. The actual spacecraft can be characterized by a set of values of at least N parameters. An N-dimensional lookup table can store information about a plurality of simulated emissions, each being from the atomic or molecular product of a simulated interaction between the atmospheric gas and the atomic or molecular species in a plume from a simulated spacecraft characterized by a corresponding set of values of the N parameters. A simulated emission can be selected based on comparisons between the information about the simulated emissions and the spectroscopic image. A value of at least one of the N parameters of the actual spacecraft can be estimated based on the selected simulated emission.

22 Claims, 24 Drawing Sheets
(4 of 24 Drawing Sheet(s) Filed in Color)

(56) References Cited

U.S. PATENT DOCUMENTS

| | | | | |
|---|---|---|---|---|
| 2007/0288213 | A1* | 12/2007 | Schantl | G05B 17/02 703/8 |
| 2009/0076669 | A1* | 3/2009 | Krishnaswamy | B64G 1/38 701/4 |
| 2011/0049384 | A1* | 3/2011 | Yared | A61B 5/0073 250/458.1 |
| 2011/0197567 | A1* | 8/2011 | Mastbergen | F01N 3/0231 60/276 |
| 2013/0251611 | A1* | 9/2013 | Wen | B01D 53/9413 423/213.5 |
| 2014/0020398 | A1* | 1/2014 | Mittricker | F02C 3/34 60/772 |
| 2014/0112849 | A1* | 4/2014 | Wen | B01J 23/10 423/210 |
| 2014/0126794 | A1* | 5/2014 | Ahn | G06T 11/008 382/131 |
| 2014/0207339 | A1* | 7/2014 | Backhouse | B60R 21/0134 701/45 |
| 2015/0117733 | A1* | 4/2015 | Manjeshwar | G06T 11/003 382/131 |
| 2015/0199302 | A1* | 7/2015 | Qi | G06T 11/006 703/2 |
| 2015/0241307 | A1* | 8/2015 | Connolly | G01M 15/108 702/24 |
| 2015/0352963 | A1* | 12/2015 | Grabar | H02J 50/90 320/108 |
| 2016/0347482 | A1* | 12/2016 | Dimpfl | B64G 3/00 |
| 2017/0076514 | A1* | 3/2017 | Valeri | G05B 23/00 |
| 2017/0161410 | A1* | 6/2017 | Mizuta | G06F 17/5009 |

OTHER PUBLICATIONS

Bernstein et al., "Far-Field Spectral Analysis of a Space Shuttle Vernier Reaction Control System Firing," J. Spacecr. Rockets 43(6): 1370-1376 (2006).

Caledonia et al., "A High Flux Source of Energetic Oxygen Atoms for Material Degradation Studies," IAAA Journal 25: 59-63 (1987).

Cline, Jason A., "Influence of the Internal Energy Model on DSMC Flow Results for Rarefied Spacecraft Plumes," 27th International Symposium on Rarefied Gas Dynamics. AIP Conference Proceedings, vol. 1333, pp. 1215-1220 (2011).

Dimpfl et al., "Molecular Dynamics from Remote Obstervation of CO(a) from Space Shuttle Plumes," J. Spacecr. Rockets 42(2): 352-362 (2005).

Elgin et al., "The Theory Behind the SOCRATES Code," Tech. Rep. PL-TR-92-2207, Geophysics Directorate, Phillips Laboratory, Hanscom Air Force Base, Massachusetts, 87 pages (1992).

Hedin, A.E., "Extension of the MSIS Thermosphere Model into the Middle and Lower Atmosphere," J. Geo. Res. 96 (A2): 1159-1172 (1991).

Melius et al., "Energetics of the Reaction Pathways for NH2 + NO→Products," Proceedings of the 20th Symposium (International) on Combustion, p. 275, The Combustion Institute (1984).

Murad et al., "Visible light emission excited by interaction of space shuttle exhaust with the atmosphere," Geophys. Res. Lett. 17(12): 2205-2208 (1990).

Orient et al., "Observation of CN A =Xand B =Xemissions in gas-phase collisions of fast 0( P) atoms with HCN," Phys. Rev. A 48(1): 427-431 (1993).

Setayesh et al., "SOCRATES simulation of the emission at wavelength 6300 Å generated by the interaction between the atmosphere and the space shuttle exhaust," Tech. Rep. PL-TR-93-2186, Geophysics Directorate, Phillips Laboratory, Hanscom Air Force Base, Massachusetts, 45 pages (1993).

Someda et al., "Rotational Distribution of NH(A3II,c1II) Produced from NH3 in Collision with Helium Metastable Atoms," J. Phys. Chem. 92:368-374 (1988).

Viereck et al., "The interaction of the atmosphere with the space shuttle thruster plume: The NH(A-X) 336-nm emission," J. Geo. Res. 101(A3): 5371-5380 (1996).

Viereck et al., "Visible Spectra of Thruster Plumes from the Space Shuttle Primary Reaction Control System," J. Spacecraft Rockets 30(6): 724-730 (1993).

Broadfoot et al., "Spectrographic observation at wavelengths near 630 nm of the interaction between the atmosphere and the space-shuttle exhaust," J. Geophysical Res.—Space Physics 97(A12): 19501-19508 (1992).

* cited by examiner

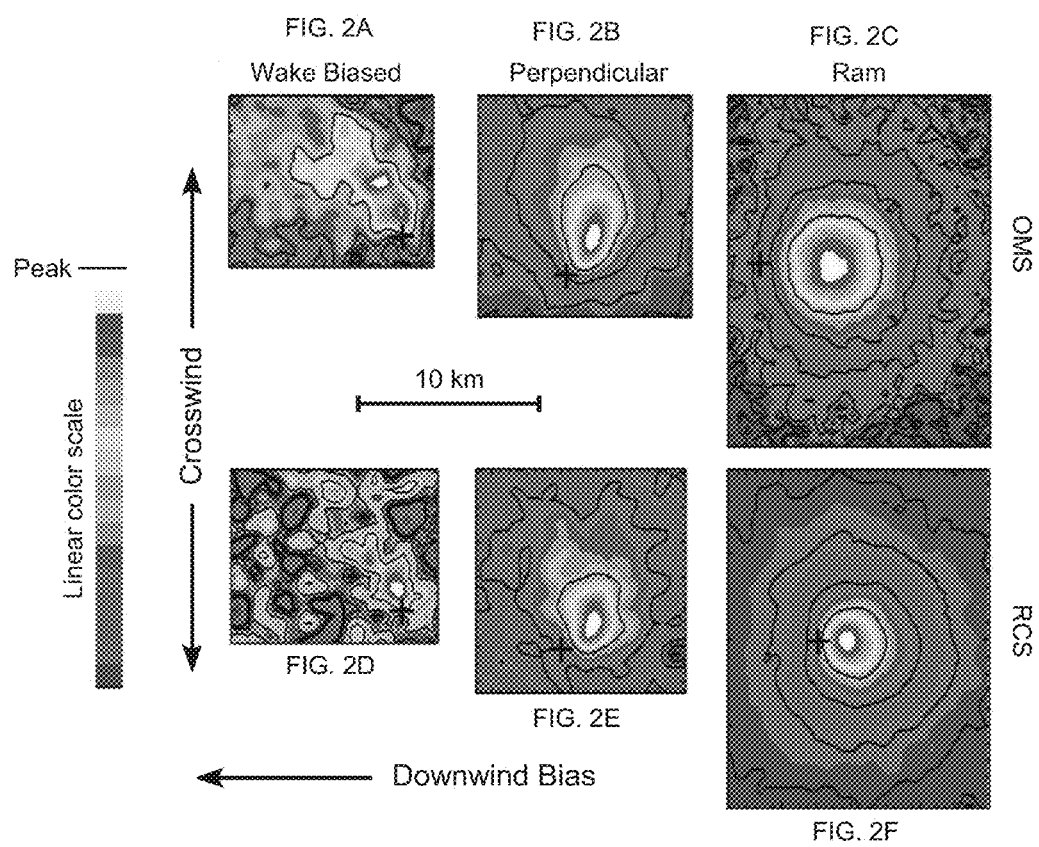

SYSTEMS AND METHODS FOR ESTIMATING PARAMETERS OF A SPACECRAFT BASED ON EMISSION FROM AN ATOMIC OR MOLECULAR PRODUCT OF A PLUME FROM THE SPACECRAFT

STATEMENT OF GOVERNMENT INTEREST

This invention was made with government support under Contract no. FA8802-09-C-0001. The government has certain rights in the invention.

FIELD

This application relates to spectroscopic analysis of plumes from spacecraft.

BACKGROUND

A variety of emissions from molecular products of plumes from the space shuttle have been identified and characterized. For example, a near ultraviolet (UV) emission band at approximately 336 nm from a plume of the space shuttle primary reaction control system (PRCS) and vernier reaction control system (VRCS) has been assigned to an electronic transition NH(A→X) of nitrogen monohydride (which also may be referred as imidogen), resulting from interaction between atmospheric atomic oxygen and an atomic or molecular species in the plume. For further details, see Viereck et al., "The interaction of the atmosphere with the space shuttle thruster plume: The NH(A-X) 336-nm emission," Journal of Geophysical Research 101(A3): 5371-5380 (1996). In addition to the NH(A→X) emission at approximately 336 nm, a near UV emission band at approximately 310 nm resulting from interaction between atmospheric gas and an atomic or molecular species in the plume has been assigned to an electronic transition OH(A→X) of the hydroxyl radical. For further details, see Bernstein et al., "Far-field spectral analysis of a Space Shuttle vernier reaction control system firing," Journal of Spacecraft and Rockets 43(6): 1370-1376 (2006), the entire contents of which are incorporated by reference herein. Additionally, emission from the Cameron bands from $CO(a\ ^3\Pi_r)$ radiating to the ground state has been observed resulting from interaction between atmospheric gas and a space shuttle plume. For further details, see Dimpfl et al., "Molecular dynamics from remote observation of CO(a) from space shuttle plumes," Journal of Spacecraft and Rockets 42(2): 352-362 (2005), the entire contents of which are incorporated by reference herein.

A computational tool referred to as SOCRATES (Spacecraft/Orbiter Contamination Representation Accounting for Transiently Emitted Species) has been developed for use in simulating spacecraft plumes and interactions of molecular species therein with atmospheric gases, and is based upon direct simulation Monte Carlo (DSMC) modeling. Presently, the use of SOCRATES is only available upon registration with the Defense Logistic Information Service (DLIS), certification to receive export-controlled Department of Defense (DoD) technical data, and a request to the Air Force Research Laboratory (AFRL). For a discussion of the theory behind the SOCRATES code, see Elgin et al., "The Theory Behind the SOCRATES Code," Tech. Rep. PL-TR-92-2207, Geophysics Directorate, Phillips Laboratory, Hanscom Air Force Base, Mass. (1992), the entire contents of which are incorporated by reference herein. For a discussion of the exemplary use of SOCRATES to simulate an emission at 630 nm attributed to a transition between the $O(^1D)$ excited state and the $O(^3P)$ ground state resulting from collision of atmospheric oxygen with the exhaust of a space shuttle, see Setayesh et al., "SOCRATES simulation of the emission at wavelength 6300 Å generated by the interaction between the atmosphere and the space shuttle exhaust," Tech. Rep. PL-TR-93-2186, Geophysics Directorate, Phillips Laboratory, Hanscom Air Force Base, Mass. (1993), the entire contents of which are incorporated by reference herein. Certain other references mentioned herein may describe the use of SOCRATES to simulate spacecraft plumes and interactions thereof with the atmosphere.

SUMMARY

Systems and methods for estimating parameters of a spacecraft based on emission from an atomic or molecular product of a plume of the spacecraft are provided.

Under one aspect, a computer-implemented method is provided for estimating a parameter of an actual spacecraft based on a spectroscopic image of an emission from an atomic or molecular product of an interaction between an atmospheric gas and an atomic or molecular species in a plume from the actual spacecraft. The actual spacecraft in its environment can be characterized by a set of values of at least N parameters. The method can include obtaining an N-dimensional lookup table stored in a non-transitory computer-readable medium. The lookup table can store information about a plurality of different simulated emissions. Each simulated emission can be from the atomic or molecular product of a simulated interaction between the atmospheric gas and the atomic or molecular species in a plume from a simulated spacecraft characterized by a corresponding set of values of the N parameters. The method further can include selecting a simulated emission based on comparisons between the information about a plurality of the simulated emissions and the spectroscopic image. The method further can include estimating a value of at least one of the N parameters of the actual spacecraft based on the selected simulated emission.

In some embodiments, the N parameters are selected from the group consisting of: view angle, range, spacecraft mass, engine thrust, engine lip angle, remaining propellant, angle of attack, atmospheric relative speed, plume velocity, atmospheric composition adjacent to the spacecraft, atmospheric density adjacent to the spacecraft, ambient temperature, and amount of the atomic or molecular species in the plume.

The estimating can include interpolating the value of at least one of the N parameters of the actual spacecraft based on the information about the simulated emission and the spectroscopic image.

The information about the plurality of simulated emissions can include a simulated image corresponding to each of the simulated emissions.

In some embodiments, the spectroscopic image and the simulated image each are two-dimensional. The method can include selecting the simulated emission having a simulated image that most closely matches the spectroscopic image.

In some embodiments, the simulated image includes a simulated three-dimensional radiant field. The spectroscopic image can include a spectroscopic three-dimensional radiant field. The method further can include constructing the spectroscopic three-dimensional radiant field based on a pair of stereo spectroscopic images of the emission, and selecting the simulated emission having a simulated three-dimensional radiant field that most closely matches the spectroscopic three-dimensional radiant field. In other embodiments, the spectroscopic image is two-dimensional. The method can include generating a plurality of two-dimensional simulated images at different view angles, and selecting the simulated emission having a two-dimensional simulated image that most closely matches the spectroscopic image.

Some embodiments further include selecting the simulated emission based on an a priori known value of at least one of the N parameters of the actual spacecraft.

The emission can include a wavelength of approximately 336 nm. For example, the atomic or molecular product can be nitrogen monohydride.

Alternatively, the emission can include plume CO vibrational infrared emission excited by collisions with atmospheric atomic oxygen, or can include CO(a→X) Cameron band ultraviolet emission resulting from a two-step interaction of plume methane with atmospheric atomic oxygen, or can include plume $H_2O$ vibrational bend mode infrared emission excited by collisions with the atmospheric gas, or can include plume $H_2O$ asymmetric stretch mode infrared emission excited by collisions with the atmospheric gas.

Under another aspect, a system is provided for estimating a parameter of a spacecraft based on a spectroscopic image of an emission from an atomic or molecular product of an interaction between an atmospheric gas and an atomic or molecular species in a plume from the actual spacecraft. The actual spacecraft can be characterized by a set of values of at least N parameters. The system can include a non-transitory computer-readable memory storing an N-dimensional lookup table storing information about a plurality of simulated emissions. Each simulated emission can be from the atomic or molecular product of the interaction between the atmospheric gas and the atomic or molecular species in a plume from a simulated spacecraft characterized by a corresponding set of values of the N parameters. The system further can include a processor coupled to the non-transitory computer-readable memory and configured to select a simulated emission based on comparisons between the information about a plurality of the simulated emissions and the spectroscopic image, and to estimate a value of at least one of the N parameters of the actual spacecraft based on the selected simulated emission.

Under yet another aspect, a computer-implemented method of generating a lookup table is provided. The method can include (a) obtaining ranges of values and step sizes for each of N parameters characterizing a simulated spacecraft, and (b) selecting a set of values for the N parameters within the respective ranges. The method further can include (c) simulating a plume from a simulated spacecraft characterized by the set of values; (d) simulating an interaction between an atmospheric gas and the plume; (e) simulating an emission from an atomic or molecular product of the interaction; and (f) storing information about the simulated emission and the selected set of parameters in an N-dimensional lookup table stored in a non-transitory computer-readable medium. The method further can include (g) selecting additional sets of values for the N parameters by iteratively incrementing values of the parameters by the respective step sizes through the respective ranges, and (h) repeating steps (c)-(f) for each additional set of values selected in step (g).

Under still another aspect, an N-dimensional lookup table stored in a non-transitory computer readable medium is provided. The N-dimensional lookup table stores information about a plurality of simulated emissions. Each simulated emission is from the atomic or molecular product of a simulated interaction between an atmospheric gas and an atomic or molecular species in a plume from a simulated spacecraft characterized by a corresponding set of values of N parameters.

BRIEF DESCRIPTION OF DRAWINGS

The patent or application file contains at least one drawing executed in color. Copies of this patent or patent application publication with color drawing(s) will be provided by the Office upon request and payment of the necessary fee.

FIGS. 2A-2F illustrate exemplary spectroscopic images of Cameron band ultraviolet emission resulting from a two-step interaction of plume methane with atmospheric atomic oxygen. Adapted from Dimpfl et al.

DETAILED DESCRIPTION

Figure 1A:
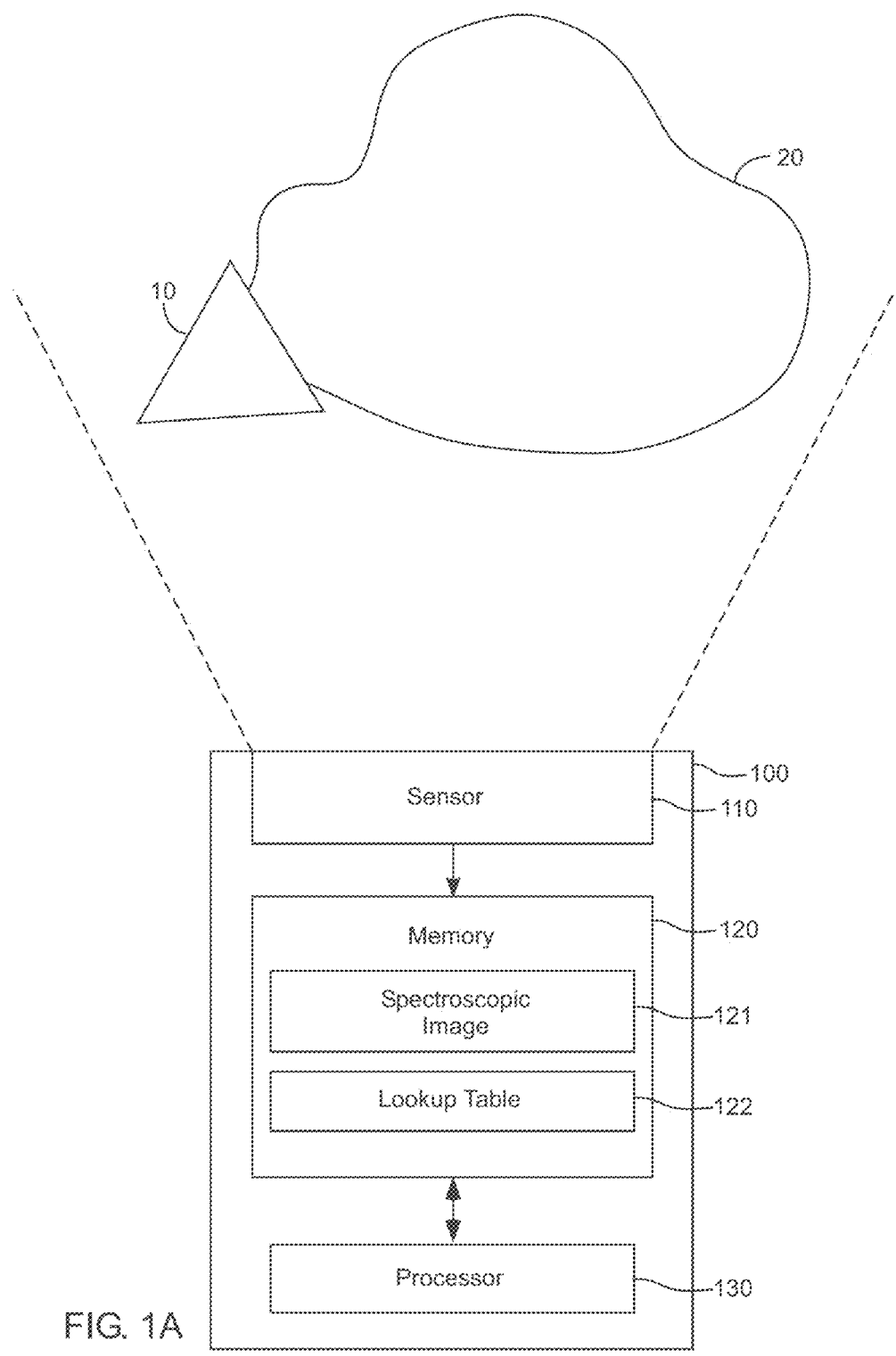
FIG. 1A schematically illustrates an exemplary system for estimating a parameter of a spacecraft, according to some embodiments.

Systems and methods for estimating parameters of a spacecraft based on emission from an atomic or molecular product of a plume of the spacecraft are provided.

More specifically, the present systems and methods can facilitate using spectroscopic emissions from a spacecraft, e.g., a space vehicle, space station, or satellite, to estimate any of a variety of parameters that may characterize the spacecraft. The emissions can result from interactions between a plume from the spacecraft, e.g., from an engine or other liquid or gas source of the spacecraft, and another gaseous species located outside of the spacecraft. For example, depending on the altitude of the spacecraft, a particular mixture of atmospheric gases can surround the spacecraft. One or more of the gases of such a mixture can interact with one or more molecular species within the plume from the spacecraft. Certain products of such interactions can emit light of respective wavelengths. For example, a particular atmospheric gas can chemically react with an atomic or molecular species from the plume so as to form an atomic or molecular product having a different chemical identity than that of the gas or the atomic or molecular species. Indeed, that molecular product can interact with yet another atmospheric gas or molecular species. For example, the atomic or molecular product can chemically react with another atmospheric gas, another molecular species, or another molecular product, so as to form yet another molecular product having yet another different chemical identity. Or, for example, the atomic or molecular product can be electronically, vibrationally, rotationally, or ro-vibrationally excited, either as a result of the chemical reaction or as a result of an interaction with another molecule, e.g., another atmospheric gas, molecular species, or molecular product.

The present systems and methods can estimate a parameter of the spacecraft based on a spectroscopic image of the emission from such an atomic or molecular product of an interaction between an atmospheric gas and an atomic or molecular species from a plume of the spacecraft. For example, the emission can be at, or centered at, a single wavelength, and the spectroscopic image can be an image that represents the intensity (also referred to herein as radiance) of that emission as a function of two- or three-dimensional spatial coordinates. The present systems and methods can include storing information in a lookup table about multiple simulated emissions, each simulated emission being based upon a particular set of values of possible parameters that potentially can characterize the spacecraft. For example, a given simulated emission may be based on a different spacecraft mass or velocity than another simulated emission. A simulated emission can be selected by comparing the information about the simulated emission to the spectroscopic image, e.g., by selecting the emission for which the information in the lookup table most closely matches the spectroscopic image. The values of one or more parameters of the spacecraft can be estimated based on the selected simulated emission. For example, the spacecraft can be estimated to have the same value for one or more of the same parameters as the simulated emission is based on, or the parameter of the spacecraft can be interpolated based on the spectroscopic image and the selected simulated emission.

FIG. 1A illustrates an exemplary system 100 for estimating a parameter of a spacecraft 10 that emits a plume. System 100 illustrated in FIG. 1A can be configured to estimate a parameter of spacecraft 10 based on a spectral analysis of plume 20. More specifically, system 100 includes optional sensor 110, non-transitory computer-readable memory 120, and processor 130, which will be described further below. System 100 can be ground-based, or can be space-based, e.g., located on a satellite. Additionally, one or more portions of system 100 can be ground based, while one or more other portions of system 100 can be space based. Additionally, the position of sensor 100 in three-dimensional space at the time at which each spectroscopic image is obtained can be fixed or otherwise known and stored in memory 120 for later use.

Figure 1B:
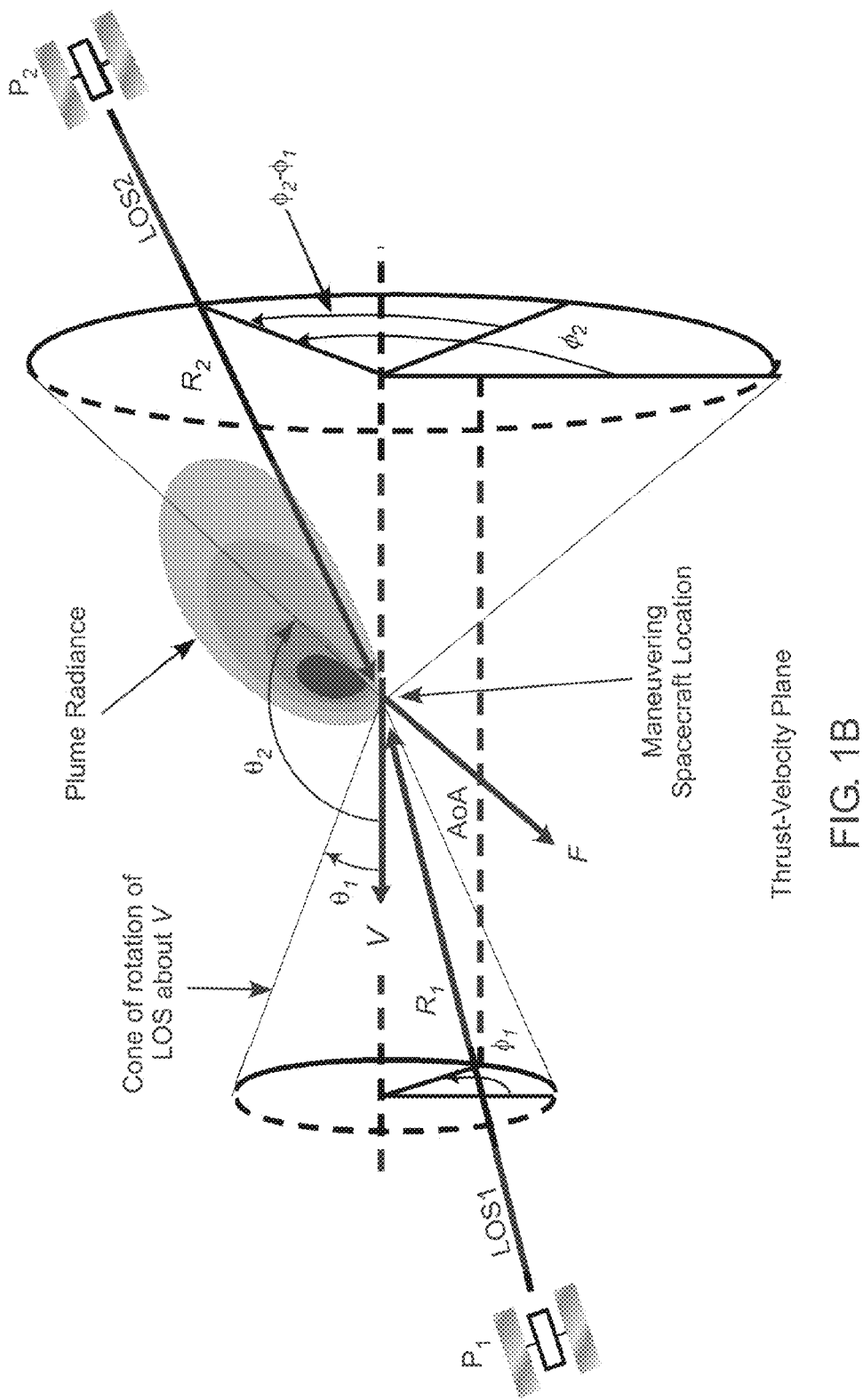
FIG. 1B schematically illustrates exemplary spacecraft parameters, according to some embodiments.

FIG. 1B illustrates some nonlimiting examples of parameters of spacecraft 10; other examples are provided elsewhere herein or can be envisioned by one skilled in the art. In FIG. 1B, spacecraft 10 can be located at the location designated "Maneuvering Spacecraft Location," and can be stereoscopically viewed by first and second observers, e.g., satellites P1, P2, each of which can include a corresponding sensor 100 such as described with reference to FIG. 1A. Alternatively, spacecraft 10 can be viewed by only a single observer having sensor 110, that can be space-based or ground-based. Parameters of spacecraft 10 that are illustrated in FIG. 1B can include, but are not limited to, one or more of the following: atmospheric relative velocity vector (V); thrust vector (F); angle of attack (AoA) of F; line of sight of each of the first and second observers (LOS1 and LOS2, respectively); range of each of the first and second observers to spacecraft 10 ($R_1$ and $R_2$, respectively); elevation angle between the line of sight of each observer and the atmospheric relative velocity vector ($\theta_1$ and $\theta_2$, respectively); and the azimuthal angle between the line of sight of each observer and the thrust-velocity plane ($\varphi_1$ and $\varphi_2$, respectively).

Referring again to FIG. 1A, spacecraft 10 can be a space vehicle, e.g., a vehicle for transporting equipment or humans from one location to another, such as from Earth to and from space, or from a first location in space to a second location in space. Or, for example, spacecraft 10 can be a space station designed to remain in space for an extended period of time and to support equipment or humans. Or, for example, spacecraft 10 can be a satellite such as used for communication, surveillance, or experimentation, or any other artificial object.

Spacecraft 10 can be located in any gaseous atmosphere, e.g., within Earth's atmosphere. For example, spacecraft 10 can be in low Earth orbit (LEO), which can be defined as having an altitude (or elevation) between about 99 miles and about 1200 miles. Or, spacecraft 10 can be suborbital, which can be defined as having an altitude less than about 99 miles, e.g., between about 50 miles and about 99 miles. The particular composition of the atmosphere adjacent to spacecraft 10 can be based upon the particular altitude of the spacecraft. For example, the troposphere extends from ground level to an altitude of approximately 4.3-12 miles; the stratosphere is above the troposphere and extends to an altitude of approximately 31 miles; the mesosphere is above the stratosphere and extends to an altitude of approximately 53-62 miles; the thermosphere is above the mesosphere and extends to an altitude of approximately 310-620 miles; and the exosphere, which is the uppermost layer of the Earth's atmosphere, is above the thermosphere and merges with interplanetary space. The different atmospheric layers can be considered to be separated from one another by respective boundaries, and the thicknesses and compositions of the layers or boundaries can vary depending on the altitude, latitude, season, time of day, and solar activity. As used herein, "about" or "approximately" is intended to mean within 10% of the stated value, unless otherwise noted.

Additionally, the different layers of the Earth's atmosphere can have different compositions, e.g., different mixtures of atmospheric gases, than one another, and the composition of a given layer also may vary based upon altitude. For example, the upper stratosphere, the mesosphere, the thermosphere, and the exosphere can include atomic oxygen, such as can result from the bombardment of diatomic oxygen or ozone with ultraviolet light, whereas the troposphere and lower stratosphere may not include significant amounts of atomic oxygen. The troposphere, stratosphere, and mesosphere can include water vapor, whereas the thermosphere, and exosphere may not include significant amounts of water vapor. Above about 124 miles, the atmosphere primarily can include atomic oxygen, helium, molecular nitrogen, molecular oxygen, atomic nitrogen, and hydrogen. Pressure in the thermosphere and exosphere is relatively low, resulting in relatively few collisions between atoms and molecules. For example, atoms and molecules in the exosphere can have substantially ballistic trajectories.

As illustrated in FIG. 1A, spacecraft 10 emits plume 20. One or more molecular species within plume 20 can interact with an atmospheric gas outside of spacecraft 10 to form an atomic or molecular product. It should be appreciated that plume 20 can include multiple different molecular species that can interact with one another or with an atmospheric gas to form multiple different molecular products. Such interactions can include, but need not necessarily include, chemical reactions. For example, an atmospheric gas can electronically, vibrationally, rotationally, or ro-vibrationally excite an atomic or molecular species in plume 20, and vice versa. Or, for example, an atmospheric gas can chemically react with an atomic or molecular species in plume 20 to form an atomic or molecular product. That molecular product can be electronically, vibrationally, rotationally, or ro-vibrationally excited as a result of the reaction, or can be excited as a result of another interaction with another molecular product, another molecular species, or another atmospheric gas.

Depending on the particular compositions of plume 20, the atmosphere surrounding spacecraft 10, and other parameters of spacecraft 10, one or more molecular products of interactions between molecular species within plume 20 and atmospheric gas can emit light of respective wavelengths. For example, as noted further above, a near ultraviolet (UV) emission band at approximately 336 nm from a plume of the space shuttle vernier reaction control system (VRCS) has been assigned to an electronic transition NH(A→X) of nitrogen monohydride, resulting from interaction between atmospheric atomic oxygen and an atomic or molecular species in the plume. Additionally, a near UV emission band at approximately 310 nm resulting from interaction between atmospheric gas and an atomic or molecular species in the plume has been assigned to an electronic transition OH(A→X) of hydroxyl. Additionally, emission at approximately 190-250 nm has been assigned to the Cameron bands from CO(a→X) and is believed to result from a two-step interaction of plume methane with atmospheric atomic oxygen. Additionally, an infrared emission at approximately 4.3 μm has been assigned to a plume CO vibrational emission resulting from collisions between plume CO and atmospheric atomic oxygen. Additionally, an infrared emission at approximately 6.3 μm has been assigned to a plume $H_2O$ vibrational bend mode emission resulting from collisions between plume $H_2O$ and atmospheric gas. Additionally, an infrared emission at approximately 2.7 μm has been assigned to a plume $H_2O$ asymmetric stretch mode emission resulting from collisions between plume $H_2O$ and atmospheric gas. Any of such emissions suitably can be used to estimate a parameter of spacecraft 10 using the exemplary methods and systems provided herein.

Note that plume 20 can originate from any suitable source on spacecraft 10. For example, spacecraft 10 can include an engine or thruster that, upon actuation, generates plume 20 that includes molecular species resulting from such actuation. For example, the engine or thruster can include a chemical propellant that, when appropriately reacted, generates plume 20 as well as thrust that can be used to propel spacecraft 10, to adjust the altitude of spacecraft 10, or to adjust the inclination of spacecraft 10. In one illustrative example, the engine or thruster uses monomethyl hydrazine (MMH) as a propellant, and oxidizes the MMH using dinitrogen tetroxide ($N_2O_4$) to generate thrust. An atomic or molecular species resulting from such oxidation can interact with an atmospheric gas outside of spacecraft 10. The space shuttle orbital maneuvering system (OMS) and reaction control system (RCS) engines generated thrust using MMH and $N_2O_4$. Alternatively, or additionally, plume 20 can originate from any solid, liquid, or gaseous source on spacecraft 10. For example, spacecraft 10 can include cooling fluids that inadvertently or purposefully can be released so as to form plume 20. One exemplary fluid that can be released is ammonia, which can react with an atmospheric gas outside of spacecraft 10.

Figure 3:
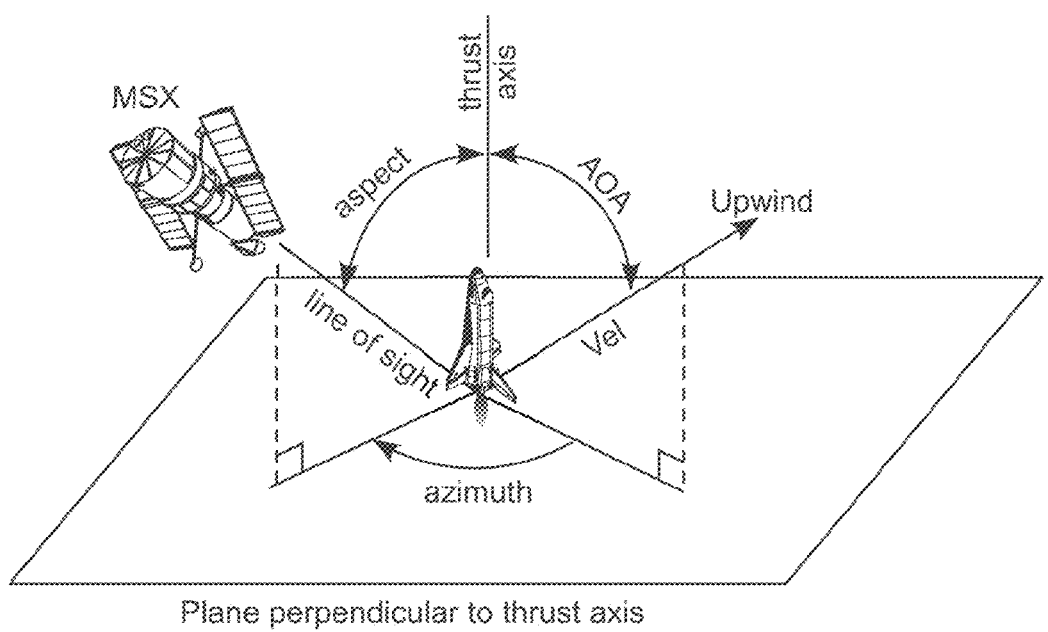
FIG. 3 schematically illustrates exemplary definitions of burn viewing angles such as illustrated in FIGS. 2A-2F and 4A-4F. Adapted from Dimpfl et al.
Figure 4:
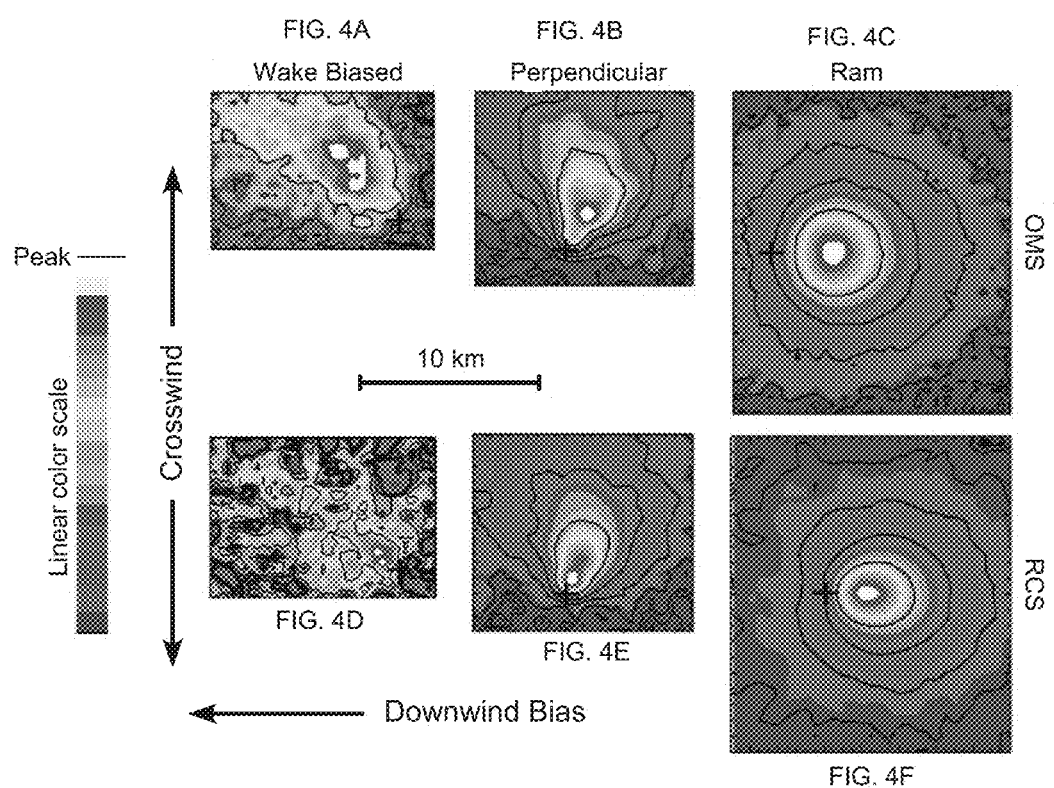
FIGS. 4A-4F respectively illustrate exemplary simulated images of the Cameron band emission of FIGS. 2A-2F produced using SOCRATES. Adapted from Dimpfl et al.

System 100 illustrated in FIG. 1A can be configured to estimate a parameter of spacecraft 10 based on a spectral analysis of plume 20. Sensor 110 of system 100 is configured to obtain a spectroscopic image of plume 20, and to provide such image to non-transitory computer-readable memory 120 (or alternatively, to processor 130) in the form of an electronic signal. For example, sensor 110 can include one or more optical elements (not specifically illustrated) configured to receive light emitted from plume 20, represented in FIG. 1A by the dashed lines, and an image sensor (not specifically illustrated) configured to generate an electronic signal representative of the received light. For example, FIGS. 2A-2F illustrate exemplary spectroscopic images of Cameron band ultraviolet emission resulting from a two-step interaction of plume methane with atmospheric atomic oxygen, adapted from Dimpfl et al., mentioned further above. FIG. 3 schematically illustrates exemplary definitions of burn viewing angles such as illustrated in FIGS. 2A-2F and 4A-4F (described further below), also adapted from Dimpfl et al.

More specifically, and as described in greater detail in Dimpfl et al., FIGS. 2A-2F illustrate images obtained of plumes generated by the orbital maneuvering system (OMS) engines and reaction control system (RCS) engines of a space shuttle at an altitude above approximately 155 miles (250 km). In FIGS. 2A-2F, the "+" sign indicates the approximate location of the space shuttle. Both the OMS and RCS engines burned monomethyl hydrazine (MMH) with dinitrogen tetroxide ($N_2O_4$) oxidizer. The images illustrated in FIGS. 2A-2F were obtained using sensors on the Midcourse Space Experiment satellite, which included UV through near-infrared bandpass and spectrographic imagers, covering from 140 to 900 nm, for different viewing parameters defined in FIG. 3 and given for the observations in Table 1, reproduced from Dimpfl et al. The burn duration and local atmospheric parameters are given in Table 2, reproduced from Dimpfl et al. The emissions were observed to include a prominent emission of the Cameron bands from CO(a $^3\Pi r$) radiating to the ground state between about 190-250 nm, also referred to herein as the CO(a→X) transition. Note, however, that FIGS. 2A-2F illustrate the integrated measured intensity of all measured emissions within the Cameron bands from CO(a $^3\Pi r$) radiating to the ground state, rather than the intensity of a single one of the Cameron bands.

TABLE 1

Burn observation viewing parameters, reproduced from Dimpfl et al.

| Burn designation | AOA, deg | Range, km | Altitude, km | Aspect, deg | Azimuth, deg |
|---|---|---|---|---|---|
| OMS | | | | | |
| High ram | 180 | 4300 | 298 | 46 | n/a |
| Ram | 180 | 4100 | 268 | 127 | n/a |
| Perpendicular | 91 | 3900 | 295 | 82 | 117 |
| Wake biased | 30 | 3400 | 290 | 123 | 245 |
| RCS | | | | | |
| Ram | 168 | 3500 | 289 | 59 | ~0 |
| Perpendicular | 97 | 4100 | 295 | 77 | 117 |
| Wake biased | 26 | 3600 | 289 | 116 | 229 |

$^a$AOA = angle of attack.

TABLE 2

Burn duration and local atmospheric parameters, reproduced from Dimpfl et al.

| Burn designation | Duration, s | Atm. density, $cm^{-3} \times 10^{-8}$ | Atm. temperature. K | Atm. mole fraction | | | |
|---|---|---|---|---|---|---|---|
| | | | | O | $N_2$ | $O_2$ | $O^+$ |
| OMS | | | | | | | |
| High ram | 36.7 | 2.78 | 717 | 0.904 | 0.093 | 0.003 | 0.00030 |
| Ram | 36.7 | 9.43 | 874 | 0.727 | 0.262 | 0.011 | 0.00048 |
| Perpendicular | 9.6 | 9.22 | 1159 | 0.731 | 0.258 | 0.010 | 0.00010 |
| Wake biased | 9.7 | 9.86 | 1133 | 0.727 | 0.263 | 0.010 | 0.00007 |

TABLE 2-continued

Burn duration and local atmospheric parameters, reproduced from Dimpfl et al.

| Burn designation | Duration, s | Atm. density, $cm^{-3} \times 10^{-8}$ | Atm. temperature. K | Atm. mole fraction | | | |
|---|---|---|---|---|---|---|---|
| | | | | O | $N_2$ | $O_2$ | $O^+$ |
| RCS | | | | | | | |
| Ram | 9.5 | 9.91 | 1133 | 0.726 | 0.263 | 0.010 | 0.00007 |
| Perpendicular | 9.8 | 9.24 | 1154 | 0.732 | 0.258 | 0.010 | 0.00010 |
| Wake biased | 8.0 | 9.96 | 1122 | 0.727 | 0.263 | 0.010 | 0.00007 |

Systems and methods for obtaining spectroscopic images of emissions from molecular products of plumes from spacecraft are known, such as described in many of the references mentioned herein. For example, referring again to FIG. 1A, in some embodiments, one or more optical elements of sensor 110 can be configured so as to preferentially transmit only light within a desired spectral band to an image sensor, e.g., in a relatively narrow band centered on the wavelength(s) of the emission so as to substantially exclude light at other wavelengths. For example, the optical elements can include an optical bandpass filter or atomic line filter centered on the wavelength(s) of the emission so as to preferentially transmit to the image sensor substantially only the light emitted from plume 20, in addition to any background radiation having wavelengths in the passed band. In embodiments where the emission is at approximately a single wavelength, an optical bandpass filter suitably can have a bandwidth of 10 nm (FWHM). Illustratively, the image sensor can include a charge-coupled device (CCD), such as an Si CCD, a InGaAs detector, a HgCdTe detector, or an active pixel sensor based in complementary metal-oxide-semiconductor (CMOS) or N-type metal-oxide-semiconductor (NMOS). Alternatively, or additionally, sensor 110 can include a thermal imaging sensor, a millimeter-wave (microwave) sensor, a color sensor, an X-ray sensor, a UV (ultraviolet) sensor, a NIR (near infrared) sensor, a SWIR (short wave infrared) sensor, a MWIR (mid wave infrared) sensor, or a LWIR (long wave infrared) sensor. Accordingly, in some embodiments, the electronic signal that sensor 110 provides to memory 120 can represent an image substantially of only the light emitted from plume 20, plus any background radiation at approximately the same wavelength as the emission. Such an image can be two-dimensional, e.g., in an x-y plane where x represents latitude and y represents longitude, or in an azimuth-elevation plane.

Alternatively, the optical elements of sensor 110 illustrated in FIG. 1A can transmit a relatively wide range of wavelengths, e.g., that include the emitted light in addition to multiple other wavelengths, to the image sensor of sensor 110, based upon which the image sensor can generate an electronic signal corresponding to a spectral image, multispectral image, or hyperspectral image. Such image sensors, such as imaging spectrometers, are commercially available. Imaging spectrometers include whiskbroom scanners, pushbroom scanners, integral field spectrographs, wedge imaging spectrometers, Fourier transform imaging spectrometers, computed tomography imaging spectrometers (CTIS), image replicating imaging spectrometers (IRIS), coded aperture snapshot spectral imagers (CASSI), and image mapping spectrometers (IMS). Or, for example, PIXELSENSOR™ Multispectral Photodiodes (Ocean Thin Films, Inc., Largo, Fla.) include optical filters integrated on silicon photodiodes that are represented as being customizable to fit targeted bands in the visible (VIS) to near infrared (NIR) spectral regions, e.g., bands having central wavelengths between 430 nm and 695 nm with bandwidths ranging between 10 nm and 20 nm (FWHM). Accordingly, in some embodiments, the electronic signal that sensor 110 provides to memory 120 can represent a data "cube" that includes a plurality of planes, each plane representing a two-dimensional image of the plume at a particular approximate wavelength. Data cubes associated with spectral, multispectral, and hyperspectral imaging are known.

Note that sensor 110 illustrated in FIG. 1A can include a single image sensor and associated optical element(s), or alternatively can include multiple image sensors and associated optical element(s). Such multiple image sensors need not necessarily be co-located with one another. For example, sensor 110 can include a first image sensor and associated optical element(s) positioned and arranged so as to obtain a first image from a first point of view of an emission of an atomic or molecular product from plume 20, and a second image sensor and associated optical element(s) positioned and arranged so as to obtain a second image from a second point of view of the emission. Each such image can be two-dimensional. Additionally, the first and second images can be stereoscopic. Processor 130 can be configured so as to construct a spectroscopic three-dimensional radiant field based on the stereo spectroscopic images of the emission, e.g., using techniques known in the art. The resulting three-dimensional radiant field can represent the intensity of the emission as a function of three-dimensional spatial coordinates, e.g., in a three dimensional x-y-z space where x represents latitude, y represents longitude, and z represents altitude, or in a three-dimensional space defined by azimuth and elevation. Additionally, note that sensor 110 need not necessarily have a full field of view of the emission of an atomic or molecular product from plume 20, as may be suggested by the dashed lines illustrated in FIG. 1A. Instead, sensor 110 can be configured so as to obtain an image of the emission by obtaining images of different portions of the emission, and processor 130 can be configured to construct a composite image of the emission based on such images.

As illustrated in FIG. 1A, sensor 110 can be configured to transmit the spectroscopic image, or images upon which such a spectroscopic image can be obtained, to memory 120. Alternatively, sensor 110 can be configured to transmit the image or images to processor 130, which in turn can be configured to transmit the image or images to memory 120. Note that sensor 110, memory 120, and processor 130 need not be co-located with one another, and suitably can be in wired or wireless communication with one another. In one illustrative example, sensor 110 can be space-based, and memory 120 and processor 130 can be ground-based.

Non-transitory computer-readable memory 120 can include any suitable computer-readable storage medium or media including computer storage mechanisms (e.g., non-transitory media, such as CD-ROM, diskette, RAM, flash memory, computer's hard drive, etc.) in operable communication with processor 130. Memory 120 can be configured to store spectroscopic image 121 received from sensor 110 or from processor 130, and look-up table 122 described further below. Optionally, memory 120 can be configured to store instructions (e.g., software) for use in execution by processor 130 to perform the methods' operations and implement the systems described herein. Alternatively, such instructions suitably can be stored on a different computer-readable storage medium or media associated with processor 130. Additionally, memory 120 can include any suitable number of discrete media. For example, memory 120 can include a first computer-readable medium storing spectroscopic image 121 and a second computer-readable medium storing lookup table 122.

Lookup table 122 stored in memory 120 includes a data structure that stores information about simulated emissions. More specifically, spacecraft 10 illustrated in FIG. 1A can be characterized by a corresponding set of values of at least N parameters, and lookup table 122 can include an N-dimensional data structure that stores information about a plurality of different simulated emissions. Each simulated emission can be from the atomic or molecular product of a simulated interaction between the atmospheric gas and the atomic or molecular species in a plume from a simulated spacecraft that is characterized by a corresponding set of values of the N parameters. Each such simulated emission can be different than each other simulated emission based on differences between the different sets of values of the N parameters upon which the simulated emission is based.

Exemplary parameters $P_1$, $P_2$, ... $P_N$ of the actual or simulated spacecraft can include, for example, view angle, range, spacecraft mass, engine thrust, engine lip angle, remaining propellant, angle of attack, atmospheric relative speed, plume velocity, atmospheric composition adjacent to the spacecraft, atmospheric density adjacent to the spacecraft, ambient temperature, and amount of the atomic or molecular species in the plume. Some examples of parameters are illustrated in FIG. 1B, but are not limited thereto. The information stored in lookup table 122 can be based on simulated spacecraft characterized by multiple different values of some or all of such exemplary parameters. Accordingly, lookup table 122 can be N-dimensional, where N represents the number of different simulated spacecraft parameters used to simulate emissions from molecular products of the spacecraft's plume. In illustrative embodiments, N equals two, or three, or four, or five, or six, or seven, or eight, or nine, or ten, or more than ten. Note that parameters other than those specifically described herein suitably can be used.

View angle and range can be considered to be parameters relating to the perspective from which the actual or simulated spacecraft is viewed. For example, some of the simulated emissions for which information is stored in lookup table 122 can be based on simulated spacecraft that are viewed from different angles than one another, which can result in markedly different appearances for the otherwise same plume, as well as for the resulting simulated emissions. Or, for example, some of the simulated emissions for which information is stored in lookup table 122 can be based on simulated spacecraft that are at different ranges than one another, which can result in different apparent sizes of the otherwise same plume, as well as for the resulting simulated emissions.

Spacecraft mass, engine thrust, engine lip angle, and remaining propellant can be considered to be physical parameters of the actual or simulated spacecraft. For example, some of the simulated emissions for which information is stored in lookup table 122 can be based on simulated spacecraft that have different masses than one another, which can result in different spacecraft accelerations given an otherwise equal force generated by the plume, and a different spatial distribution of the resulting simulated emissions. Or, for example, some of the simulated emissions for which information is stored in lookup table 122 can be based on simulated spacecraft that have different engine thrusts than one another, which can result in different spacecraft accelerations given an otherwise equal spacecraft mass, and a different spatial distribution of the resulting simulated emissions. Or, for example, some of the simulated emissions for which information is stored in lookup table 122 can be based on simulated spacecraft that have different engine lip angles than one another, which can result in plumes having different spatial distributions than one another for otherwise equal spacecraft masses and thrusts, and a different spatial distribution of the resulting simulated emissions.

Additionally, note that the amount of remaining propellant can affect the engine thrust. For example, the feed pressure can drop as the propellant is used and the pressure in the pressurizing tank drops, which can cause a drop in engine thrust. Accordingly, in one nonlimiting embodiment, some of the simulated emissions for which information is stored in lookup table 122 can be based on simulated spacecraft that have different remaining amounts of propellant than one another, which can result in plumes having different spatial distributions than one another for otherwise equal spacecraft masses and thrusts, and a different spatial distribution of the resulting simulated emissions. Knowledge of the remaining propellant can be determined from multiple observations of a spacecraft using systems and methods such as provided herein to determine engine thrust (e.g., after determining the spacecraft mass). In one example, the thrust of such an engine after exhausting the propellant can be approximately 30% of the engine's initial thrust. A history of thrust from maneuvers (e.g., determined using the systems and methods provided herein) can allow a determination of how much propellant the spacecraft initially had and how much propellant remains after an observed maneuver.

Angle of attack, atmospheric relative speed, and plume velocity can be considered to be parameters describing the motion of the actual or simulated spacecraft. For example, some of the simulated emissions for which information is stored in lookup table 122 can be based on simulated spacecraft that are at different angles of attack than one another, e.g., are oriented at different angles relative to the vector defining the direction in which the spacecraft is moving through the atmospheric gas, which can result in the resulting plumes, and the resulting simulated emissions, having different spatial distributions than one another. Or, for example, some of the simulated emissions for which information is stored in lookup table 122 can be based on simulated spacecraft that are at different atmospheric relative speeds than one another, which can result in a different spatial distribution of interactions between atmospheric gas and molecular species of otherwise same plumes, and thus a different spatial distribution of the resulting simulated emissions. Or, for example, some of the simulated emissions for which information is stored in lookup table 122 can be based on simulated spacecraft that have different plume velocities than one another, which can result in a different spatial distribution of interactions between atmospheric gas and molecular species of otherwise same plumes, and thus a different spatial distribution of the resulting simulated emissions.

Atmospheric composition adjacent to the spacecraft, atmospheric density adjacent to the actual or simulated spacecraft, ambient temperature and amount of the atomic or molecular species in the plume can be considered to be parameters describing the species available to interact with one another to form the atomic or molecular product. For example, some of the simulated emissions for which information is stored in lookup table 122 can be based on simulated spacecraft being adjacent to atmospheric compositions that are different than one another, which can result in a different spatial distribution of interactions between atmospheric gas and molecular species of otherwise same plumes, and thus a different spatial distribution of the resulting simulated emissions. Spacecraft having different altitudes or elevations than one another can be adjacent to different atmospheric compositions than one another. Or, for example, some of the simulated emissions for which information is stored in lookup table 122 can be based on simulated spacecraft being adjacent to atmospheric densities that are different than one another, which can result in a different spatial distribution of interactions between atmospheric gas and molecular species of otherwise same plumes, and thus a different spatial distribution of the resulting simulated emissions. Spacecraft having different altitudes or elevations than one another can be adjacent to different atmospheric densities than one another. Or, for example, some of the simulated emissions for which information is stored in lookup table 122 can be based on the simulated spacecraft being adjacent to atmospheres that are at different ambient temperatures than one another. Or, for example, some of the simulated emissions for which information is stored in lookup table 122 can be based on simulated spacecraft having different amounts than one another of molecular species in their respective plumes, which can result in a different spatial distribution of interactions between atmospheric gas and molecular species of otherwise same plumes, and thus a different spatial distribution of the resulting simulated emissions. Spacecraft having different fuel compositions than one another can have different amounts, or different types, or both, of molecular species in their respective plumes.

Lookup table 122 can store information about the simulated emissions in any suitable format. For example, lookup table 122 can store information about each such simulated emission as a two-dimensional simulated image, or as a three-dimensional radiant field. For example, FIGS. 4A-4F respectively illustrate exemplary two-dimensional simulated images of the Cameron band emission of FIGS. 2A-2F produced using SOCRATES, and are reproduced from Dimpfl et al., mentioned further above. Dimpfl et al. discloses that a direct simulation Monte Carlo (DSMC) method based on Spacecraft/Orbiter Contamination Representation Accounting for Transiently Emitted Species (SOCRATES), which accounts for bimolecular chemistry, was used to analyze Cameron band emissions observed using a 180-300 nm bandpass narrow-field ultraviolet imager (IUN). Additionally, Dimpfl et al. discloses that for the axisymmetric cases of the OMS ram burns, a two-dimensional version, the Transitional and Rarified Axisymmetric Monte Carlo Plume (TRAMP) code, which produces the same result as SOCRATES but converges about ten times faster, was used. For further details, see Dimpfl et al. Referring again to FIG. 1A, lookup table 122 can store one or more simulated two-dimensional images for each simulated emission corresponding to a particular set of values of the N parameters of the simulated spacecraft. Each such image can represent the spatial distribution of the simulated emission from the atomic or molecular product in any suitable manner. For example, FIGS. 4A-4F use different colors to represent the spatial distribution of simulated radiance from CO Cameron band emissions. Alternatively, a grayscale or any other suitable image-based representation could be used.

Alternatively, lookup table 122 can store information about simulated emissions from the atomic or molecular product as three-dimensional radiant fields. For example, SOCRATES can be used to simulate the radiance from the atomic or molecular product as a function of three-dimensional space, and a representation of the resulting three-dimensional radiant field can be stored in lookup table 122. In this regard, note that such a given three-dimensional radiant field can represent multiple different view angles of the same simulated emission.

As yet another alternative, lookup table 122 can store numeric values that are respectively representative of the simulated emission from the atomic or molecular product at different points in space.

Additionally, lookup table 122 can store information about the particular values of the set of the N parameters based upon which each of the simulated emissions was prepared. For example, the values of the parameters can be stored in lookup table 122, or in another table to which lookup table 122 can point (or vice versa), as a set of numeric values that are associated with the corresponding simulated emission. Or, for example, the values of the parameters can correspond to the coordinates of the simulated emission within lookup table 122.

Referring still to FIG. 1A, lookup table 122 can be generated in advance by processor 130 or by any other suitable combination of hardware and software, stored in memory 120, and then used repeatedly to estimate the values of parameters for different spacecraft, or for the same spacecraft at different times, or both. For example, processor 130 or another suitable combination of hardware and software can be configured to generate lookup table 122 using method 600 described further below with reference to FIG. 6, and to store the lookup table in memory 120 for use by processor 130.

Processor 130 illustrated in FIG. 1A can be coupled to non-transitory computer-readable memory 120, and can be configured to select a simulated emission based on comparisons between the information about a plurality of the simulated emissions and the spectroscopic image, and to estimate a value of at least one of the N parameters of the actual spacecraft based on the selected simulated emission. For example, processor 130 can be configured to access spectroscopic image 121 and lookup table 122 stored in memory 120, to compare spectroscopic image 121 to information about a plurality of simulated emissions stored in lookup table 122, and to select a simulated emission about which information stored in lookup table 122 sufficiently matches spectroscopic image 121. Memory 120 or another suitable computer-readable medium associated with processor 130 can include instructions causing processor 130 to perform actions such as provided herein, e.g., to perform one or more steps such as illustrated in FIGS. 5-8.

The particular manner in which processor 130 compares spectroscopic image 121 to information about a plurality of simulated emissions suitably can be selected based upon the particular type of spectroscopic image, and the particular type of information, that processor 130 accesses in lookup table 122. For example, as noted above, spectroscopic image 121 can include a two-dimensional image or can include a three-dimensional radiant field. Or, for example, as noted above, spectroscopic image 121 can represent light in a relatively narrow band centered on the wavelength(s) of the emission so as to substantially exclude light at other wavelengths, or alternatively can include a plurality of wavelengths, e.g., can be a spectral image, multi-spectral image, or hyperspectral image. Additionally, as noted above, the information about the simulated emissions illustratively can include a two-dimensional simulated image, a three-dimensional radiant field, or numerical values.

In exemplary embodiments where the spectroscopic image and the simulated image each include two-dimensional images, processor 130 can compare such images to one another, e.g., by comparing the two-dimensional spatial distribution of the radiance of the actual emission to the two-dimensional spatial distributions of the radiance of a plurality of the simulated emissions, and can select the simulated image that most closely matches the spectroscopic image. In exemplary embodiments where the spectroscopic image and the simulated image each include three-dimensional radiant fields, processor 130 can compare such three-dimensional radiant fields to one another, e.g., by comparing the three-dimensional spatial distribution of the radiance of the actual emission to the three-dimensional spatial distributions of the radiance of a plurality of the simulated emissions, and can select the simulated image that most closely matches the spectroscopic image.

In exemplary embodiments where the spectroscopic image includes a two-dimensional image and the simulated image includes a three-dimensional radiant field, processor 130 can generate a plurality of two-dimensional simulated images at different view angles based on the simulated three-dimensional radiant fields of respective simulated emissions, can compare the spectroscopic image to a plurality of the different two-dimensional simulated images, e.g., compare such images to one another, e.g., by comparing the two-dimensional spatial distribution of the radiance of the actual emission to the generated two-dimensional spatial distribution of the radiance of the respective simulated emission at different view angles, and can select the simulated image that most closely matches the spectroscopic image. In exemplary embodiments where the spectroscopic image includes a two-dimensional image or a three-dimensional radiant field and the information about the simulated emissions includes numerical values, processor 130 can compare such values for a plurality of simulated emissions to the spectroscopic image.

Additionally, in exemplary embodiments in which spectroscopic image 121 includes a plurality of wavelengths, e.g., includes a spectral image, multi-spectral image, or hyperspectral image, processor 130 can select only a portion of that image that corresponds to emission from the atomic or molecular product of interest. Such a spectroscopic image 121 can include a two-dimensional or a three-dimensional radiant field and can be compared to information about the simulated emissions in any suitable manner, e.g., as provided herein.

Processor 130 can be configured to estimate the value of at least one of the N parameters of the actual spacecraft based upon the selected simulated emission, e.g., responsive to instructions stored in memory 120 or other computer-readable medium. For example, processor 130 can be configured to obtain from memory 120 the values of the parameters upon which the simulated emission was based, and to estimate that the actual spacecraft is characterized by at least one of those values. In this regard, however, note that the simulated emission selected by the processor 130 need not necessarily be identical to the emission represented by spectroscopic image 121, but nonetheless can be more similar to the emission represented by spectroscopic image 121 than other simulated emissions. Processor 130 can, in some embodiments, be configured to estimate the value of at least one of the N parameters of the actual spacecraft by interpolating such a value based on a difference between the information about the simulated emission and the spectroscopic image 121. In the circumstance where processor 130 identifies spectroscopic image 121 as being sufficiently similar to more than one simulated emission, processor 130 can interpolate the value of a parameter based on the information about each such simulated emission.

Processor 130 further can be configured to suitably output the estimated value(s) of the parameter(s) of the actual spacecraft. For example, processor 130 can be coupled to a display device (not specifically illustrated) and configured to output the estimated value(s) to the display device for use by a user, e.g., in characterizing the spacecraft. Or, for example, processor 130 can output the estimated value(s) to memory 120 for storage or for use in subsequent processing, e.g., in characterizing the spacecraft.

Several exemplary methods for estimating a parameter of a spacecraft now will be described. It should be understood that such methods suitably can be implemented using system 100 illustrated in FIG. 1A, or using any other suitable combination of hardware and software.

Figure 5:
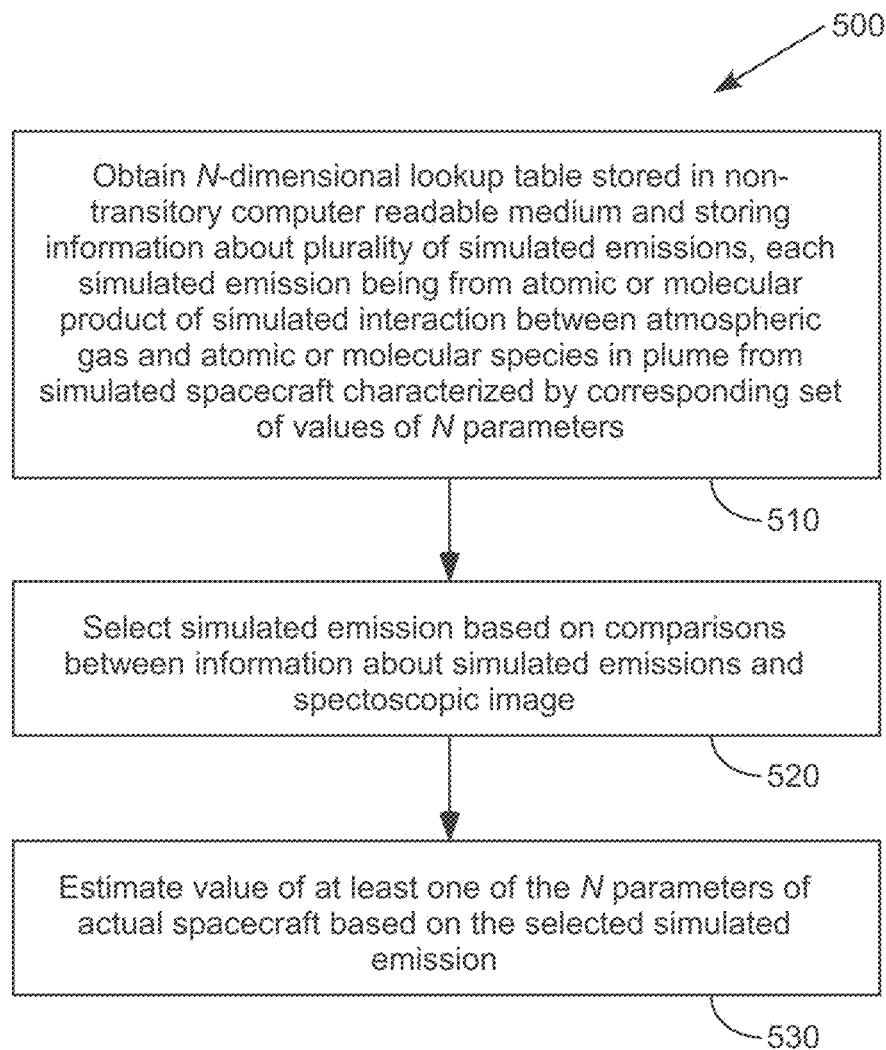
FIG. 5 illustrates an exemplary method for estimating a parameter of a spacecraft, according to some embodiments.

FIG. 5 illustrates an exemplary method 500 for estimating a parameter of a spacecraft, e.g., based on a spectroscopic image of an emission from an atomic or molecular product of an interaction between an atmospheric gas and an atomic or molecular species in a plume from the actual spacecraft. The spacecraft can be characterized by a set of values of at least N parameters. Optionally, method 500 can include obtaining the spectroscopic image, e.g., in a manner such as described above or otherwise known in the art. For example, as described above with reference to FIG. 1A, sensor 110 can obtain spectroscopic image 121 and store the image in memory 120 for access by processor 130.

Method 500 includes obtaining an N-dimensional lookup table in a non-transitory computer-readable medium that stores information about a plurality of different simulated emissions (step 510). Each simulated emission can be from the atomic or molecular product of a simulated interaction between an atmospheric gas and an atomic or molecular species in a plume from a simulated spacecraft characterized by a corresponding set of values of the N parameters. For example, as described above with reference to FIG. 1A, processor 130 can access lookup table 122 stored in memory 120. In one illustrative embodiment, lookup table 122 can be generated in advance by processor 130 or any other suitable combination of hardware and software using method 600 described further below with reference to FIG. 6.

Method 500 illustrated in FIG. 5 also includes selecting a simulated emission based on comparisons between the information about a plurality of the simulated emissions and the spectroscopic image (step 520). For example, as described above with reference to FIG. 1A, processor 130 can compare spectroscopic image 121 to information about a plurality of simulated emissions stored in lookup table 122, and to select a simulated emission about which information stored in lookup table 122 sufficiently matches spectroscopic image 121. The particular manner in which processor 130 compares spectroscopic image 121 to information about a plurality of simulated emissions suitably can be selected based upon the particular type of spectroscopic image, and the particular type of information, that processor 130 accesses in lookup table 122. Additionally, based on some information about spacecraft 10 being a priori known, processor 130 can compare spectroscopic image 121 to only the subset of simulated emissions that are consistent with such a priori known information.

Method 500 illustrated in FIG. 5 also includes estimating the value of at least one of the N parameters of the actual spacecraft based on the selected simulated emission (step 530). For example, the spacecraft can be estimated to have the same parameter value(s) as those of the selected emission, or the value of the parameter can be interpolated based on one or more of the simulated emissions and the spectroscopic image, e.g., by processor 130 as described above with reference to FIG. 1A.

Optionally, method 500 further includes outputting the selected simulated emission (not specifically illustrated in FIG. 5). For example, as noted above with reference to FIG. 1A, processor 130 further can be configured to suitably output the estimated value(s) of the parameter(s) of the actual spacecraft, e.g., to a display device for display to a user or to memory 120 for storage. Alternatively, or additionally, processor 130 can cause the spectroscopic image or a simulated image the selected simulated emission, or both, on a suitable display device in communication with processor 130 (not specifically illustrated).

Figure 6:
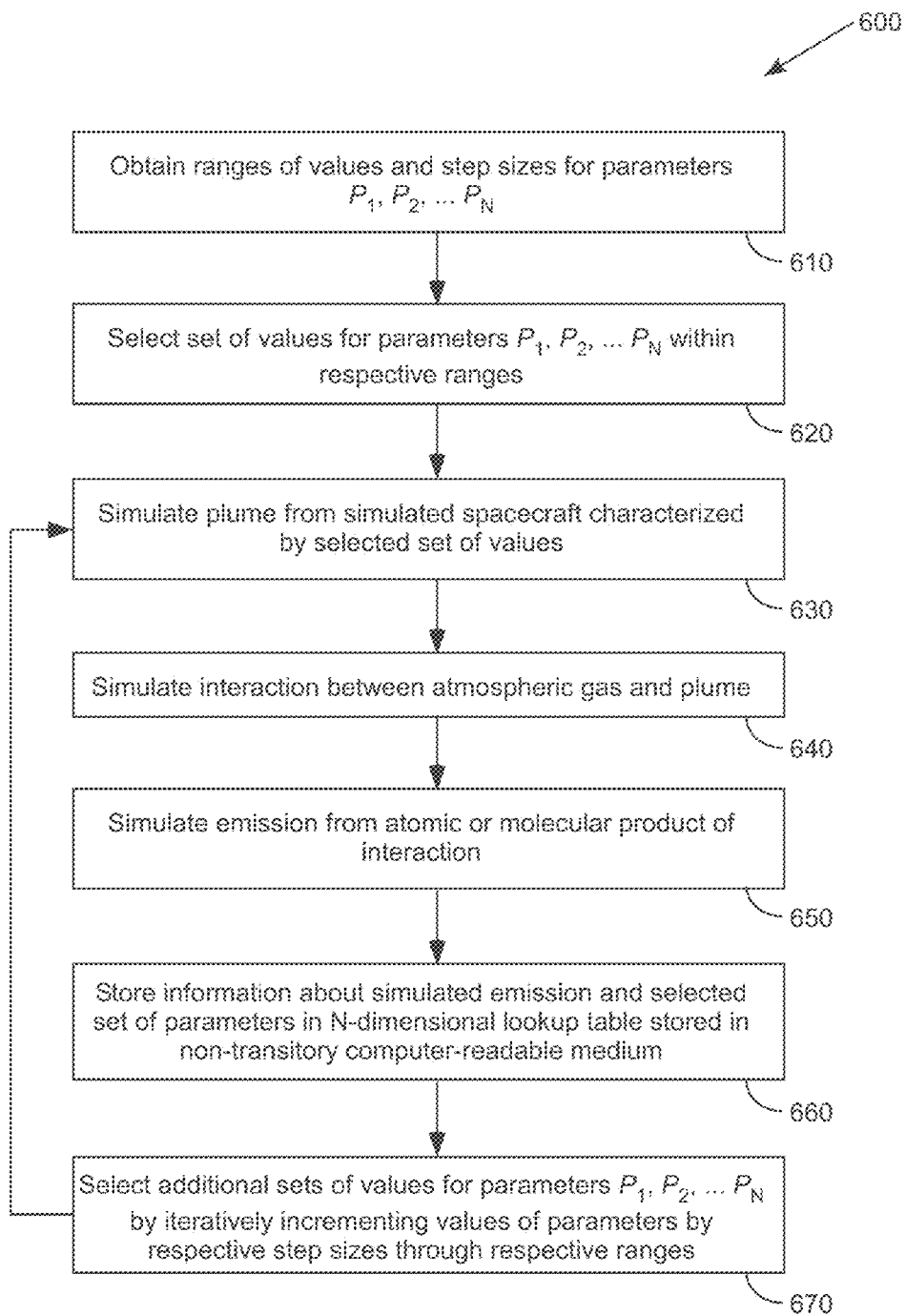
FIG. 6 illustrates an exemplary method for generating a lookup table storing information about a plurality of simulated emissions, according to some embodiments.

As noted further above, a lookup table that stores information about different simulated emissions can be generated ahead of time, and used to estimate the parameters of multiple spacecraft, or of the same spacecraft at different times, or both. FIG. 6 illustrates an exemplary method 600 that can be used to generate a lookup table, e.g., using processor 130 illustrated in FIG. 1A or any other suitable combination of hardware and software.

Method 600 illustrated in FIG. 6 includes obtaining ranges of values and step sizes for N parameters that can be used to characterize a spacecraft, e.g., parameters $P_1$, $P_2$, ... $P_N$ (step 610). For example, processor 130 illustrated in FIG. 1A can be configured to obtain ranges of values for each of parameters $P_1$, $P_2$, ... $P_N$, e.g., an initial value and ending value for each parameter, and to obtain a step size for each of the parameters. Such ranges of values and step sizes can be user-defined or automatically defined, and can be based on the expected parameters of actual spacecraft to be characterized. For example, the ranges can be defined so as to include expected values of parameters relating to perspective from which the actual spacecraft is to be viewed, e.g., view angle and range. Or, for example, the ranges can be defined so as to include expected values of parameters relating to the physical parameters of the actual spacecraft to be characterized, such as spacecraft mass, engine thrust, engine lip angle, or remaining propellant. Or, for example, the ranges can be defined so as to include expected values of parameters describing the expected motion of the actual spacecraft, e.g., angle of attack, atmospheric relative speed, and plume velocity. Or, for example, the ranges can be defined so as to include expected values of parameters describing the species available to interact with one another to form the atomic or molecular product, e.g., atmospheric composition adjacent to the spacecraft, atmospheric density adjacent to the spacecraft, ambient temperature, and amount of the atomic or molecular species in the plume. The step size of each parameter suitably can be selected, e.g., can be user-defined or automatically defined, so as to suitably sample different values within the range for that parameter.

Method 600 illustrated in FIG. 6 further can include selecting a set of values for the N parameters within the respective ranges (step 620). In one illustrative example, processor 130 illustrated in FIG. 1A can select the respective initial value of each parameter.

Method 600 further can include simulating a plume from a simulated spacecraft characterized by the selected set of values (step 630); simulating an interaction between an atmospheric gas and the plume (step 640); and simulating an emission from an atomic or molecular product of the interaction (step 650). Methods of simulating plumes, interactions between an atmospheric gas, and an emission from an atomic or molecular product of the interaction can be implemented using processor 130 running SOCRATES, or any other suitable combination of hardware and software.

Method 600 further can include storing information about the simulated emission and the selected set of parameters in an N-dimensional lookup table stored in a non-transitory computer-readable medium (step 660). For example, the simulated emission and the selected set of parameters upon which that simulated emission is based can be stored in lookup table 122 illustrated in FIG. 1A. In one illustrative embodiment, processor 130 instantiates N-dimensional lookup table during step 610 or at any other suitable time, e.g., by generating an empty matrix of dimension N that includes a number of elements along each one of the N dimensions that is equal to the number of steps (plus one) between the initial and final values of a corresponding parameter based on the step size for that parameter. Accordingly, a given coordinate in the N-dimensional lookup table can correspond to a unique set of values of the N parameters. At step 660, processor 130 can populate that coordinate of the lookup table with the information about the simulated emission, e.g., by storing at that coordinate a two-dimensional simulated image, three-dimensional radiant field, or suitable numerical representation of the spatial distribution of the radiance of the simulated emission. Processor 130 can store the corresponding set of values of the N parameters within lookup table 122, or in a separate table. Alternatively, the set of values of the N parameters can be considered to be stored within lookup table 122 as the coordinate at which the information about the simulated emission is stored.

Method 600 illustrated in FIG. 6 further can include selecting additional sets of values for the N parameters by iteratively incrementing values of the parameters by their respective step sizes through their respective ranges (step 670), and repeating steps 630-660 for each such set of values. For example, processor 130 illustrated in FIG. 1A can increment a first parameter $P_1$ by the step size of that parameter, within the range for that parameter, so as to define a new set of values for the parameters. Processor 130 then can repeat steps 630-660 for that set of parameters. Processor 130 then can again increment the first parameter $P_1$ by the step size of that parameter, within the range for that parameter, so as to define a new set of values for the parameters, and repeat steps 630-660 for that set of parameters. Analogously, processor 130 can increment each of the parameters $P_1$, $P_2$, ... $P_N$ by their respective step sizes and through their respective ranges, so as to sample the entire N-dimensional phase space of parameters $P_1$, $P_2$, ... $P_N$, e.g., so as to sample all permutations of $P_1$, $P_2$, ... $P_N$ that are defined by the ranges and step sizes obtained in step 610.

Figure 7:
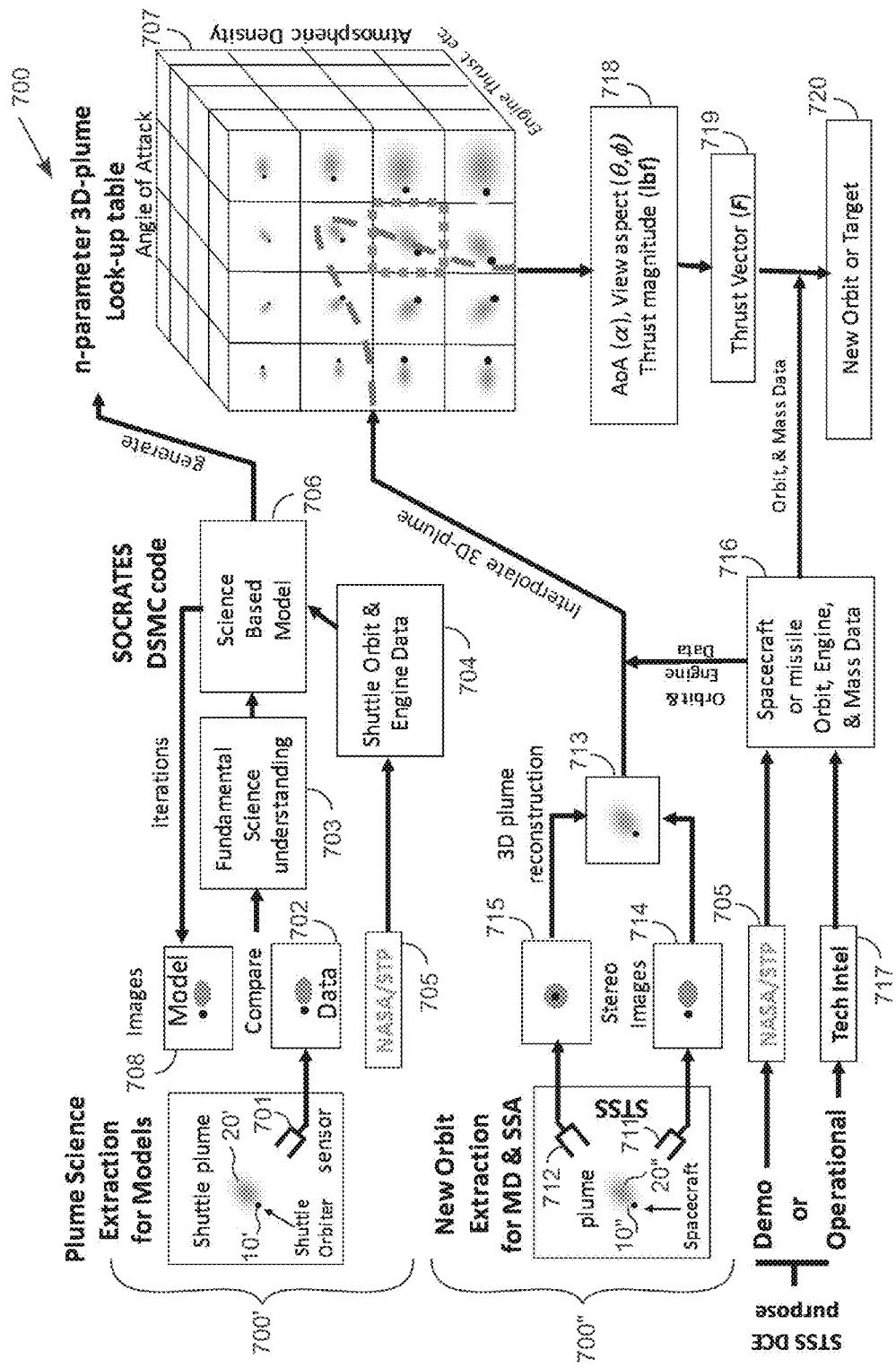
FIG. 7 schematically illustrates implementation of another exemplary method for use in estimating a parameter of a spacecraft, according to some embodiments of the present invention.

It should be appreciated that a lookup table such as generated using method 600 illustrated in FIG. suitably can be used to estimate one or more parameters of actual spacecraft in a variety of situations. For example, FIG. 7 schematically illustrates implementation of another exemplary method 700 for use in estimating a parameter of a spacecraft. Method 700 includes first portion 700' relating to generating and refining an N-dimensional lookup table based on a priori known parameters of a spacecraft, and second portion 700" relating to using such an N-dimensional lookup table to estimate a parameter of an unknown spacecraft.

As illustrated in FIG. 7, first portion 700' includes using a sensor 701 to obtain spectroscopic image 702 of a plume 20' of known spacecraft 10' such as a shuttle orbiter. First portion 700' also includes using fundamental science understanding 703, combined with a priori known information about spacecraft 10', such as shuttle orbit and engine data 704 that can be obtained from the National Aeronautics and Space Administration (NASA) or from NASA's Solar Terrestrial Probes (STP) program 705, to obtain a science based model 706 of the effect of different parameters upon emissions resulting from molecular products of interactions between atmospheric gases and molecular species in plume 20' from spacecraft 10'. The SOCRATES DSMC code represents one exemplary model 706 that can be used to generate and refine N-dimensional lookup table 707 based upon fundamental science understanding 701 and a priori known information about spacecraft 10', e.g., shuttle orbit and engine data 704. Lookup table 707 can include any suitable number of dimensions corresponding to parameters such as angle of attack, atmospheric density, engine thrust, and the like. Fundamental science understanding 703 and science based model 706 can be iteratively refined by comparing information about simulated plumes, e.g., simulated image 708, to spectroscopic image 702, and by refining N-dimensional lookup table 707 based on the refinements to understanding 703 and model 706 so as to bring spectroscopic image 702 and simulated image 708 into better agreement with one another.

Second portion 700" includes using a sensor to obtain spectroscopic image 713 of a plume 20" of unknown spacecraft 10". In one illustrative example, the sensor includes a pair of sensors 711, 712 that respectively obtain two-dimensional spectroscopic images 714, 715 that are three-dimensionally reconstructed to obtain spectroscopic image 713, which can include a three-dimensional radiant field. Optionally, second portion 700" also includes obtaining a priori known information about spacecraft 10", such as spacecraft or missile orbit, engine, and mass data 716 that can be obtained from the National Aeronautics and Space Administration (NASA) or from NASA's Solar Terrestrial Probes (STP) program 705 (e.g., in the case where implementation of the method is being demonstrated using an "unknown" spacecraft 10" that is actually a known NASA spacecraft), or using technical intelligence 717. Three-dimensional radiant field 713 of actual spacecraft 10" is compared to simulated three-dimensional radiant fields within lookup table 707, and the simulated emission having the radiant field that most closely matches three-dimensional radiant field spectroscopic image 713 can be selected. Note that based upon one or more parameters of spacecraft 10" being known a priori, only the subset of the information within lookup table 707 that is consistent with such a priori known information need be compared to three-dimensional radiant field 713 of spacecraft 10". One or more parameters of spacecraft 10", such as angle of attack (AoA, a), view aspect ($\theta,\varphi$), and thrust magnitude (lbf) 718 can be estimated based on the selected simulated emission indicated in FIG. 7 with the dashed red square. Note that because the radiant field of the simulated emission may not necessarily exactly match the radiant field of image 713, the values of one or more of such parameters can be interpolated based on the simulated emissions within lookup table 707 and spectroscopic image 713, e.g., three-dimensional radiant field.

Additional information can be obtained based upon the estimated and, if applicable, a priori known, parameters of spacecraft 10". For example, as illustrated in FIG. 7, second portion 700" can include calculating the thrust vector (F) 719 of spacecraft 10" in a manner such as described herein.

Note that steps such as included in second portion 700" suitably can be repeated for any new orbit or target 720, e.g., for any motion or other change of spacecraft 10" at a different time, or for any other suitable spacecraft, or both.

In one illustrative example, the mass of an orbiting spacecraft can be extracted by observing the plume emission from an engine burn and tracking the resulting change in orbital parameters. That is, based upon estimated parameters of the spacecraft, the value of the engine thrust vector F and the spacecraft acceleration vector a can be determined, and then the spacecraft mass m can be extracted by applying Newton's Second Law of motion (F=ma).

The orbit of the spacecraft, which can be expressed as a Two-line Element set defining the orbit of a satellite (TLE), can be determined, which allows determination of the spacecraft's velocity (V) and point (P) in three dimensional space, which can be expressed as a state vector at any time. The TLE of various spacecraft are provided online, e.g., such as at celestrak.com/NORAD/elements/, www.cloudsat.cira.colostate.edu/dcpstatusElements.php, and spaceflight.nasa.gov/realdata/tracking/index.html.

The plume radiance, which results from atmospheric interaction in a spectral band for which the excitation mechanism is known and can be modeled accurately, then is observed. Such observation can include identifying the beginning time, $t_1$, and ending time, $t_2$, of a burn ($D_t=t_2-t_1$). Such observation also can include acquiring a steady state two-dimensional (2D) image of the plume radiance, which can be expressed as Rss(X',Y'), where X' and Y' are the image plane coordinates. As noted above, such an image can be obtained using one or two sensors (respectively producing mono or stereo images), and the location of the image in space being known. Steady state is generally reached within one to five seconds after ignition (depending on ambient number density).

Based on the known spacecraft TLE, the spacecraft velocity, $V_1$ ($V_{x1}$, $V_{y1}$, $V_{z1}$), and position, $P_1$ ($X_1$, $Y_1$, $Z_1$) before the burn can be determined at time $t_1$ in Earth Centered Inertial (ECI) coordinate reference frame (which can be defined as having an X axis toward the first point in Aries in the celestial sphere, a Z axis through the north pole, and a Y axis to make a right handed Cartesian frame).

The location of the spacecraft can be determined based on Xs' and Ys' in image planes in the image(s) from P1 and knowledge of image sensor(s) pointing.

The plume image(s) then can be "inverted" so as to estimate one or more parameters of the spacecraft based on the estimated composition of the ambient atmosphere adjacent to the spacecraft (e.g., absolute number density and O-atom mole fraction), known ECR spacecraft speed, and a comparison of the two-dimensional or three-dimensional plume image to three-dimensional radiant fields in the lookup table. For example, the thrust magnitude, F, can be estimated through image matching and interpolation. Or, for example, angle of attack (AoA), and thrust azimuth about the ECR velocity vector can be extracted from the comparison but are not needed to establish spacecraft mass. The angle of attack (AOA) can be expressed as the angle between the thrust vector and the spacecraft velocity vector relative to a stationary atmosphere. The atmosphere is approximately stationary in an Earth Centered Rotating (ECR) reference frame, which can be defined as having an X axis toward 0,0 Lat, Long, a Z axis through the North Pole, and a Y axis to make a right handed Cartesian frame. In one illustrative embodiment, absolute number density, O-atom mole fraction, vehicle ECR speed, AoA, and thrust magnitude would define dimensions of the N-dimensional lookup table. Additional atmospheric parameters, which can define additional lookup table dimensions, can include ambient temperature, motion relative to earth surface below, and mole fraction of other species ($O_2$, $N_2$, N, $H_2$, He, Ar, e−). Note that atmospheric parameters such as composition of the ambient atmosphere can be determined or estimated from known burn duration, past and present solar activity, and atmospheric models (such as MSIS90E) although direct measurements from spacecraft drag or other methods can alternatively be used.

As noted further above, for a mono plume image, F, AoA, and azimuth can be estimated by generating two-dimensional images from the three-dimensional radiant fields stored in the lookup table, and comparing the mono plume image to the two-dimensional simulated images. Alternatively, for stereo plume images, a 3D radiance field can be constructed based on the stereo plume images and compared directly with the pre-computed simulated 3D plume radiance fields in the lookup table so as to estimate F, AoA, and azimuth. In one illustrative embodiment, such comparisons and matching can be facilitated through characterizing the 3D distributions by 3D polynomial elements such as spherical harmonics.

The directional thrust vector, F, may not necessarily be needed but can be determined from the thrust magnitude (F), AoA, and thrust azimuth angle. The spacecraft post burn TLE can be estimated through tracking of the spacecraft's new orbit and computing $V_2$ at end of burn time $t_2$. The spacecraft's acceleration during the burn can be calculated from $a=(V_2-V_1)/(D_t)$. The spacecraft mass can be estimated based on $m=|F/a|$, where F is the thrust magnitude.

Figure 8:
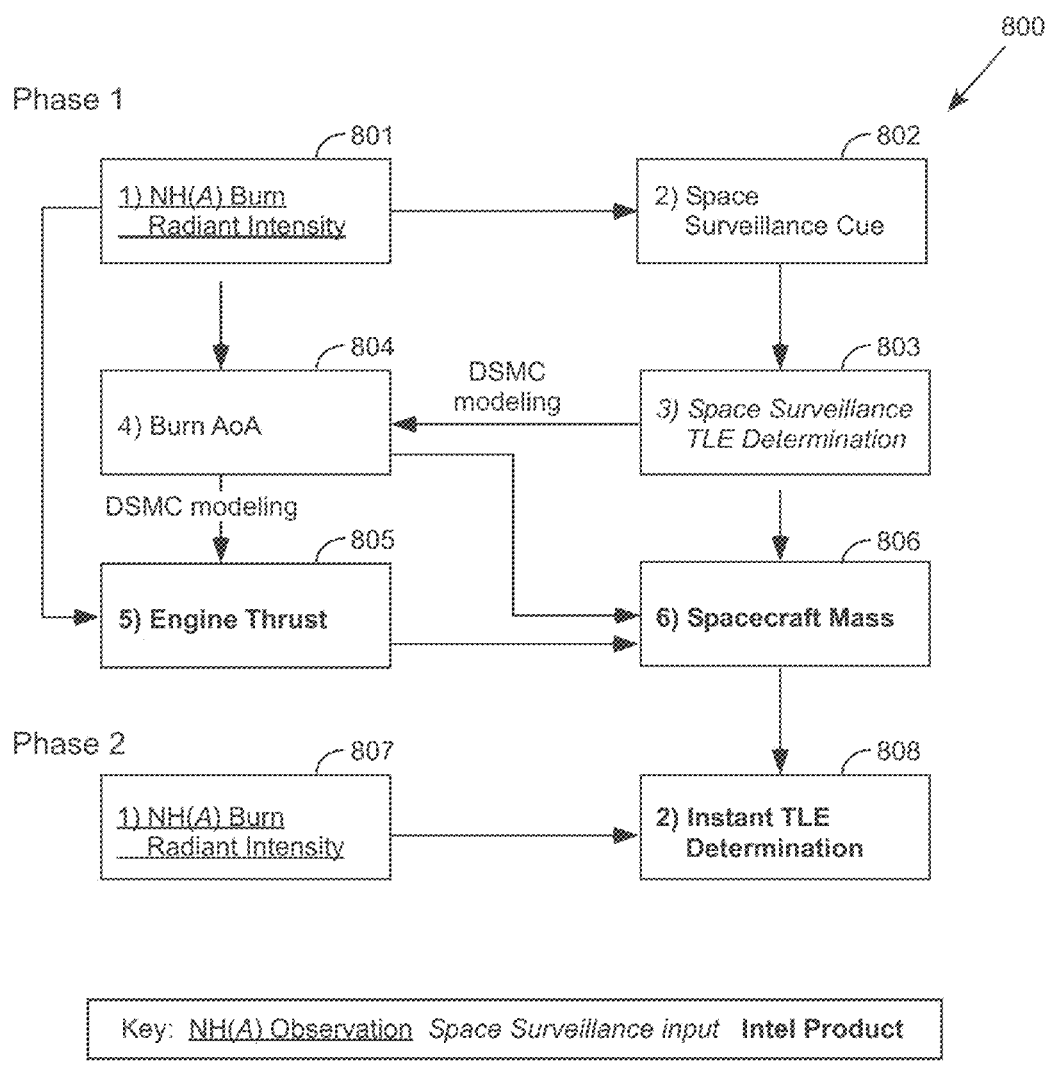
FIG. 8 illustrates another exemplary method for use in estimating a parameter of a spacecraft, according to some embodiments of the present invention.

FIG. 8 illustrates another exemplary method 800 for use in estimating a parameter of a spacecraft. "Phase 1" of method 800 includes measuring the radiant intensity of an emission from an atomic or molecular product such as NH(A) during a first burn of a spacecraft, e.g., by obtaining a first spectroscopic image of the emission (step 801). "Phase 1" of method 800 also includes obtaining one or more cues regarding the spacecraft using space surveillance (step 803). "Phase 1" of method 800 also includes estimating the angle of attack (AoA) of the burn, e.g., using DMSC modeling, e.g., by comparing the first spectroscopic image to information in a lookup table such as provided herein, and using any surveillance cues so as to exclude portions of the lookup table as being inconsistent with known information about the spacecraft (step 804). "Phase 1" of method 800 also includes estimating the engine thrust resulting from the burn, e.g., using DMSC modeling, e.g., by comparing the spectroscopic image to information in a lookup table such as provided herein, and using any surveillance cues so as to exclude portions of the lookup table as being inconsistent with known information about the spacecraft (step 805). "Phase 1" of method 800 also includes estimating the spacecraft mass in a manner such as described above (step 806). "Phase 2" of method 800 includes measuring the radiant intensity of the emission from an atomic or molecular product such as NH(A) during a second burn of the spacecraft, e.g., by obtaining a second spectroscopic image of the emission (step 807). "Phase 2" of method 800 includes estimating the TLE of the spacecraft on an "instant" basis, that is, without necessarily obtaining additional information beyond that obtained or estimated in steps 802-806, based on the previously estimated spacecraft mass and the spectroscopic image of the second burn (step 808).

In yet another exemplary method, the orbital elements (TLE) of an orbiting spacecraft can be estimated using known techniques. The total radiant energy of photons detected from an atomic or molecular product, such as NH(A), resulting from an orbit changing burn can be measured by integrating the detected photons from a suitable sensor (e.g., a ground based or space based sensor), correcting for quantum detection efficiency, transmittance along the line of sight path, and range. The new TLE of the orbiting spacecraft can be estimated using known techniques. The velocity vector change, $\Delta V$, can be calculated based on the difference between the TLEs. The thrust vector direction required to produce such a $\Delta V$ can be calculated so as to define an atmosphere relative AoA for the maneuver. Using a DSMC computer modeling code, such as SOCRATES, and knowledge of the velocity dependent cross section of the atomic or molecular product, the impulse I equal to thrust (F) times the duration of the burn ($\Delta t$) required to produce the measured radiant energy at the determined AoA can be estimated. The mass of the spacecraft can be computed from $m=I/|\Delta V|$.

In yet another example, certain assumptions or approximations can be made regarding certain parameters of a spacecraft so as to simplify the estimations of other parameters of the spacecraft. For example, referring to the parameters described above with reference to FIG. 1B, it can be assumed that a burn is performed with constant thrust (F), at a constant angle of attack relative to the atmosphere (AoA), for a time interval ($\Delta t$). At and stereoscopic images of the steady state radiant emission resulting from atmospheric interaction can be used in combination with what is normally known about an Earth orbiting spacecraft, e.g., V, $\theta_1$, $\theta_2$, $R_1$, $R_2$, $\varphi_2-\varphi_1$, and the location of the maneuvering spacecraft are known; while $\varphi_2$, $\varphi_1$, AoA, and F are unknown.

Plume radiance can be computed from the parameters that define a burn scenario, including F, by plume codes, such as SOCRATES, using the Direct Simulation Monte Carlo (DSMC) method. Images of the plume radiance can be "inverted" to determine F parameters of particular interest, such as F and Angle of Attack (AoA). Another parameter that can vary significantly depending on the particular environment of the spacecraft is the ambient atmospheric number density (n), but to a reasonable approximation, a steady state radiant flowfield can be assumed to scale spatially inversely with n. Accordingly a flowfield computed at a representative value, say $10E8$ $cm^{-3}$, can be scaled to densities significantly higher and lower without needing to be computed by SOCRATES. Additional parameters can simply be eliminated due to insensitivity to them or unlikely variation in them.

The following is one example of an inversion algorithm for determining F from NH(A) radiance observed from a maneuver of a spacecraft using monopropellant hydrazine thrusters:

1. Define SOCRATES Brook core flow input parameters for a typical 1 lbf monopropellant hydrazine thruster, where gamma corresponds to the ratio of specific heats of the plume gases, and the mach number corresponds to the ratio of the speed of the plume gases to the speed of sound in the plume:

| | |
|---|---|
| a. GAMEXH = 1.3 | ! Exhaust gamma |
| b. ZME = 3.0 | ! Mach Number |
| c. THEXD = 15.0 | ! Nozzle lip angle (deg) |
| d. ZNE = 5.77E17 | ! Exit number density (cm$^{-3}$) |
| e. AE = 0.628 | ! Exit area (cm$^2$) |
| f. UE = 2.29E5 | ! Exit gas velocity (cm/s) |
| g. SRCCMP(H2) = 0.4583 | ! Plume H$_2$ mole fraction |
| h. SRCCMP(N2) = 0.2917 | ! Plume N$_2$ mole fraction |
| i. SRCCMP(NH3) = 0.2500 | ! Plume NH$_3$ mole fraction |

2. Define SOCRATES input parameters for a typical LEO atmosphere, where the atmospheric total number density can be calculated based on the TLE of the spacecraft using the MSIS 90E model available at omniweb.gsfc.nasa.gov/vitmo/msis_vitmo.html:

| | |
|---|---|
| a. TINF = 800.0 | ! Atmospheric Temperature (K) |
| b. ZNINF = 1.00E+08 | ! Atmospheric Total Number Density (Molecules/cm$^3$) |
| c. SPINF(O) = 0.89031 | ! Atmospheric Mole Fraction of O |
| d. SPINF(N2) = 0.07252 | ! Atmospheric Mole Fraction of N$_2$ |
| e. SPINF(O2) = 0.00178 | ! Atmospheric Mole Fraction of O$_2$ |
| f. SPINF(HE) = 0.01554 | ! Atmospheric Mole Fraction of HE |
| g. SPINF(N) = 0.01845 | ! Atmospheric Mole Fraction of N |
| h. SPINF(H) = 0.00140 | ! Atmospheric Mole Fraction of H |
| i. SPINF(AR) = 0.00001 | ! Atmospheric Mole Fraction of AR |

3. Define SOCRATES input parameter for a probable LEO atmosphere relative velocity:

| | |
|---|---|
| a. UINFD = 7.4e5 | ! Free stream or vehicle velocity (cm/s) |

4. Run SOCRATES to convergence for all combination of the following parameters:
   a. Engine exit area (AE) multiplied by exemplary values such as 1, 3, 9, 27, 81, 243, 729 and representing those values in engine thrust in lbf
   b. AoA (ATTACK(1)) exemplary values of 0, 30, 60, 90, 120, 150, 180 (degrees)
5. Store the SOCRATES.RST files (~10 Mbytes each) from all 49 runs as the LUT database (~490 Mbytes)
6. Image the 336 nm steady state radiance of a spacecraft maneuver extending to 1% of peak radiance (or other suitable threshold value) from two independent platforms (relevant imaging parameters are shown in FIG. 1B), and measure Δt from the observed duration of constant radiant emission.
7. Determine the ambient atmospheric density, n, at the location of the maneuvering spacecraft from MSIS90E atmospheric model, and scale the images spatial dimensions by 1E8/n and intensities by (1E8/n)$^3$.
8. For exemplary values of $\varphi_1$=0, 45, 90, 135, 180, 225, 270, and 315 deg ($\varphi_2$ can be defined using $\varphi_2$-$\varphi_1$, which is known and constant) generate simulated plume images from P$_1$ and P$_2$ registered for scale, pixel resolution, location of the maneuvering spacecraft, and projection of the V from all 49 SOCRATES.RST files (392 image pairs). Except for ATTACK(1)=0 and 180 degrees, $\varphi_2$-$\varphi_1$ is meaningful, but $\varphi_1$ is not necessarily meaningful, and only one pair of images is needed, reducing the image pairs required by 14 redundant pairs to 378.
9. Compute a figure of merit for each pair of simulated plume images as the sum of the absolute value of the differences of all the pixel intensities in the actual image and the corresponding simulated image.
10. For the value of $\varphi_1$ from the best fit, generate simulated plume images as before for exemplary values of that $\varphi_1$±5, ±10, ±15, ±20 deg (392 image pairs) and compute figures of merit as before.
11. For the value of $\varphi_1$ from the best new fit perform a parabolic fit to the figures of merit from the adjacent thrust values to find the thrust, F, corresponding to a minimum in the figure of merit.

The mass of a spacecraft also can be determined based on its change in orbit, generally described by a Two-Line Element set (TLE), resulting from an engine burn. TLEs are determined routinely through satellite tracking. The change in spacecraft velocity (ΔV) from the engine burn can be determined easily from the TLE before and after the engine burn. For example, the acceleration (a) during the burn can be computed from the change in velocity during the burn:

$$a = \Delta V / \Delta t.$$

The spacecraft mass then can be determined from application of Newton's Second Law:

$$m = F/a.$$

Note that a TLE set after a maneuver can be determined over a period of time by tracking a spacecraft after the maneuver, which can take an undesirable amount of time. If the spacecraft mass is already known, the maneuver observation described above has the capability of determining the new TLE quickly.

The direction of the thrust vector F can be defined by $\varphi_1$ and the AoA. The spacecraft velocity vector after the maneuver, V$_2$, can determined by application of Newton's Second Law by the exemplary relation:

$$V_2 = V_1 - a\Delta t \quad (3)$$

where V$_1$, the spacecraft velocity vector before the maneuver, is computed from the pre maneuver TLE. The post maneuver TLE can be easily determined from the pre maneuver TLE and V$_2$.

Additionally, note that any plume emission from atmospheric interaction that can be modeled by SOCRATES can be used for the above described determination, such as other ultraviolet, visible, and infrared radiant emissions. In this regard, a lookup table can be generated, for example, using the Brook core flow inputs for the relevant type of engine and propellant.

Additionally, note that in principal any of the independent input parameters to SOCRATES, if unknown, can be determined from a burn observation by including one or more of such parameters as added dimensions to a lookup table. As in step 4, above, a range of equally spaced values of the desired parameter covering the expected resultant value can be included for multiplicative permutations of the lookup table set. The value producing the best figure of merit can guide determination of the best estimated value by a parabolic fit as described in step 11, or any other suitable fit.

Additionally, it should be appreciated that a variety of techniques can be used to identify a match between an observed plume and pre-computed plumes. In one nonlimiting example, the comparison between 2D images or 3D radiance fields can be characterized using a single number figure of merit. One exemplary approach to doing so can involve the following procedure.

First, represent the pre-computed radiance fields in 3D arrays of radiance values of equally spaced points in 3D Cartesian space of nx, ny, & nz dimensions. The spacecraft ECR velocity can be defined to be in the +x direction and the thrust vector can be defined to be in the xz-plane. The spacecraft location can be defined to be at the center of the array. Current plume codes, such as SOCRATES, have the capability to generate such arrays.

The measured radiance field extracted from inversion of stereo plume images can be represented by a 3D array with identical spatial dimensions. Because the spacecraft location in space and velocity vector can be known, the array can be computed with the spacecraft in the center and the ECR velocity vector in the +x direction. The y dimension can be made parallel to the local earth's surface.

A matching figure of merit can be computed by a simple sum of the differences of all the elements of the two arrays.

Identification of the orientation of the thrust vector can be obtained by iterative rotation and remapping of the measured plume array about the x-axis through the spacecraft and re-computation of the array differences. In one example, initial rotation can be 30 degrees in one direction. If the difference figure, increased the rotation angle can be divided, e.g., halved and the direction reversed. Iterations can continue until the angle increment dropped below a threshold value, such as 1 degree. Interactive Data Language (IDL) has the capability to perform the necessary matrix math.

Other suitable methods of estimating spacecraft parameters based on emissions from plume products readily can be envisioned. An exemplary emission, and the use thereof to estimate one or more spacecraft parameters, is described below. It should be appreciated that other exemplary emissions suitably can be used in an analogous manner to estimate one or more spacecraft parameters.

EXAMPLE

1. Introduction

Ultraviolet (UV) emissions at 336 nm observed in space shuttle orbiter engine plumes remotely from the ground and space have been attributed to trace amounts of ammonia in the exhaust reacting with atmospheric atomic oxygen. Commonly used, relatively stealthy mono-propellant hydrazine thrusters produce ammonia as a principal exhaust product. As provided herein, Low Earth Orbit (LEO) spacecraft maneuvering using this popular type of thruster can produce an observable UV emission that potentially can reveal intelligence important to Space Situational Awareness (SSA). Such intelligence can include, but is not limited to, spacecraft mass, post-maneuver state vector, and estimate of remaining propellant.

1.1 Original Shuttle Observation

Figure 9:
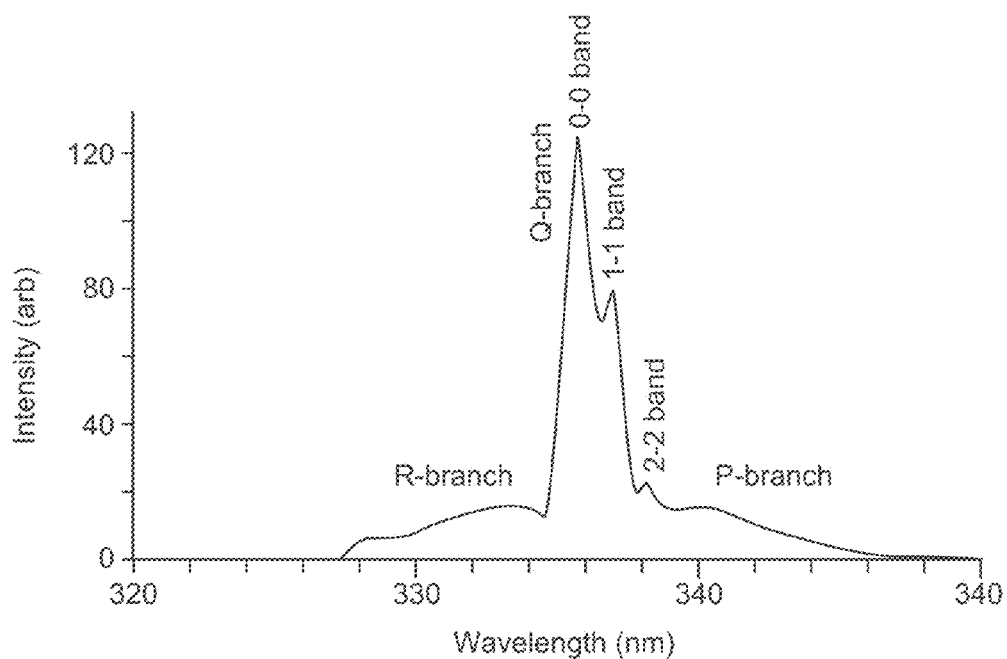
FIG. 9 illustrates a plot of NH(A→X) emission seen from Space Shuttle PRCS engines (shaded area) and synthesized NH(A→X) spectrum (line), showing unmistakable assignment and relatively prominent nature of Q-branch emission. Adapted from Viereck et al.

In 1990, a spectrograph co-aligned with Air Force Maui Optical Station (AMOS) telescopes tracking the space shuttle orbiter measured the spectrum from the interaction of the Primary Reaction Control System (PRCS) thruster's exhaust plume with the residual atmosphere. Pronounced UV emission, centered at 336 nm, was identified as being from the A first electronic excited state of the imino radical, NH(A). For further details, see Viereck et al., mentioned further above. The prompt emission to the X ground state, NH(A→X) shown in FIG. 9, can be characterized by relatively strong, spiky Q-branches, with P- and R-branch shoulders.

This emission has been observed in other on-orbit shuttle engines fueled by monomethyl hydrazine (MMH), with nitrogen tetroxide ($N_2O_4$) used as the fuel oxidizer.

Figure 10:
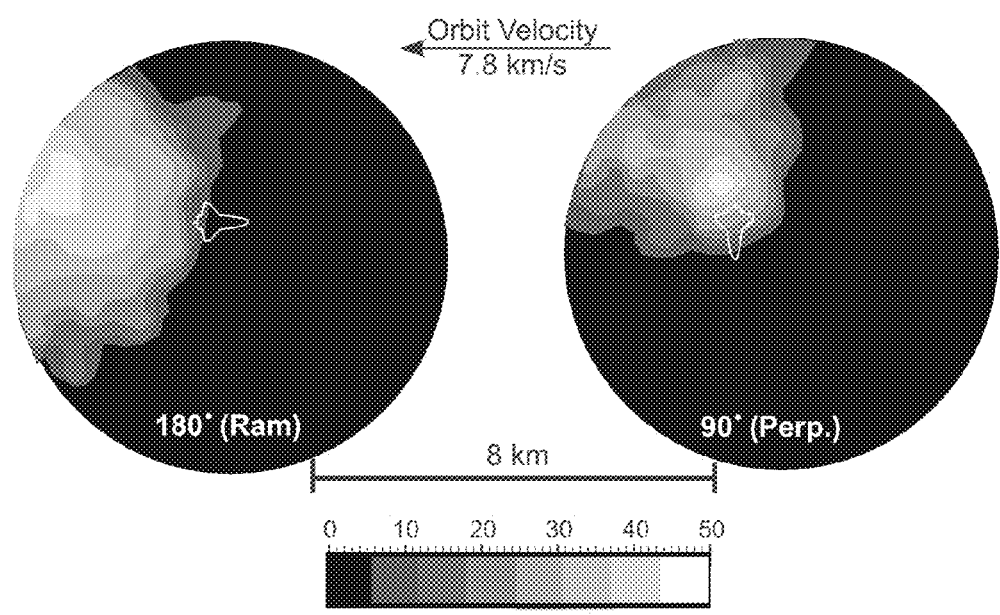
FIG. 10 illustrates radiance measured by AMOS in 300-350-nm band from ram and perpendicular burns of dual PRCS engine burns on STS-41 at 290 km altitude. Intensity units are kilo Rayleigh (kR). Shuttle orbiter is not to scale but shown to indicate the approximate location of the engines' exit plane.

Quantitative UV radiance measurements were made from a dedicated experiment on Space Transportation System flight 41 (STS-41). For further details, see Viereck et al. FIG. 10 shows images of NH(A→X) emission observed by AMOS from exhaust directed into the ram, where "ram" represents the oncoming atmosphere through which the spacecraft is orbiting, and perpendicular to the ram of dual, co-aligned PRCS engine burns. The total steady-state power of the ram and perpendicular burns was 700 W and 400 W, respectively. A wake-directed burn was below the 200-Rayleigh intensity threshold of the sensor. The ram burn steady-state power corresponds to 1.5E-5 UV photons per exhaust molecule.

Without wishing to be bound by any theory, as discussed in greater detail herein, the reaction:

$$O+NH_3 \rightarrow NH(A)+H_2O \quad (R1)$$

is believed to be the most likely source of the radiating NH(A), involving a relatively minor amount of ammonia, $NH_3$, in the plume reacting with prevalent O-atoms in the high-altitude atmosphere. NH(A) can be expected to have a radiative lifetime of approximately 0.43 μs, and reaction (R1) is believed to be followed with a subsequent reaction:

$$NH(A) \rightarrow NH(X)+hv \quad (R)$$

that emits a photon having a wavelength at approximately 336 nm. Reaction (R1) has been estimated to have an 8 km/s $O+NH_3$ relative collision velocity threshold, determined through analysis of on-orbit space shuttle experiments, to form NH(A). The additional approximate 0.6 km/s required to overcome the approximate 8 km/s threshold can come from any suitable source, e.g., from any suitable combination of the Maxwell-Boltzmann velocity distribution of O-atoms in the atmosphere adjacent to the spacecraft, $NH_3$ source velocity, or statistical $NH_3$ collisional velocity changes. For example, some molecular species in a plume can have a velocity of approximately 3-4 km/s. Accordingly, the relative closeness of the threshold velocity for Reaction (R1) to the orbital velocity of a spacecraft can make the amount of NH(A) generated, and thus the number of photons generated in Reaction (R), relatively dependent on the thrust direction of the spacecraft's engine relative to the ram. For example, plumes that are emitted directly into the ram can include molecular species with velocities of about 10 km/s or higher, and thus can produce a relatively large proportion of the NH(A) molecular product, while plumes that are emitted directly into the wake can include molecular species with velocities of about 3-4 km/s, and thus can produce a relatively low proportion of the NH(A) molecular product, while plumes that are in between the ram and the wake can include molecular species with velocities that are closely based on the angle of the engine relative to the ram and the wake, and accordingly can produce a proportion of the NH(A) molecular product that is closely based on the angle of the engine relative to the ram and wake.

1.2 Potential Application

Ammonia is an expected trace or minor species in the exhaust of the amine-fueled bipropellant space shuttle engines, but the actual concentration is believed to be currently unknown. What is known is that monopropellant hydrazine thrusters typically have a 25% to 45% ammonia mole fraction in their exhaust. Such thrusters form part of many satellites' on-orbit propulsion systems for attitude control and orbit changes. Such systems are relatively stealthy because they are generally low thrust, and among their $N_2$, $H_2$, and $NH_3$ exhaust products, only $NH_3$ is infrared (IR) active. IR emission from monopropellant exhaust $NH_3$ has been detected by remote sensors, but UV emission can be expected to be easier to detect, e.g., can be anticipated to be more intense and relatively easily detectable from great distances. Remote detection of this UV emission can be expected to be useable to decipher maneuvers of satellites or other spacecraft using monopropellant thrusters. Decipherable information from such detections include spacecraft mass, intended rendezvous or intercept target, and remaining propellant.

Without wishing to be bound by any theory, the present example describes an exemplary scientific basis on which Reaction (R1) is believed to be the source of NH(A→X) emission. This example also describes a basis on which the $NH_3$ mole fraction in the shuttle engine exhaust, a useful number to estimate emission intensities, is estimated. Monopropellant intensities are estimated as a function of the sensitive independent variables: angle of attack (AoA), engine thrust, and atmospheric number density. Detectability is estimated for ground-based and space-based sensors.

2. Mechanism

Without wishing to be bound by any theory, Reaction (R1) has been identified as a likely source of the UV emission. More specifically, NH(A→X) emission intensity has been observed to initially grow linearly with time immediately after ignition, likely indicating a simple one-step interaction between an atmospheric species, A, and a plume precursor species, B:

$$A + B \rightarrow NH(A) + C, \quad (R2)$$

where C represents a second reaction product or reaction products necessary to balance the atoms involved. In contrast, an induction behavior with higher-order time dependence of intensity likely would indicate a more complex, multiple-step process. See Dimpfl et al., mentioned further above.

Shuttle PRCS burns performed into the ram, perpendicular to the ram, and opposite to the ram (wake direction) indicate a strong dependence on the AoA of the plume relative to the ram. For further details, see Viereck et al. This sensitivity is believed to indicate a threshold relative collision velocity between atmospheric species A and plume species B that is relatively close to the velocity of the orbiting shuttle relative to the residual atmosphere (approximately 7.4 km/s). A subsequent experiment, using a radiometer in the shuttle bay, observed 336-nm UV VRCS plume interaction intensity at seven equally spaced AoAs between the engine thrust vector and vehicle velocity through the atmosphere, from ram to wake. For further details, see Viereck et al. The SOCRATES Direct Simulation Monte Carlo (DSMC) code, developed by the Air Force Research Laboratory (AFRL) and Spectral Science, Inc. (SSi), was used to analyze the complexities of the plume flow field and the in-situ field of view of the instrument, and to estimate the threshold relative collision velocity between A and B for Reaction (R2) as being approximately 8 km/s.

2.1 Thermochemistry

Without wishing to be bound by any theory, this 8-km/s threshold and the identity of the radiating species, NH(A), are believed to be important constraints, that can limit the identity of A and B. Candidate reactions are believed to include those where A includes a principal ground electronic state species of the atmosphere: O, $N_2$, $O_2$, N, Ar, $H_2$, H, He, O+, or N+; and where B includes one or more atomic species of the propellants: N, H, C, and O. The minimum relative collision velocity between A and B to produce the energetic NH(A) product can be expressed as:

$$V_{rel}(\text{km/s}) = 8.38E5 \sqrt{\frac{\Delta H(\text{kcal/mole})}{\mu(AMU)}}, \quad (1)$$

where μ is the A B reduced mass and ΔH is the enthalpy of Reaction (R2). Reactions (R1) and (R3) through (R18), shown in Table 3, include what are believed to be plausible reactions that satisfy the criteria of generic Reaction (R2) along with the relative collision velocity computed by Eq. (1) from the heats of formation shown in Table 4.

TABLE 3

Hypothetical Candidates for Generic NH(A) Forming Chemiluminescent Reaction (R2)

| Reaction # (R2) | Atm. Species (A) | Plume Precursor (+B) | Radiating Product (→ NH(A)) | Other Product(s) (+C) | Enthalpy (kcal/mole) (ΔH) | Min. Required Collision Velocity (km/s) |
|---|---|---|---|---|---|---|
| R3 | O | +HNC | → NH(A) | +CO | 37.31 | 5.6 |
| R4 | O | +HNCO | → NH(A) | $+CO_2$ | 41.69 | 5.7 |
| R5 | $O^+$ | $+NH_3$ | → NH(A) | $+H_2O^+$ | 38.53 | 6.3 |
| R6 | O | +HCN | → NH(A) | +CO | 49.14 | 6.4 |
| R7 | O | $+CH_2NH$ | → NH(A) | $+H_2 + CO$ | 50.33 | 6.4 |
| R8 | O | $+CH_2NH$ | → NH(A) | $+H_2CO$ | 52.51 | 6.5 |
| R9 | N | +HNO | → NH(A) | +NO | 49.95 | 6.6 |
| R1 | O | $+NH_3$ | → NH(A) | $+H_2O$ | 62.67 | 8.0 |
| R10 | O | +HNO | → NH(A) | $+O_2$ | 82.03 | 8.1 |
| R11 | N | $+NH_3$ | → NH(A) | $+NH_2$ | 107.03 | 10.8 |
| R12 | O | $+NH_3$ | → NH(A) | $+H_2 + O$ | 178.76 | 13.5 |
| R13 | $O^+$ | $+NH_3$ | → NH(A) | $+OH + H^+$ | 180.19 | 13.5 |
| R14 | O | $+NH_3$ | → NH(A) | +OH + H | 180.65 | 13.6 |
| R15 | $N^+$ | $+H_2$ | → NH(A) | $+H^+$ | 84.89 | 20.2 |
| R16 | N | $+H_2$ | → NH(A) | +H | 106.82 | 22.6 |
| R17 | $N_2$ | $+H_2$ | → NH(A) | +NH | 250.32 | 33.5 |
| R18 | H | +NO | → NH(A) | +O | 153.62 | 36.5 |

TABLE 4

Heats of Formation of Exemplary Atomic, Molecular, and Ionic Species at 0K

| Species | ΔHr (kcal/mole) | Species | ΔHr (kcal/mole) | Species | ΔHr (kcal/mole) |
|---|---|---|---|---|---|
| O | 58.99 | HNC | 44.22 | $N^+$ | 448.01 |
| N | 112.53 | HCN | 32.39 | $H^+$ | 365.18 |
| $H_2$ | 0 | HNO | 26.70 | $H_2O^+$ | 232.76 |
| NH | 82.60 | CO | −27.20 | $O^+$ | 373.00 |
| NH(A) | 167.72 | $CO_2$ | −93.96 | $H_2O$ | −57.10 |
| $NH_2$ | 40.80 | $CH_2NH$ | 31.20 | NO | 21.46 |
| $NH_3$ | −11.04 | OH | 9.25 | HNCO | −26.92 |

Among these reactions, and without wishing to be bound by any theory, only Reactions (R1) and (R3) through (R10) are believed to satisfy the thermochemical energy requirements for forming NH(A) from collisions at approximately 8 km/s, eliminating Reactions (R11) through (R18). Reactions (R3), (R4), (R7), and (R8) involve relatively reactive energetic species (HNC, HNCO, and $CH_2NH$), which are believed to be relatively unlikely to be present in the required concentration in the exhaust. Reactions (R5) and (R9) involve atmospheric species that are less than 0.1% mole fraction of the dominant O-atoms, and thus it is believed that these reactions would be relatively unlikely to produce the observed intensities. Reaction (R6), involving HCN, has been studied in the laboratory and found to not produce NH(A); for further details, see Orient et al., "Observation of CH(A→X) and (B→X) Emission in Gas-Phase Collisions of Fast O($^3$P) Atoms with HCN," Phys. Rev. A 48: 427-431 (1993), the entire contents of which are incorporated by reference herein. Without wishing to be bound by any theory, the remaining reactions:

| Reaction | Collision Vel. Threshold (km/s) | Reaction # |
|---|---|---|
| $O + NH_3 \rightarrow NH(A) + H_2O$ | 8.0 | (R1) |
| $O + HNO \rightarrow NH(A) + O_2$ | 8.1 | (R10) | are believed to be viable electron-spin-conserving candidates, satisfying the requirement of being plausible through relatively likely existence and concentrations of the reactants and having a thermochemical collision threshold that matches the modeling of shuttle observations.

2.2 Considerations

Without wishing to be bound by any theory, reaction (R1), involving $NH_3$ as a precursor, while energetically favorable, can in some regards be considered to be dynamically unlikely because it requires the approximately simultaneous transfer of two hydrogen atoms to make water in one step. Nonetheless, hydrogen atoms are relatively highly mobile, and similar reactions have been discovered. For further details, see Melius et al, "Energetics of the Reaction Pathways for $NH_2+NO \rightarrow$ Products," Proceedings of the 20$^{th}$ Symposium (International) on Combustion, p. 275, The Combustion Institute (1984) and Becker et al., "A Study of the Chemiluminescence from Oxygen Atom-Hydrazine Flames," J. Phys. Chem 71(2): 371-377 (1967), the entire contents of both of which are incorporated by reference herein.

Figure 11:
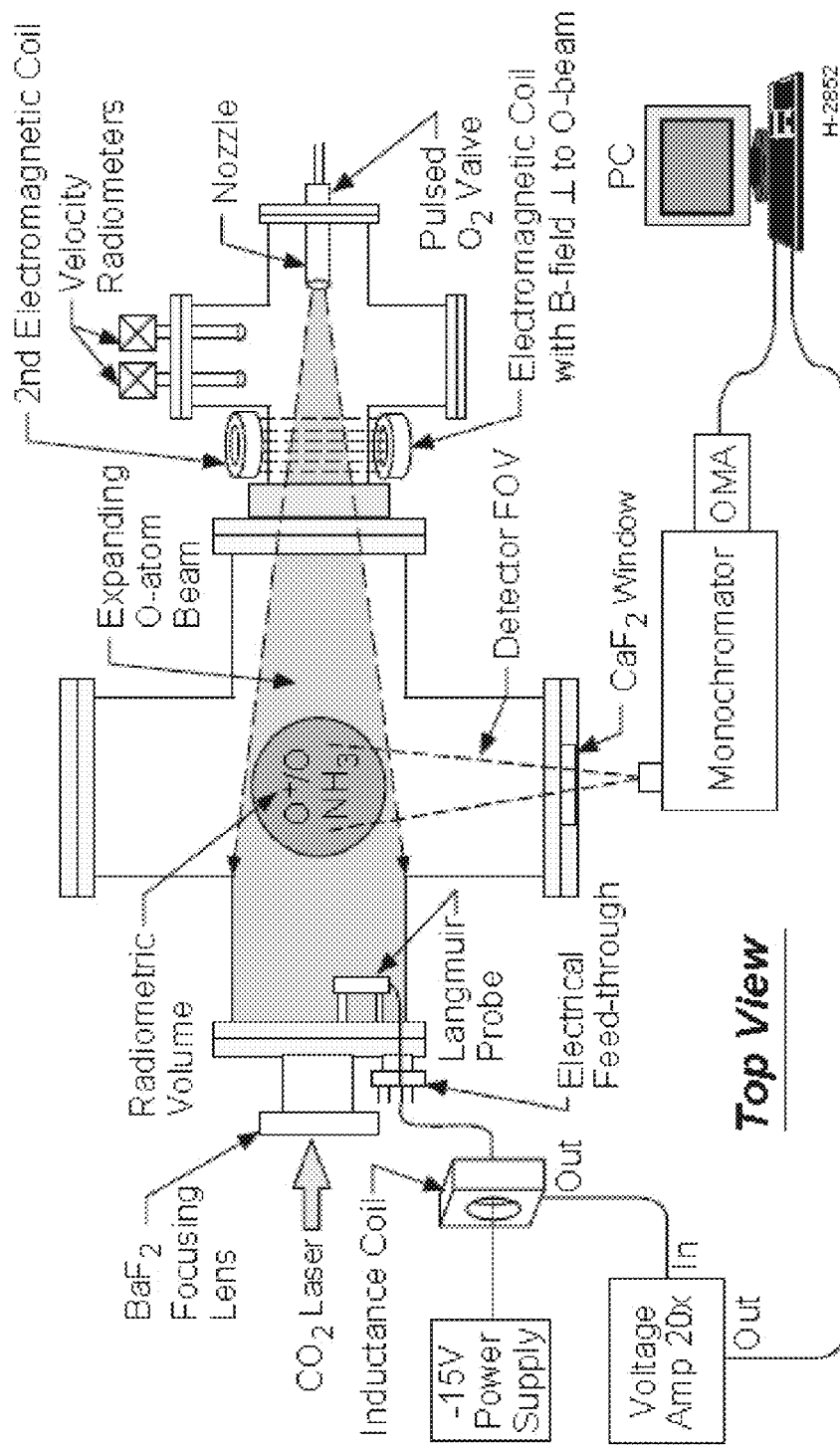
FIG. 11 illustrates an experimental apparatus used to spectroscopically characterize emissions from a molecular product of an interaction between atomic oxygen and ammonia, according to some embodiments.

The existence of Reaction (R1) was tested using a hyperthermal O-atom beam apparatus 1100 such as illustrated in FIG. 11, which focused a powerful $CO_2$ transversely excited atmospheric (TEA) laser into the throat of a pulsed $O_2$ nozzle beam source. The resulting hyperthermal plasma produced an O-atom-rich beam that was tuned from 6 to 12 km/s. Crossing the hyperthermal O-atom beam with a thermal $NH_3$ beam in a vacuum is believed to provide conditions for producing NH(A) by Reaction (R1). With a radiative lifetime of 0.43 µs, it is believed that any NH(A) formed radiated before traveling approximately 1 cm from the collision location in the apparatus, and was detected and identified by a spectrometer before colliding with the vacuum chamber wall. Apparatus 1100, which also included $O^+$ ions in the hyperthermal source, is believed to have demonstrated spectroscopically resolved NH(A→X) emission at collision velocities from 6 to 12 km/s. Magnetic deflection of O+ ions from the beam indicated an ionic reaction, likely Reaction (R5), at all source velocities from 6 to 12 km/s, and the appearance of a neutral O-atom reaction above the identified collision velocity threshold of 8 km/s, which are believed to provide support for the existence of Reaction (R1). For further experimental details, see Subsection 2.1.

Reaction (R10) was identified during a search for other possible candidates in the preparation of this example. HNO has been seen in emission in PRCS plume vacuum core, with a relatively unique HNO(Ã→X) spectrum consistent with the well-known three-body recombination process:

$$H+NO+M \rightarrow HNO(\tilde{A})+M \tag{R19}$$

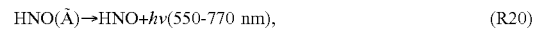

$$HNO(\tilde{A}) \rightarrow HNO+h\nu(550\text{-}770 \text{ nm}), \tag{R20}$$

where M is an atomic or molecular species required to remove energy to allow H and NO to bond. For further details, see Viereck and Bernstein et al., "Visible Spectra of Thruster Plumes from the Space Shuttle Primary Reaction Control System," Journal of Spacecraft and Rockets 30: 724-730 (1993). Without wishing to be bound by any theory, HNO is believed to be the only energetically allowed precursor from Reactions (3) through (19) with direct evidence of existence in the plume. HNO is relatively less stable than $NH_3$, however, and can be expected to be present in relatively lower mole fraction than $NH_3$.

Although Reaction (R10) is considered a viable candidate for explaining the observed NH(A→X) emission, it is believed that laboratory evidence supporting the existence of Reaction (R1) with a threshold in agreement with the space observations provides support for $NH_3$ being the principal precursor.

2.1. Experimental Details

As noted elsewhere herein, NH(A→X) emission, centered at 336 nm, is believed to have been observed in Space Shuttle Orbiter engine plumes and is believed to result from the interaction of the plumes and the residual atmosphere in low earth orbit. Ammonia can be considered to be a possible precursor to the observed NH(A) emission. Without wishing to be bound by any theory, it is believed that the activation energy, which can be estimated based on the dependence of NH(A) emission intensity on the angle of attack of engine thrust vector relative to the ram, indicates that Reaction (R1), $NH_3+O \rightarrow NH(A)+H_2O$, forming water by the approximately simultaneous transfer of two hydrogen atoms, based on ammonia being the precursor, is relatively likely. Crossed beam, single collision experiments, using a laser detonation source for generating hyperthermal O-atoms, from 6 to 12 km/s were used to examine the subject reaction. NH(A→X) spectral emission was believed to have been observed, and was attributed to two reaction paths. One path was believed to result from the reaction of ammonia with $O^+$, which is also present in the O-atom source. Experiments varying the velocity of the beam and deflecting ions by use of a magnetic field also demonstrated evidence for a neutral O-atom reaction with a threshold velocity between 8 and 10 km/s, which also is believed to provide evidence for Reaction (R1). As provided elsewhere herein, such results can be used to interpret spacecraft maneuvers and to quantify ammonia in plumes, and can support the understanding of long wavelength infrared (LWIR) emission from ammonia in plumes.

Understanding the mechanisms of processes that produce light emission based on spacecraft plumes can be useful for developing computer codes that can estimate such emissions from unknown spacecraft. Experiments utilizing ground based, space based, and on-board instruments to observe the rocket engine plumes from Space Shuttle Orbiters have been performed in support of developing such understanding. For further details, see Dimpfl et al. and Viereck et al., mentioned elsewhere herein, as well as Murad et al., "Visible light emission excited by interaction of space shuttle exhaust with the atmosphere," Geophys. Res. Lett., 17(12): 2205-2208 (1990), the entire contents of which are incorporated by reference herein. The plumes from the Orbiters' engines are believed to be particularly relevant to defense interests because they employ amine propellants in a manner analogous to unknown spacecraft that can be considered stressing to defense systems because such propellants can generate relatively faint radiant emissions as compared to other types of propellants.

Since Space Transportation System flight 41 (STS-41), which flew 6-10 Oct. 1990, atmospheric interaction of the amine fueled engines' exhaust from the Orbiters in Low Earth Orbit (LEO) has been known to produce ultraviolet (UV) emission from NH(A) (which can be referred to as the electronically excited imino radical), providing an emission band centered at 336 nm. For further details, see Viereck et al., as well as FIG. 9 adapted therefrom which shows an NH(A→X) emission spectrum from a Orbital Maneuvering System (OMS) engine plume observed from a range of 4300 km by the MSX satellite. The NH(A→X) emission has been characterized as having prominent, compressed Q-branches based on a similarity between the N and H interaction potentials between the A and X electronic states. Such spectral features can make the emission relatively easy to identify and see against more highly structured background emission in the same wavelength region, e.g., such as discussed elsewhere herein.

Analysis of on-board and ground based observations is believed to indicate the involvement of single-step chemistry between atmospheric atomic oxygen and a precursor plume species involving a high, approximately 65 kcal/mole, activation energy. These constraints limit the possible candidates for the precursor. The analysis in Viereck et al. identified the species HNCO, HCN, HNC, and $CH_2NH$ as potential precursors that satisfy these constraints, with $CH_2NH$ appearing thermochemically the most likely. Among these, HCN was relatively easily tested, the others being relatively difficult to generate in the laboratory. A laboratory experiment reacting O+HCN at relatively high collision velocities was believed to show that HCN was not the precursor. For further details, see Orient et al., mentioned elsewhere herein.

One complication with the remaining postulated precursors was in justifying the quantity required in the engine exhaust to explain the observed intensity of the emission. Not more than hundredths of a percent mole fraction are plausible, but an amount close to a percent is believed to be needed to explain the observed emission intensity. Parallel work on understanding another UV emission in plumes, that from the CO(a→X) Cameron bands such as described in Dimpfl et al., led to the belief that on the order of a percent mole fraction of methane ($CH_4$) can be present in methyl substituted amine fueled rocket plume exhaust. Observations are believed to be consistent with a percent of $CH_4$ in rocket exhaust and its presence at that level is believed to be supported in engine modeling studies as a consequence of its chemical stability. This work led to the understanding that ammonia ($NH_3$) could also be present in amine propellant plume exhaust in significant amounts. This rationale is based on ammonia being the nitrogen analog to methane, supported by similar heats of formation and reactivity with atomic oxygen. Ammonia is believed to be consistent with the experimentally determined constraints for producing NH(A) through Reaction (R1), $NH_3+O \rightarrow NH(A)+H_2O$.

Thermochemistry indicates a minimum relative $NH_3+O$ collision velocity of 8.2 km/s to meet the energy requirement for producing NH(A), consistent with the threshold from analysis of flight data. Reaction (R1) can be considered to be unusual because it can be expected to simultaneously transfer two hydrogens in a single bimolecular reaction. The general rule for bimolecular chemistry is that the dynamic constraints in the collision of the reactants in the gas phase favor the transfer of a single atom. Transfer of two hydrogens is in some respects unlikely, but is believed to happen in at least two other reactions: the well-known "Thermal DeNOx" reaction used in controlling emissions of the oxides of nitrogen, $NH_2+NO \rightarrow N_2+H_2O$, as described in Melius et al., mentioned elsewhere herein, and a reaction of atomic oxygen with hydrazine, $N_2H_4+O \rightarrow N_2H_2+H_2O$, described in Becker et al., mentioned elsewhere herein. Note that such reactions involve nitrogen, hydrogen and oxygen, but no carbon.

Without wishing to be bound by any theory, Reaction (R1) is testable in what is believed to be a definitive experiment. Ammonia is a readily available reagent and the product NH(A) can be relatively easy to detect through its prompt emission ($\tau=0.43$ μs) and distinct spectrum.

The production of NH(A) from the reaction of hypervelocity oxygen atoms (6 to 12 km/s) with ammonia was examined in a crossed beam experiment. A Fast Atom Sample Tester (FAST) apparatus was used to produce the hypervelocity oxygen atom beam normal to a supersonic beam of ammonia produced through a free-jet expansion from a pulsed molecular beam valve. For further details of FAST, see Caledonia et al., "A High Flux Source of Energetic Oxygen Atoms for Material Degradation Studies," IAAA Journal 25: 59-63 (1987), the entire contents of which are incorporated by reference herein. Emission from NH(A) produced by the hyperthermal collision of oxygen atoms (and residual oxygen ions ($O^+$)) with ammonia was observed normal to the plane of interaction of the two beams.

More specifically, FIG. 11 schematically illustrates the particular apparatus 1100 used to conduct the present experiments. Apparatus 1100 included two connected stainless steel six-way crosses, including an 8 in. cross source chamber housing the pulsed oxygen valve/nozzle assembly and a 16 in. cross expansion chamber. Apparatus 1100 was pumped by a cryopump (not specifically illustrated) attached to the large cross which maintained a base pressure of about $5 \times 10^{-6}$ torr. The hyperthermal (3 to 12 eV, tunable) oxygen atoms were generated in a pulsed laser discharge of $O_2$. A 10 J/pulse $CO_2$ TEA laser was focused with a 100 cm focal length $BaF_2$ lens into the throat of a 20-deg full angle, 12.5 cm long conical expansion nozzle which was partially filled with $O_2$ by a pulsed beam valve (General Valve). The plasma, ignited at the throat, expanded out the nozzle, dissociating the atomic or molecular oxygen in front of it.

The nozzle was designed to allow ion and electron recombination while the slower kinetics of atom/atom recombination maintained a relatively dissociated beam. The result, at 8 km/s, was an approximately 100 µs pulse of relatively dissociated oxygen (>90% atoms) with less than approximately 1% ion content.

The beam expanded from approximately 15 cm$^2$ at the exit aperture of the nozzle to greater than approximately 1000 cm$^2$ in the expansion chamber. The ion content of the beam was reduced by up to approximately 80% using a pair of magnetic coils arranged in a pseudo-Helmholtz configuration and positioned outside the vacuum system at the transition from the small to large cross.

The beam velocity was tuned between 6 and 12 km/s by varying the time delay between the pulsing of the $O_2$ valve and the triggering of the $CO_2$ laser. The delay determined the mass of $O_2$ processed by the pulsed discharge which was inversely related to the beam velocity. The velocity was determined by measuring the time of flight between two radiometers attached to the source chamber. The radiometers monitored the 5S-5P oxygen atom line at 777 nm. Characteristics of the oxygen beam at 8 km/s are summarized in Table A.

TABLE A

Summary of the Characteristics of FAST Oxygen Atom Source

| Characteristic | Value |
|---|---|
| 1a) Velocity | 8 km/s (6 to 12 km/s range) |
| 1b) Velocity Spread | ±15% of set velocity |
| 2) Fluence | 3 × 10$^{18}$/s (3 Hz) |
| 3) Composition | >90% atoms |
| 4) Ion content | <1% (controllable with variable magnet) |
| 5) O($^1$D) content | <0.4% |
| 6) Pulse width | 100 µs |

Reaction products were formed in the large cross expansion chamber by crossing the fast oxygen beam with a supersonic molecular beam formed from the reactant. For these experiments the reactant was ammonia and the reaction product of interest was NH(A). The ammonia beam was generated normal to and approximately 84 cm down-stream from the oxygen valve through a pulsed, target valve. The target valve was mounted on top of the large tank and is out of the plane of the FIG. 11 schematic. The backing pressure in the target valve was set to a few hundred torr which produced an intra-pulse density in the vacuum chamber that was believed to result in a single collision between the reactant gas and the fast oxygen atoms. Operation in the single collision regime was verified experimentally by demonstrating a linear relationship between the observed emission from the product and the target valve backing pressure.

NH(A) emission was detected through a 0.3 m, f/4.2 monochromator with a 700 pixel intensified Optical Multichannel Analyzer (OMA) detector. The monochromator included a 1200 grove/mm holographic grating blazed at 500 nm. The entrance slit width for the monochromator was set to 125 µm for these experiments and the spectral resolution was 0.59 nm (FWHM). The OMA was operated at a temperature of −10° C. in the continuous mode with exposure times ranging from 5 to 20 seconds. The spectrometer was positioned 84 cm downstream from the throat of the oxygen nozzle in front of a 50 mm diameter $CaF_2$ window on the large expansion chamber of the FAST apparatus as shown in FIG. 11. The full-angle field of view of the monochromator, given by the F/# was 13.6°. The diameter of the FOV at the center of the large expansion chamber was 9.8 cm. Because the width of the oxygen beam at the center of the monochromator FOV was about 40 cm, the monochromator viewed only about 5% of the radiating volume. For each measurement condition described in this example, spectra were collected both with the ammonia target valve turned on and off. The NH(A) emission spectra were background corrected by subtracting the spectrum recorded with the target gas absent from the spectrum recorded with the ammonia target gas present.

A Langmuir probe was used to measure the relative ion fluence per pulse for each oxygen beam velocity as a function of current through the electromagnets. The probe was mounted to and electrically isolated from the back wall of the large expansion chamber (FIG. 11) with threaded nylon rod, 112.7 cm from the throat of the oxygen expansion nozzle. The Langmuir probe was biased at −15V which is sufficient to repel electrons in the beam and collect all the O+ ions from the area of the hyperthermal oxygen beam that strikes the probe surface. The ion current was detected by passing the bias line through a calibrated (10 mV/amp) inductance coil. The inductance coil signal was amplified by 20× with a Stanford Research (SRS-560) voltage amplifier and monitored with a digital oscilloscope.

Figure 12A:
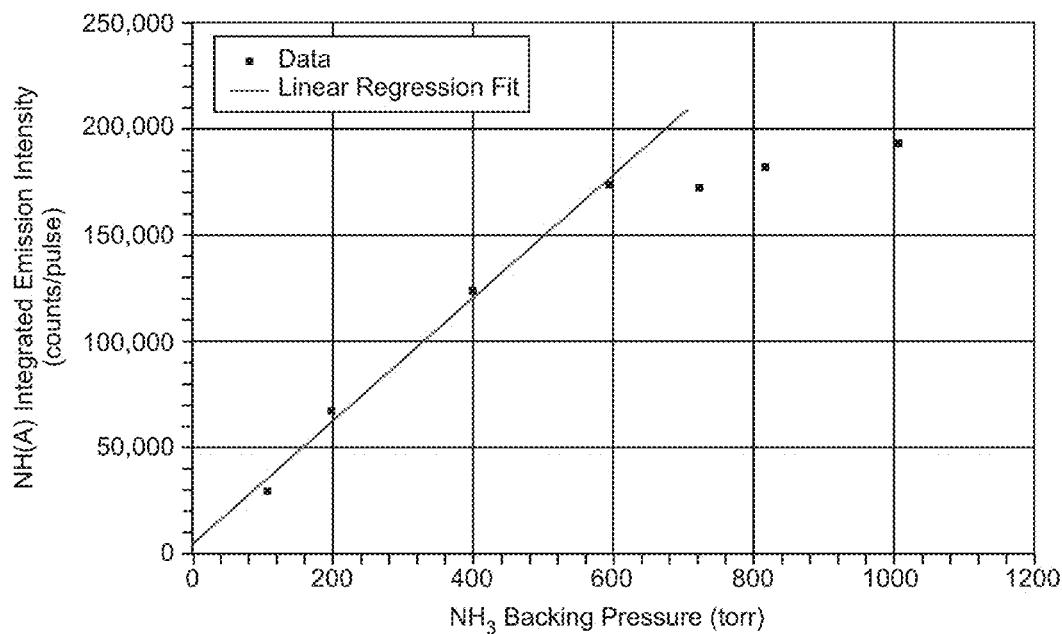
FIG. 12A illustrates a plot of integrated NH(A) emission intensity as a function of ammonium plenum pressure measured using the experimental apparatus illustrated in FIG. 11, according to some embodiments.

The dependence of NH(A) emission on the ammonia plenum pressure in the target valve was measured to identify the range of target valve conditions for which NH(A) emission scales linearly with ammonia pressure. The linear pressure range corresponds to ammonia concentrations in the interaction region of the FAST chamber within which single-collision conditions are maintained between oxygen atoms/ions and ammonia. The integrated NH(A) emission intensity as a function of ammonia plenum pressure with the FAST beam operating at 10 km/s is plotted in FIG. 12A. It can be concluded from the data presented in FIG. 12A that ammonia valve plenum pressures up to 600 torr can be utilized to maintain single-collision conditions between ammonia and atomic oxygen. Unless otherwise noted, the ammonia target valve pressure was set to 400 torr for all experiments disclosed in this example.

Figure 12B:
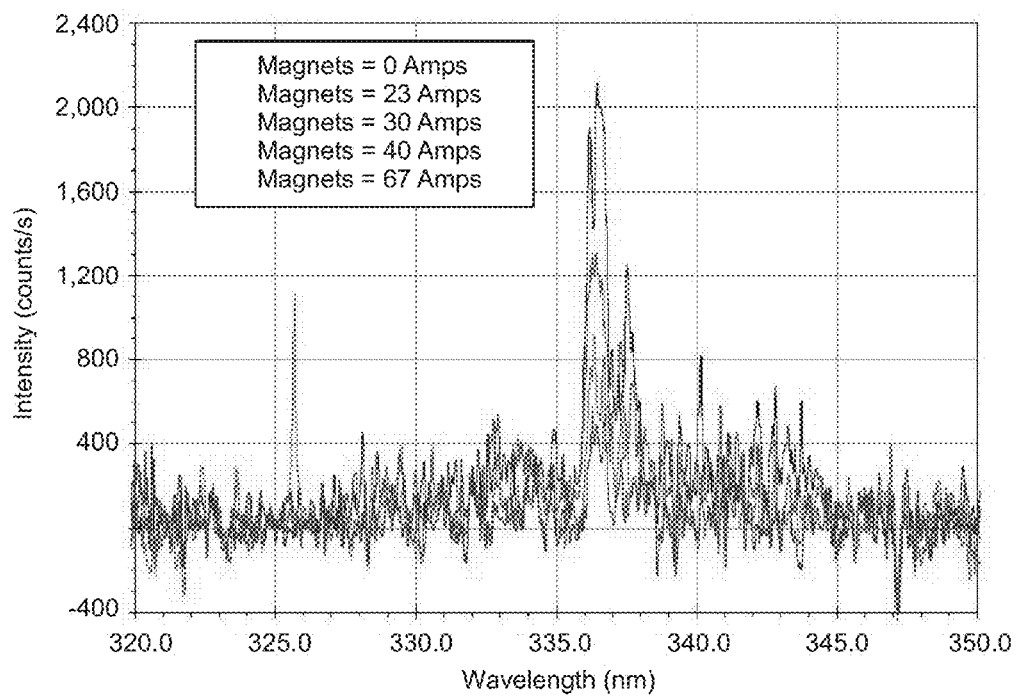
FIG. 12B illustrates a plot of NH(A) emission spectra collected with an 8 km/s oxygen beam as a function of electromagnet current measured using the experimental apparatus illustrated in FIG. 11, according to some embodiments.
Figure 12C:
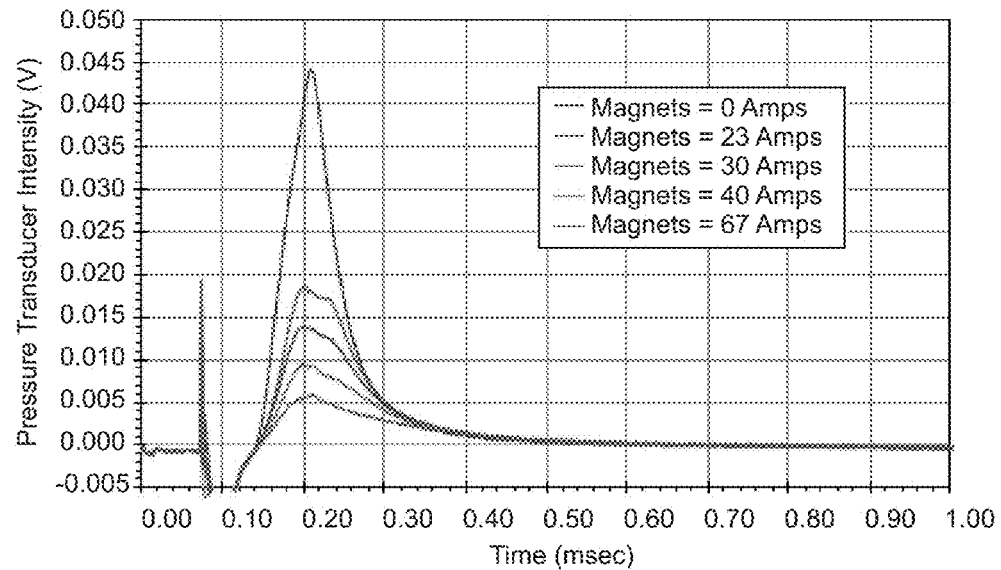
FIG. 12C illustrates a plot of Langmuir probe data measured with an 8 km/s oxygen beam as a function of current in the magnet using the experimental apparatus illustrated in FIG. 11, according to some embodiments.

NH(A) emission spectra measured with an 8 km/s oxygen beam as a function of electromagnet current are shown in FIG. 12B. The spectra show the characteristic NH(A→X) 0-0 and 1-1 Q-branch features at 336 and 337.5 nm respectively with R and P branch emission lines falling between 328 nm and 345 nm. For further details on emission line assignments of NH(A), see Someda et al., "Rotational Distribution of NH(A$^3$Π, c$^1$Π) Produced from NH$_3$ in Collision with Helium Metastable Atoms," J. Phys. Chem. 92: 368-374 (1988), the entire contents of which are incorporated by reference herein. Note that the NH(A) emission intensity was observed to decrease with increasing magnetic field as the contribution from the ionic reaction channel was decreased. To characterize the dependence of NH(A) emission on [O+], the Langmuir probe was used to measure the O+ flux in the beam as a function of magnet current. The 8 km/s Langmuir probe data measured immediately after each NH(A) emission spectrum was collected is displayed in FIG. 12C. No ammonia was introduced into the chamber while the ion fluence data was collected so that O+/NH$_3$ collisions would not attenuate the O+ fluence. Note that the Langmuir probe intensity falls as the magnet current increases. With the applied magnetic field turned off, the measured O+ fluence was 1.12×10$^{12}$/cm$^2$. With 67 Amps of current applied to the magnetic coils, the measured fluence was 2.56×10$^{11}$/cm$^2$ corresponding to a 77% reduction in the ion content of the beam.

Figure 12D:
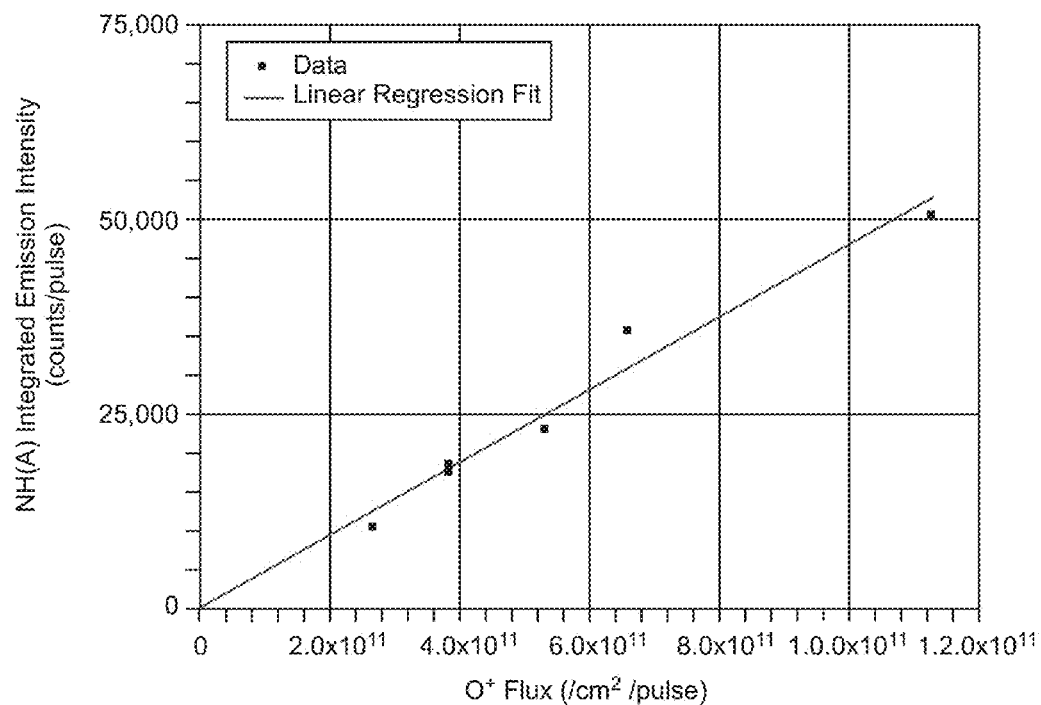
FIG. 12D illustrates a plot integrated NH(A) emission versus $O^+$ flux measured with an 8 km/s oxygen beam velocity using the experimental apparatus illustrated in FIG. 11, according to some embodiments.

In FIG. 12D, the integrated NH(A) emission intensity versus the measured O+ fluence is plotted. The data within FIG. 12D shows a substantially linear relationship between NH(A) emission and the O+ fluence, with a zero y-intercept (to within the 1-sigma error of the linear regression calculated intercept), based upon which it can be concluded that NH(A) production is substantially entirely attributable to the O+ content of the beam, and that the NH(A) is produced in a substantially single collision process. There was no detectable production of NH(A) that was believed to be attributable to O atoms for the 8 km/s oxygen beam.

Figure 12E:
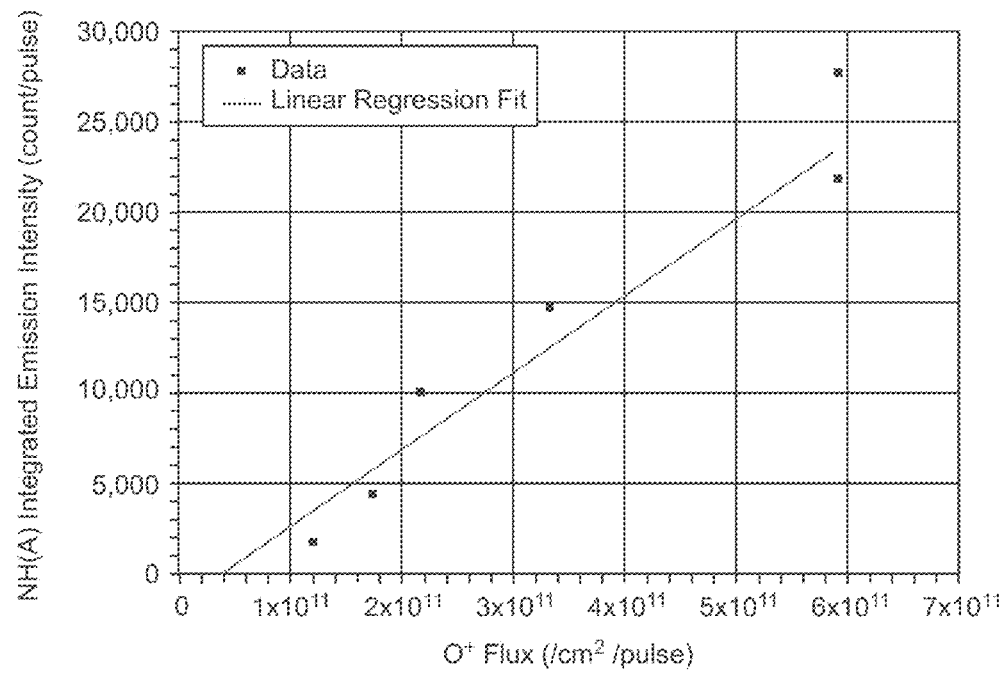
FIG. 12E illustrates a plot of integrated NH(A) emission versus $O^+$ flux measured with a 6 km/s oxygen beam velocity using the experimental apparatus illustrated in FIG. 11, according to some embodiments.
Figure 12F:
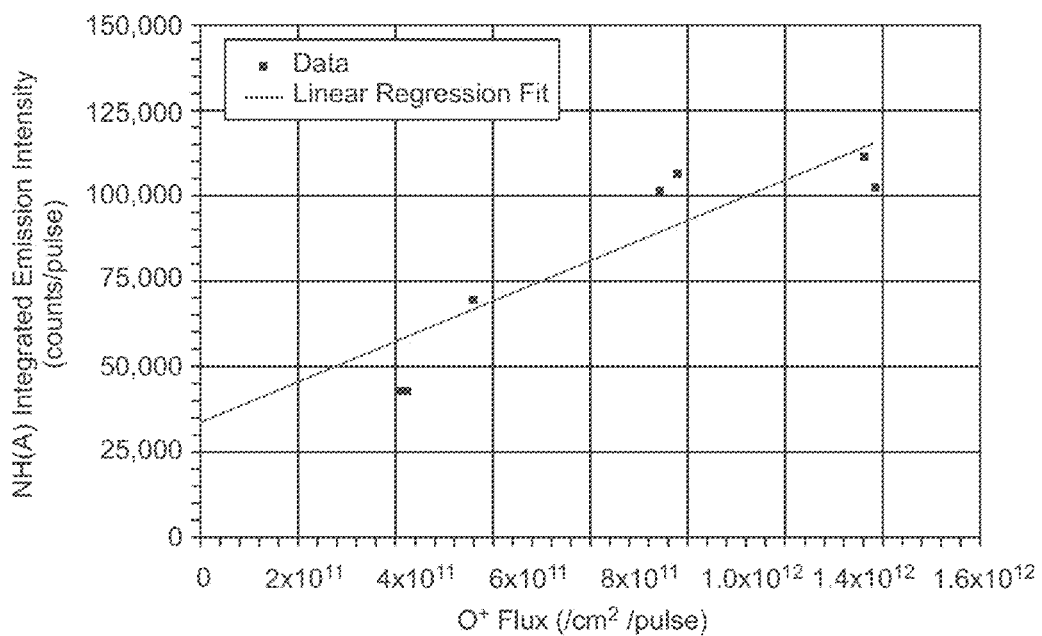
FIG. 12F illustrates a plot of integrated NH(A) emission versus $O^+$ flux measured with a 10 km/s oxygen beam velocity using the experimental apparatus illustrated in FIG. 11, according to some embodiments.
Figure 12G:
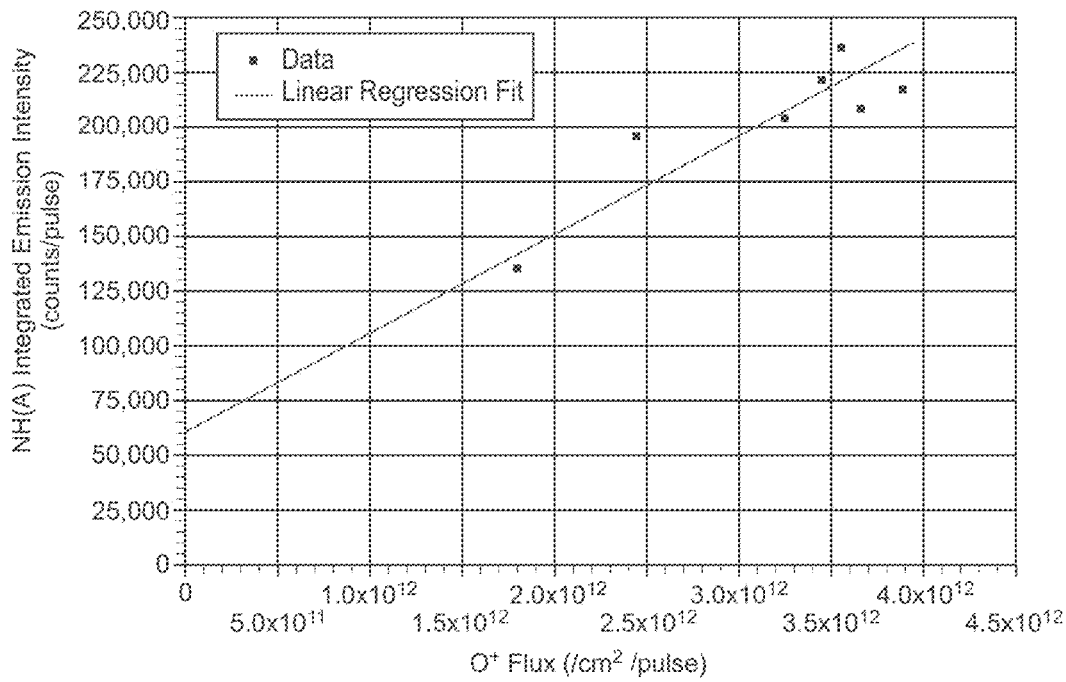
FIG. 12G illustrates a plot of integrated NH(A) emission versus $O^+$ flux measured with a 12 km/s oxygen beam velocity using the experimental apparatus illustrated in FIG. 11, according to some embodiments.

Data was collected and analyzed in an analogous manner for the 6, 10 and 12 km/s oxygen beams. The results are presented in FIGS. 12E-12G, respectively.

Figure 12H:
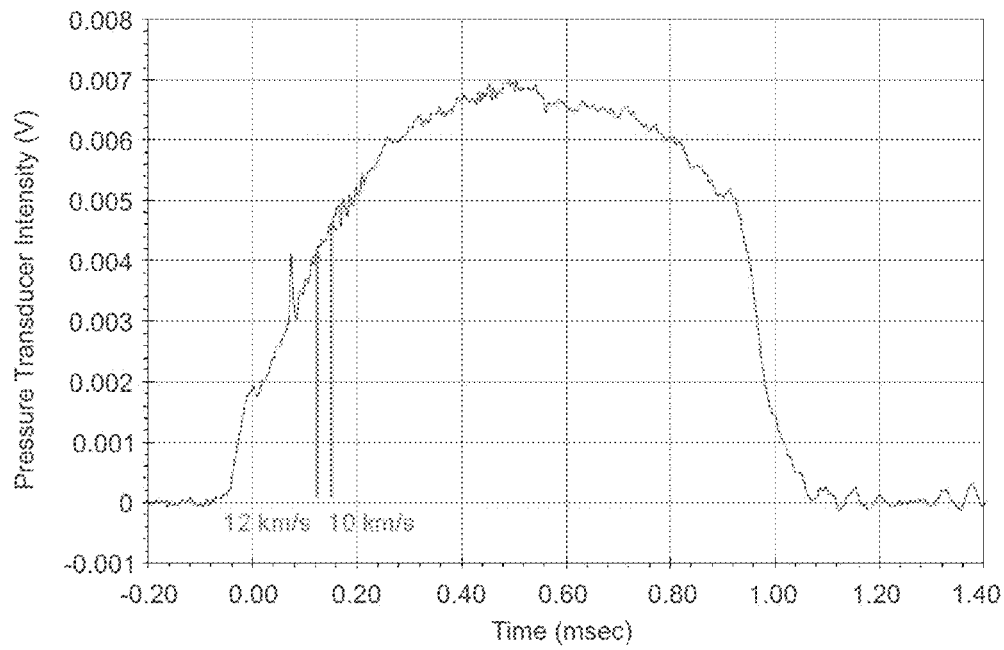
FIG. 12H illustrates a plot of a temporal profile of the oxygen cold flow pulse measured with a pressure transducer using the experimental apparatus illustrated in FIG. 11, according to some embodiments. The portion of the pulse processed in the pulsed discharge to product 10 and 12 km/s atom beams is indicated.

Without wishing to be bound by any theory, it is believed that FIGS. 12D-12G show evidence of an oxygen atom contribution to NH(A) production at or above 8 km/s, where extrapolated finite emission at zero ion concentration (y-intercept) is observed. At all velocities, the emission appears to be dominated by a mechanism involving O+. Establishing the velocity dependence of NH(A) emission resulting from reactions with atomic oxygen can be based upon the determination of the relative atomic oxygen fluence produced by the FAST apparatus 1100 illustrated in FIG. 11, operating at 10 and 12 km/s. This was accomplished by measuring the relative quantity of molecular oxygen processed in generating the 10 and 12 km/s beams. The FAST apparatus 1100 included a pressure transducer positioned at the exit of the oxygen nozzle to record the pulse profile of the oxygen cold flow (measured with the laser turned off). A pressure transducer trace recorded for these experiments is shown in FIG. 12H. The oxygen cold flow pulse was observed to have a FWHM width of about 900 μsec. FIG. 12H also indicates the time at which the $CO_2$ laser respectively was fired to produce the 10 and 12 km/s oxygen beams. Through integration and analysis it was estimated that approximately 9.9% and 7.7% of the cold flow pulse was processed by the laser discharge in producing the 10 and 12 km/s beams, respectively. Because previous mass spectrometer characterization of the oxygen beam has shown that the beam is fully dissociated at 10 and 12 km/s, the oxygen atom fluence/pulse (Fluence$_{(O)}$) produced by the source for each velocity can be expressed as:

$$\text{Fluence}_{(O)} = \text{Flow}_{(O2)} = F_{v=10,12\ km/s} \times 2(\text{Oatoms/O}_2)$$

where Flow$_{(O2)}$ corresponds to the O$_2$ flow rate (molecules/pulse) and F$_{v=10,12\ km/s}$ corresponds to the fraction of the O$_2$ pulse processed at 10 and 12 km/s.

Results of this analysis are presented in Table B. The relative efficiency for NH(A) production listed in Table B was determined by dividing the relative integrated NH(A) emission at each velocity by the relative oxygen atom fluence. The listed±error in this calculation was determined from the 1-sigma error in the y-intercept of NH(A) integrated emission intensity versus O+ flux plots (FIGS. 12D-12G) determined by linear regression analysis. Note that the data for the 8 km/s oxygen atom beam is also presented in Table B and include an upper bound to the relative production of NH(A) from the reaction of 8 km/s oxygen atoms with ammonia determined from the calculated 1-sigma error in the y-intercept. Taking into account the higher O-atom fluence of the 8 km/s beam (compared to 10 and 12 km/s), the relative production efficiency of NH(A) appears to increase by at least a factor of 15 as the oxygen atom velocity is increased from 8 to 10 km/s. Given the ±15% velocity spread of the FAST apparatus 1100, these results suggest an oxygen atom velocity threshold for NH(A) production via the O+NH$_3$ reaction of about 9 km/s. Such a result can be considered to provide evidence for the existence of Reaction (R1). The close consistency with the threshold for NH(A) observed in the flight experiments also can be considered to provide strong evidence for ammonia being the precursor for that emission through Reaction (R1).

TABLE B

Summary of the analysis of the velocity dependence of NH(A) production from the O + NH$_3$ reaction

| Velocity (km/s) | O atom Induced NH(A) Emission (counts/pulse) | O atom Fluence (/pulse) | Relative Production Efficiency of NH(A) |
|---|---|---|---|
| 8 | <2850 | 2.28 × 10$^{18}$ | <0.02 |
| 10 | 34,471 | 1.68 × 10$^{18}$ | 0.31 ± 0.14 |
| 12 | 86,368 | 1.31 × 10$^{18}$ | 1.00 ± 0.30 |

Figure 12I:
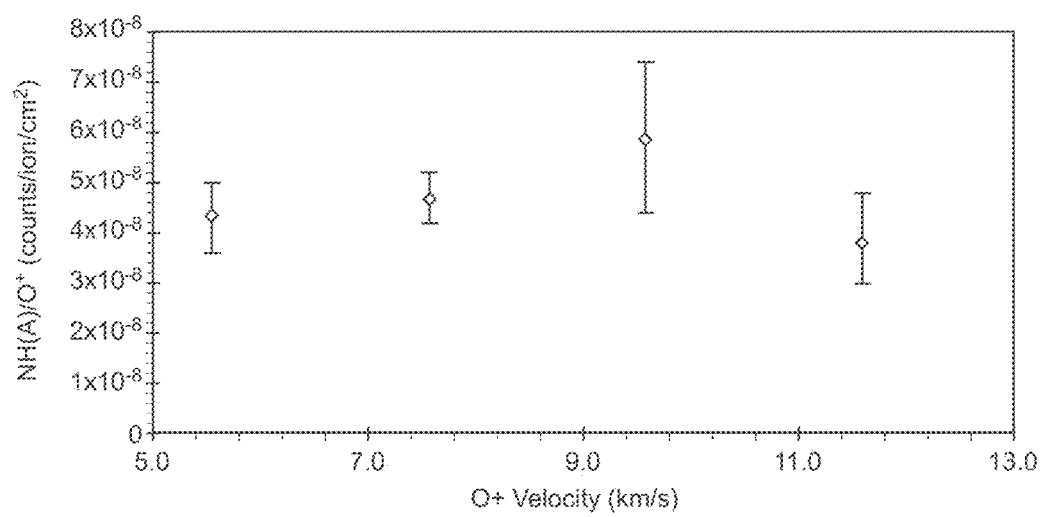
FIG. 12I illustrates a plot of relative efficiency of NH(A) production versus $O^+$ velocity measured using the experimental apparatus illustrated in FIG. 11, according to some embodiments.

The slopes of the NH(A) emission vs. O+ flux data in FIGS. 12D-12G can be considered to provide a relative measure of the effect of O+ velocity on NH(A) production. This data is presented in FIG. 12I. The error bars represent the one-sigma error in the slope determined by the linear regression analysis of the NH(A) vs. O+ data. The data in FIG. 12I indicate that there does not appear to be a discernible velocity dependence to NH(A) production by O+ over the range 6 to 12 km/s.

The 12 km/s oxygen beam was estimated to include about 6% O+ and about 94% O atoms. Despite the oxygen ions apparently forming approximately only 6% of the 12 km/s beam, the data in FIG. 12G can be interpreted as indicating that the relative contribution of oxygen ions and atoms to the production of NH(A) is approximately 2.5 to 1.0. The cross section for the production of NH(A) by the reaction of 12 km/s oxygen ions with ammonia therefore can be estimated to be about 40 times greater than the cross section for the reaction with 12 km/s oxygen atoms. The data in FIGS. 12D-12G appear to show an approximately linear dependence between NH(A) production and O+ fluence, suggesting that a single step ion-neutral reaction forms NH(A):

$$O^+ + NH_3 \rightarrow NH(A) + \text{products}(H_2O^+?)$$

Accordingly, the present experiment would appear to provide support for the existence of Reaction (R1). Reaction (R1) potentially can be used to quantitatively measure the number density of atomic oxygen in LEO based on NH(A→X) emission resulting from interactions of a spacecraft plume with atomic oxygen in the atmosphere. Another potential application includes quantifying the amount of ammonia produced by various amine fueled engines or hydrazine fueled Auxiliary Power Units by observing NH(A→X) emission from amine fueled orbiting systems. Quantifying ammonia produced by such systems also can be used to analyze plume phenomenology, for example because ammonia has several infrared (IR) active vibrational modes, the strongest of which is in the 8-13 um LWIR band, often used for imaging targets through thermal emission of their hardbody. The present UV-based analysis can provide additional information about the plume.

Another application is the detection of maneuvers of LEO spacecraft employing amine fueled thrusters, such as provided elsewhere herein. The Reaction (R1) threshold being close to LEO orbital velocity (approximately 7.8 km/s) can make the emission intensity relatively sensitive to angle of attack of the thrust direction, yielding the potential to sense the direction of a satellite maneuver before the new orbit can be established by following its new track.

Spacecraft utilizing hydrazine monopropellant thrusters are believed to be particularly analyzable this technology through direct detection of the distinct UV NH(A→X) emission. Such engines are normally considered to be relatively stealthy, as they substantially do not produce IR emission in short wavelength infrared (SWIR) or mid wavelength infrared (MWIR) surveillance bands, because their exhaust substantially does not include $H_2O$, CO, or $CO_2$. The $N_2$ and $H_2$ in their exhaust, not having a dipole moment, do not radiate but the third principal exhaust product is $NH_3$, a reaction product of which can be analyzed using the present systems and methods.

The cross section for the $O^+ + NH_3$ reaction leading to NH(A) has been estimated to be about 40 times greater at 12 km/s than the cross section for the oxygen atom reaction and independent of $O^+$ velocity between 6 and 12 km/s. This suggests that the ionic reaction potentially can be used for detecting satellite maneuvers in orbits much higher than LEO, where the O-atom density is expected to be too low for producing significant intensity.

3. Monopropellant Intensity Estimation 3.1 Calibration from $NH_3$ in Shuttle PRCS Exhaust This example estimates the intensity of 336-nm band emission from monopropellant thrusters for orbiting spacecraft and its anticipated detectability. In this example, it is assumed that Reaction (R1) is responsible for producing the NH(A), yielding the 336-nm emission seen in space shuttle engine plumes.

The laboratory experiments discussed above are believed to have established relative collision cross-section values versus $O + NH_3$ collision velocity, approximately defining the relative increase with velocity above the threshold. The SOCRATES DSMC computer model has the capability to quantitatively simulate the plume NH(A→X) emission from shuttle LEO plumes using the cross-section function for Reaction (R1) and the amount of ammonia in the plume as independent variables.

Figure 13A:
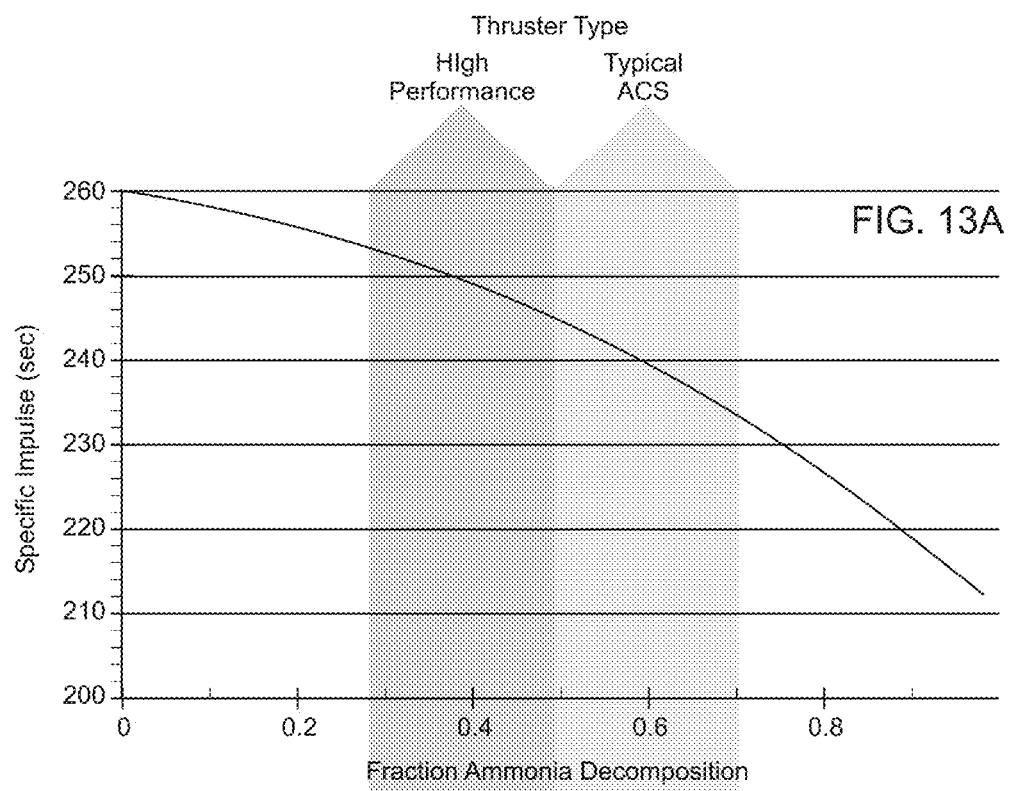
FIGS. 13A-13B respectively illustrate plots of an exemplary dependence of specific impulse (Isp) and exhaust $NH_3$ mole fraction on fraction $NH_3$ decomposition, according to some embodiments. Isp is for an exemplary engine with a chamber pressure of 1000 psi and an expansion ratio of 50.
Figure 13B:
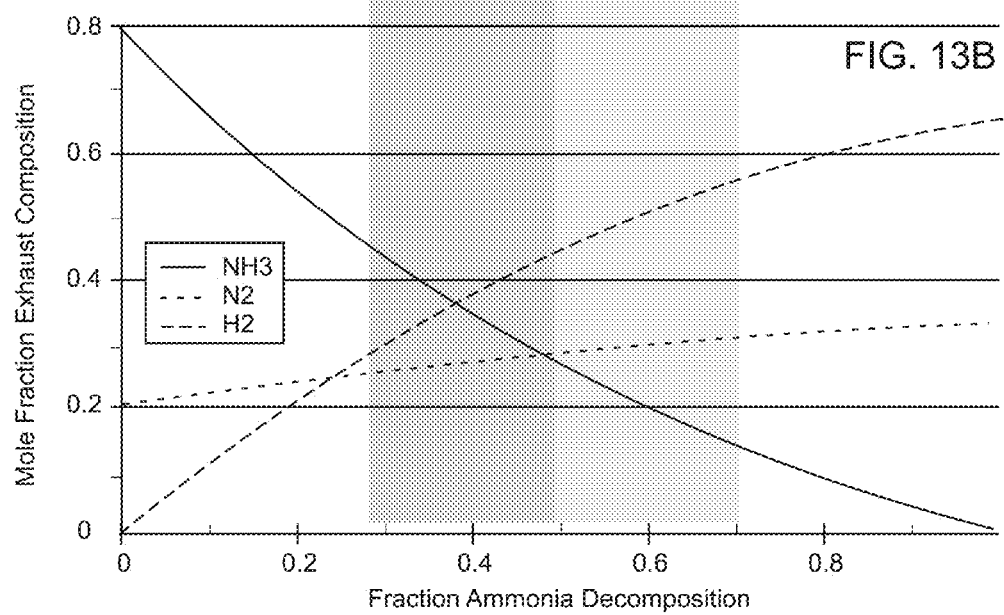

The $NH_3$ mole fraction in monopropellant engine exhaust is anticipated to be generally between 0.25 to 0.40 and related relatively strongly to the measurable specific impulse of the engine, as indicated in FIGS. 13A-13B. $NH_3$ mole fraction in bipropellant engine exhaust is relatively uncertain, and is not believed to have been successfully measured. Chemical kinetic engine codes, such as Two-Dimensional Kinetic (TDK) code (Sierra Engineering, Inc., Sacramento Calif.), which model thermodynamically and kinetically governed exhaust composition as the propellants migrate from the injectors to the engine exit, would seem appropriate to estimate exhaust composition. TDK run in its normal configuration does not predict any $NH_3$ in shuttle engine exhaust, but such code was developed principally to predict engine performance, without simulating the complex imperfect mixing of propellants where they are injected. Imperfect mixing in rocket engines, referred to among plume phenomenologists as "unmixedness," is understood to persist in the high-pressure environment of the engine, leading to compositions over a range of oxidizer-to-fuel ratios (O/Fs), and can result in significant variations in the mole fraction of minor and trace species.

It is believed that an estimate of $NH_3$ mole fraction in the engine exhaust can be obtained based on measurement of an analogous species. Methane, $CH_4$, has been measured at a 2.27% mole fraction in the exhaust of a LOX/RP1 1000 lbf model of a Saturn F-1 engine through analysis of centerline exhaust gases sampled by a robust water-cooled probe. The methane in hydrocarbon-fueled engines is not predicted by engine codes but nonetheless can be expected to result from fuel-rich regions that result from unmixedness. $NH_3$ in amine-fueled engines is a nitrogen-based analog to $CH_4$ in hydrocarbon-fueled engines. $CH_4$ and $NH_3$ also have similar resistance to oxidation by atomic oxygen, both having an activation energy of approximately 8 kcal/mole for the extraction of a hydrogen.

Far-field CO(a) Cameron band emission from amine-fueled space shuttle engines has been analyzed and attributed to 1% $CH_4$ in the PRCS and OMS exhaust. For further details, see Dimpfl et al. One-Dimensional Equilibrium TDK calculations performed under fuel-rich conditions, representing the pockets or streamlines that are understood to produce the fuel-like precursors $CH_4$ and $NH_3$, indicate less propensity for $NH_3$ formation than $CH_4$ formation as gases flow from the chamber to the nozzle exit in PRCS engines. This has led to an estimated upper limit of 0.1% mole fraction $NH_3$ at the exit plane in PRCS engines, which corresponds to a steady-state flow of about 3 g/s $NH_3$ from 2 PRCS. Without wishing to be bound by any theory, it is believed that a larger amount of $NH_3$ in the PRCS exhaust will lead to an estimate of proportionally less UV intensity from monopropellant engines. As such, the intensity estimates can represent a lower limit for detection, and actual values can be expected to be higher than estimated here.

Figure 14:
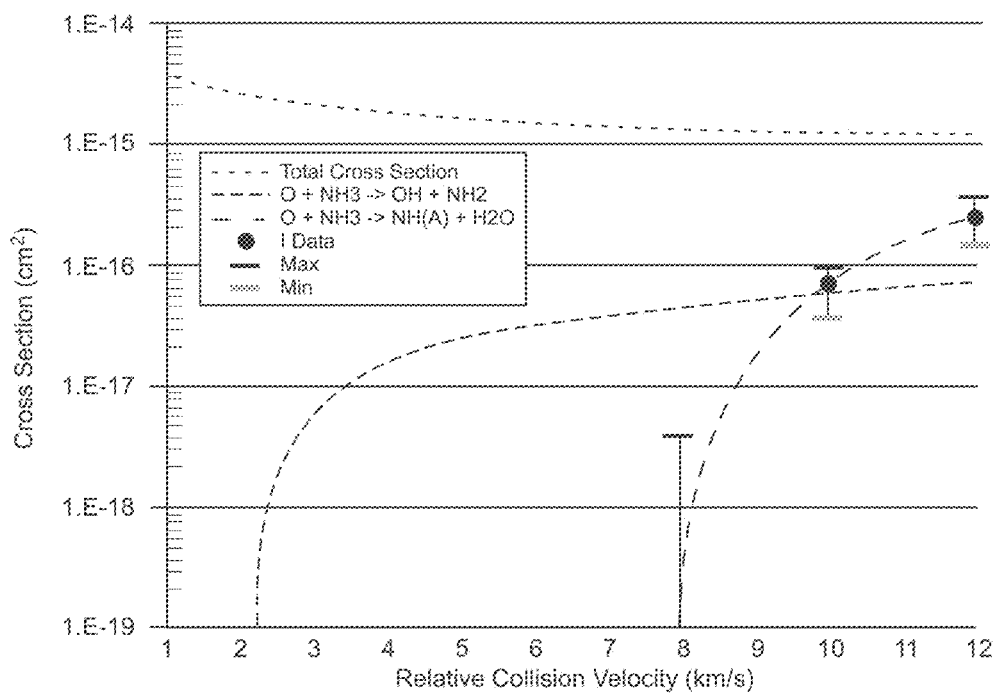
FIG. 14 illustrates a plot of experimentally measured $O+NH_3$ collision cross sections, according to some embodiments.

The estimated amount of $NH_3$ in the PRCS exhaust and the experiment results described above can allow a lower limit to the cross section for Reaction (R1) to be calculated. Rate constants for chemical reactions are commonly characterized by the Arrhenius rate constant expression:

$$k = A T^n \exp(-E_{act}/kT), \qquad (2)$$

where the activation energy, $E_{act}$, must be at least the enthalpy of the reaction (approximately 62 kcal/mole for Reaction (R1)), T is the absolute temperature, k is Boltzmann's constant, and A and n are parameters adjusted to fit the absolute temperature dependence of the rate. For DSMC model calculations, a velocity-dependent cross section can be used, and Eq. (2) can be converted to the velocity-dependent form of Eq. (3) through an inverse Laplace transform and expressed as follows:

$$\sigma(V_{rel}) = \frac{\pi^{1/2} A (1 - E_{act}/E_{rel})^{1/2} (E_{rel} - E_{act})^n}{2 k^n \Gamma(n + 3/2) V_{rel}}, \qquad (3)$$

where $E_{rel} = \mu V_{rel}^2/2$. FIG. 14 illustrates estimated and measured $O + NH_3$ collision cross sections. Black data points in FIG. 14 show the relative cross sections measured in the above-described experiment calibrated by the 0.1% mole fraction $NH_3$ estimated upper limit and AMOS measurement of STS-41 NH(A→X) emission from Viereck et al. The red curve represents the DSMC-estimated cross section for Reaction (R1) where a 62 kcal/mole activation energy yields a velocity threshold of 8 km/s, the temperature exponent n has been adjusted to 1.4 to produce a velocity dependence that passes through the relative experimental data points, and the pre-exponential factor, A, is adjusted to 2.4E-16 cm3/molecule-s, to yield intensities that agree with AMOS observations of STS-41 from Viereck et al. The blue curve is the DSMC-estimated total $O + NH_3$ collision cross section from atomic and molecular hard sphere cross sections. The green curve is the DSMC-estimated cross section for the principal competitive $NH_3$ reaction channel:

$$O + NH_3 \rightarrow NH_2 + OH, \qquad (R21)$$

which is believed to limit the availability of $NH_3$ to Reaction (R1). The Arrhenius parameters for Reaction (R21) were selected to be (A=1.8E-15, n=1.0, $E_{act}$=4.36 kcal/mole).

Figure 15:
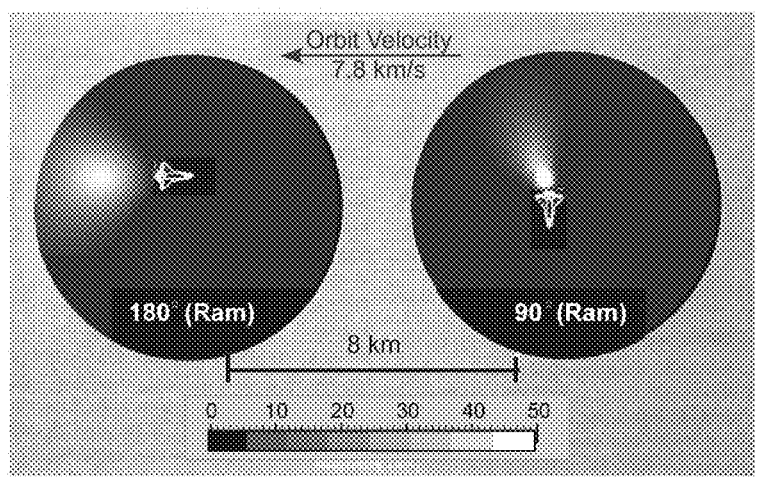
FIG. 15 illustrates DSMC-modeled NH(A) radiance for STS-41 observation scenario using 0.1% $NH_3$ mole fraction in the plume and Arrhenius parameters described in the text for Reaction (R1), according to some embodiments. As in FIG. 10, the shuttle orbiter is not to scale but shown to indicate the approximate location of the engines' exit plane.

FIG. 15 illustrates the DSMC-modeled NH(A→X) radiance using 0.1% $NH_3$ in the PRCS exhaust and the Arrhenius parameters described above for Reaction (R1) for modeling the STS-41 scenario shown in FIG. 10. The atmospheric conditions used, shown in Table 5, were computed using the MSIS 90E model for the scenario of the AMOS observation, including the tabulated solar activity: Oct. 7, 1990, at 1326 UT, 290 km altitude, latitude 21° N, longitude 150° W. These observations were used to assign the Arrhenius pre-exponential parameter A, described above, to yield the correct total intensity in the field of view. It is notable that, while the morphology of the simulated plumes appears to agree with the observations, the size of the plumes appears smaller, apparently about half the size of the observed plumes. Without wishing to be bound by any theory, the size is believed to be governed principally by the atomic or molecular mean free path between collisions, which is inversely proportional to the atmospheric number density. It follows that a potentially likely reason for the difference between the observed and simulated plumes is believed to be that the actual atmospheric density was about half that indicated by the MSIS 90E model. If the ambient number density were lowered to obtain a better spatial fit to the observation, the pre-exponential A parameter would need to be increased, effectively increasing the collision cross section by a proportional amount, to produce the total intensity measured in the field of view. Consequently, it is believed that the monopropellant intensity estimates that follow are underestimated and would also be proportionally brighter.

TABLE 5

Atmospheric Conditions for DSMC Model Computations Shown in FIG. 15

| Atmospheric Composition | | Atmospheric Parameter | |
|---|---|---|---|
| Species | Mole fraction | Parameter | Value |
| O | 0.82522 | Temperature | 992 K |
| $N_2$ | 0.15464 | Number density | 1.36E9 $cm^{-3}$ |
| $O_2$ | 0.00595 | | |
| He | 0.00766 | | |
| N | 0.00645 | | |
| H | 0.00007 | | |
| Ar | 0.00003 | | |

3.2 Estimated Monopropellant Intensity

Figure 16:
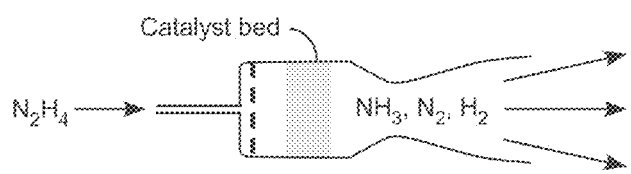
FIG. 16 schematically illustrates basic elements of a hydrazine-fueled monopropellant thruster.

The Reaction (R1) cross sections shown in FIG. 14 can be used to estimate intensities for hydrazine-fueled monopropellant engines. Such engines, for which basic elements are shown in FIG. 16, are typically fed by pressurized nitrogen blow-down systems that drop in thrust by a factor of 2 to 5 from the beginning to the end of the fuel supply. Pure hydrazine is forced through a catalyst bed to produce $NH_3$, $N_2$, and $H_2$ by the reaction $$3N_2H_4 \rightarrow 4(1-X)NH_3 + (2X+1)N_2 + 6XH_2, \quad (R22)$$

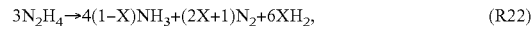

where X is the degree of $NH_3$ dissociation. The product distribution dependence on X is plotted in FIG. 13B. The exhaust gases expand through the nozzle to produce thrust. It can be useful to have as little $NH_3$ dissociation as possible to produce the highest specific impulse, because $NH_3$ dissociation is endothermic and reduces the chemical energy released. As shown in FIG. 13B, typical $NH_3$ mole fractions in high-performance engines range from 25% to 45%. The percentage ammonia in the exhaust can be directly linked to the specific impulse of the engine, and can be relatively accurately estimated from the thrust if the hydrazine flow rate and efficiency of the engine nozzle are known. Such engines have had significant technological development and are part of almost every satellite's on-orbit propulsion system for trajectory changes and attitude control. Such engines typically range in thrust from 0.05 lbf to 100 lbf. In the past few years, about 75% of the thrusters manufactured have been 0.23 lbf thrusters, about 15% of them 1 lbf, about 10% 5 lbf, and about 5% of them 23 lbf and above.

The Missile Defense Agency (MDA) Near Field IR Experiment (NFIRE) satellite employs four nominal "5 lbf" Aerojet engines for delta V orbit change maneuvers and 12 nominal, "one lbf" attitude control jets. For the intensity estimates that follow, a single 5-lbf engine, similar to the engines used on the NFIRE satellite, with assumed 25% mole fraction $NH_3$ in the exhaust, is used. The assumed $NH_3$ mole fraction leads to a steady-state exhaust flow of 3.1 g/s of $NH_3$, which is similar to the estimated $NH_3$ flow from the 1740 lbf dual PRCS bipropellant engine burns observed in STS-41. A fraction of the $NH_3$ may freeze to form ammonia ice in the adiabatic expansion into the ambient low-pressure environment. Room-temperature liquid ammonia under high pressure is known to form ammonia ice in being vented into a vacuum, but there is currently not believed to be evidence that the lower-density $NH_3$ in the plumes of monopropellant engines form ammonia ice. The simulation examples herein assume all $NH_3$ in the engine exhaust will remain in the gas phase as monomers.

3.2.1 Altitude Dependence

Figure 17:
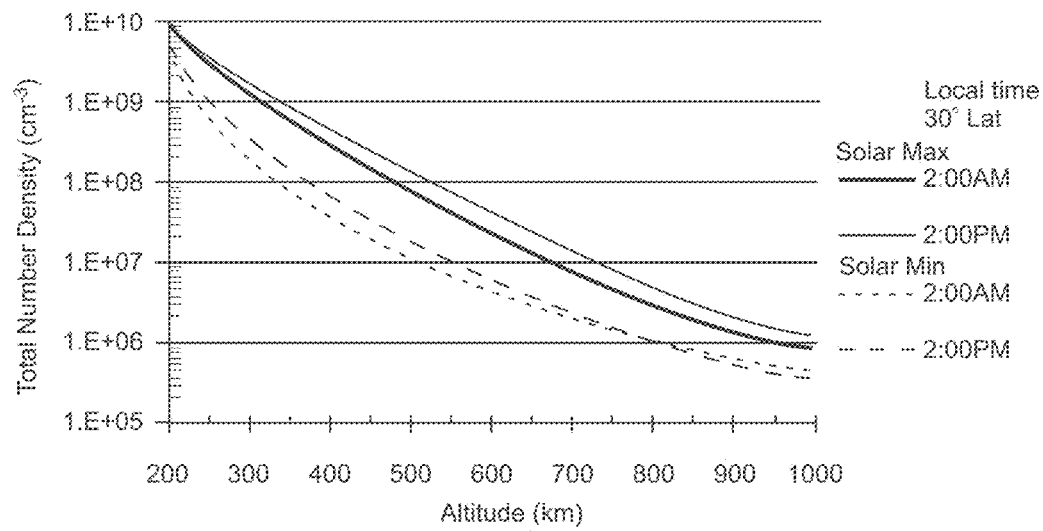
FIG. 17 illustrates a plot of estimated ambient atmospheric number density vs. altitude for extreme times and solar activity, according to some embodiments.
Figure 18:
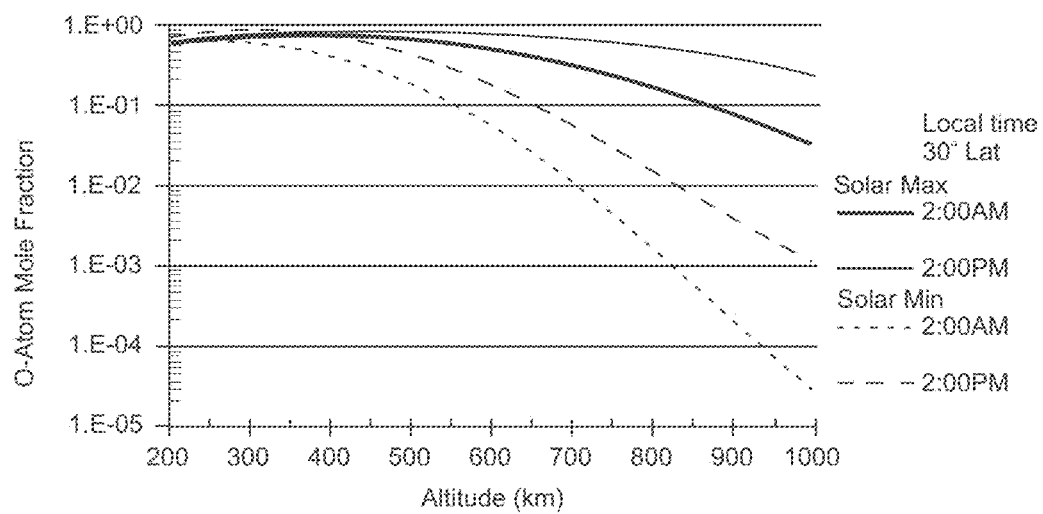
FIG. 18 illustrates a plot of estimated ambient O-atom mole fraction vs. altitude for extreme times and solar activity, according to some embodiments.

Spatial distribution of monopropellant engine plume UV emission from NH(A) produced by Reaction (R1) is strongly dependent on ambient number density above 100 km altitude. The total emission intensity is believed to be approximately invariant with altitude, but the brightness can be expected to decrease as the number density drops and mean free path between collisions increases. An exemplary parameter for computing the emission that will be observed in a given area footprint of a sensor is the ambient atmospheric number density in the vicinity of the thrusting engine. Such number density is approximately inverse exponentially dependent on altitude with a 1/e length scale of approximately 35 km above 200 km altitude. The brightness also can be expected to be approximately linearly dependent on the mole fraction of O-atoms in the ambient atmosphere. At LEO altitudes, O-atoms can be expected to be generally the dominant species, but at higher altitudes and at times of low solar activity, the O-atom mole fraction can be expected to drop significantly. Other factors, such as local time, season, and latitude, also can affect the ambient and O-atom number densities. Calculations here are made based on ambient number density as a principal dependent parameter with an O-atom mole fraction of 0.89. FIG. 17, which shows the range of altitudes associated with specific number densities, can be used to associate detectability with target altitude over variations in solar activity and local time. FIG. 18 shows the variation of O-atom mole fraction with altitude, solar activity, and local time, and can be used to estimate relative plume brightness over changes in those parameters. The associations were computed using the MSIS 90E atmospheric model, available online at omniweb.gsfc.nasa.gov/vitmo/msis_vitmo.html. The 2:00 AM/2:00 PM times represent the maximum and minimum local diurnal number density, respectively, for 30° nadir latitude.

3.2.2 Thrust Dependence

The dependence of the plume intensity on thrust is believed to be approximately linear, so it is believed to be reasonable to scale intensity estimates with engine thrust. However, there can be a small reduction in the linear relationship for the peak intensity as the thrust increases. The increase in gas flow with thrust excludes the atmosphere from a larger volume of space, causing the brightest region of the plume to be separated further from the engine nozzle and spread over a larger region.

3.2.3 Angle-of-Attack (AoA) Dependence

The atmosphere relative AoA, which can be important for plume modeling, can be defined to be the angle between the engine thrust vector and the spacecraft velocity vector through the residual atmosphere. Because the atmosphere largely co-rotates with the Earth, this AoA can be slightly different from the AoA that can be used to define a spacecraft maneuver. That angle can be defined relative to an inertial coordinate system centered in the middle of the Earth but not rotating with the Earth. The difference in these AoAs can be a few degrees. As used herein, unless otherwise noted, "AoA" is intended to refer to atmosphere relative AoA.

Because the 8 km/s threshold relative collision velocity for Reaction (R2) is larger than the approximately 7.4 km/s LEO atmosphere relative orbital velocity makes the 336-nm plume intensity highly sensitive to the atmosphere relative AoA. The exhaust velocity relative to the spacecraft is about 3.4 km/s for the shuttle orbiter's engines and about 2.3 km/s for hydrazine-fueled monopropellant engines. The exhaust velocity adds or subtracts from the 7.4 km/s atmosphere relative velocity as the AoA swings from ram to wake. However, even in a wake engine burn there can be expected to be plume-atmosphere collisions over the 8 km/s threshold, as plume molecules near the engine lip undergo molecular collisions that direct them into the ram.

Figure 19:
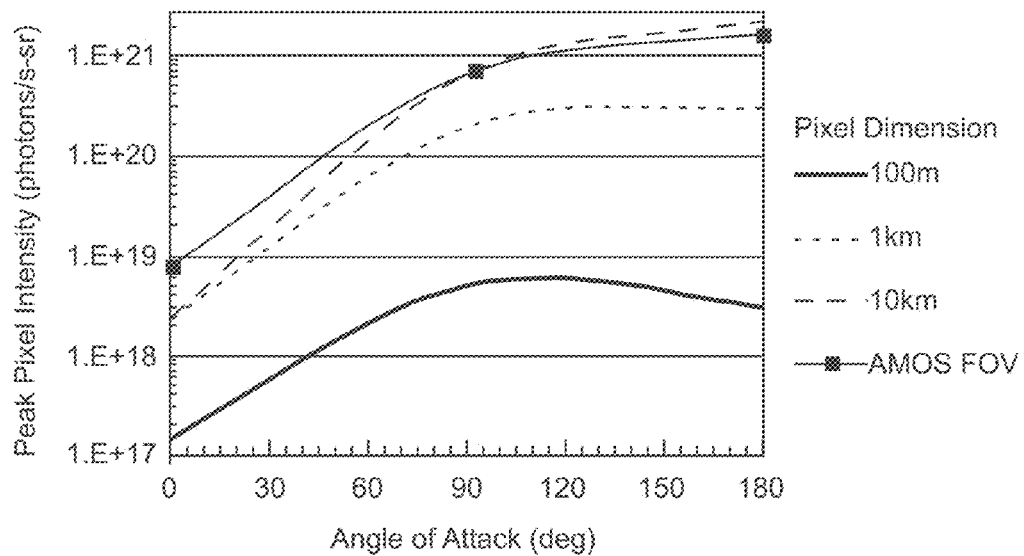
FIG. 19 illustrates a plot of the computed AoA dependence of side-view aspect peak pixel NH(A) emission intensity for STS-41 scenario (2 PRCS) compared to measured AMOS FOV intensity, according to some embodiments.

FIG. 19 illustrates the AoA dependence from the model calculations shown in FIG. 15 compared to that from the AMOS observations shown in FIG. 10 for a side-view aspect (90° to both the velocity and thrust vectors). It can be seen that the plume intensity remains within approximately an order of magnitude of the peak intensity until the AoA drops below 60°. The intensity below a 60° AoA is believed to relatively uncertain because it is dependent on the poorly understood "wrap around" plume flow. The value shown for the AMOS observation of a wake 0° burn is an upper limit determined by the sensitivity of the detector in which no signal could be observed for that AoA. The dependence is anticipated to be slightly different for monopropellant engines because the exhaust velocity is lower.

Note that the model estimates the brightest plume intensity to be at an AoA smaller than 180° as the pixel footprint decreases. This can be understood to result from the impinging atmosphere penetrating more closely to the higher-density plume flow as the exhaust is directed away from the ram. LEO satellite maneuvers are frequently wake burns by main engines to overcome the effects of atmospheric drag. The model estimates such burns to be the weakest in intensity, but such burns are normally assisted by smaller attitude control jets to maintain orientation during the maneuver. Such control jets are normally directed 90° to the thrust axis and as such can be expected to generally produce intensity relatively brighter than the wake-burning main engines.

3.2.4 Monopropellant DSMC Calculations

SOCRATES DSMC calculations were performed using an assumption of 0.25 exhaust mole fraction $NH_3$ for ambient number densities from 1E6 to 1E9 $cm^{-3}$, using 0.89 O-atom mole fraction atmospheric composition. Table 6 shows the calculated results indicating the brightest steady-state photon emission rate over a range of detector footprints for a ram burn. The numbers are for a nose- or tail-view aspect. There can be expected to be a relatively small variation for other view aspects. Intensities for other orientations may be estimated using the AoA dependence shown in FIG. 19 although values for AoAs less than 60° can be expected to be more uncertain as they are dependent on the relatively poorly understood wrap-around flow at the engine nozzle lip. The 336-nm photon emission rates may be converted to watts by multiplying by 5.95E-19 W/phot/s. The greatest intensity represents a photon production efficiency of 2.4% per plume $NH_3$ molecule.

TABLE 6

Nose/Tail Aspect 5 lbf Engine Ram Burn Brightest Pixel
$NH(A \rightarrow X)$ Column Emission Rate (photons/s) Uniformly
Distributed into $4\pi$ Steradians

| Detector footprint | Ambient Number Density ($cm^{-3}$) | | | |
|---|---|---|---|---|
| (km) | 1E6 | 1E7 | 1E8 | 1E9 |
| 15 | 5.00E+19 | 1.67E+20 | 9.26E+20 | 2.64E+21 |
| 10 | 4.93E+19 | 1.64E+20 | 9.08E+20 | 2.55E+21 |
| 1 | 2.27E+19 | 7.44E+19 | 3.46E+20 | 1.57E+21 |
| 0.1 | 4.78E+17 | 3.36E+18 | 1.95E+19 | 1.02E+20 |

3.2.5 Background Intensity

Figure 20:
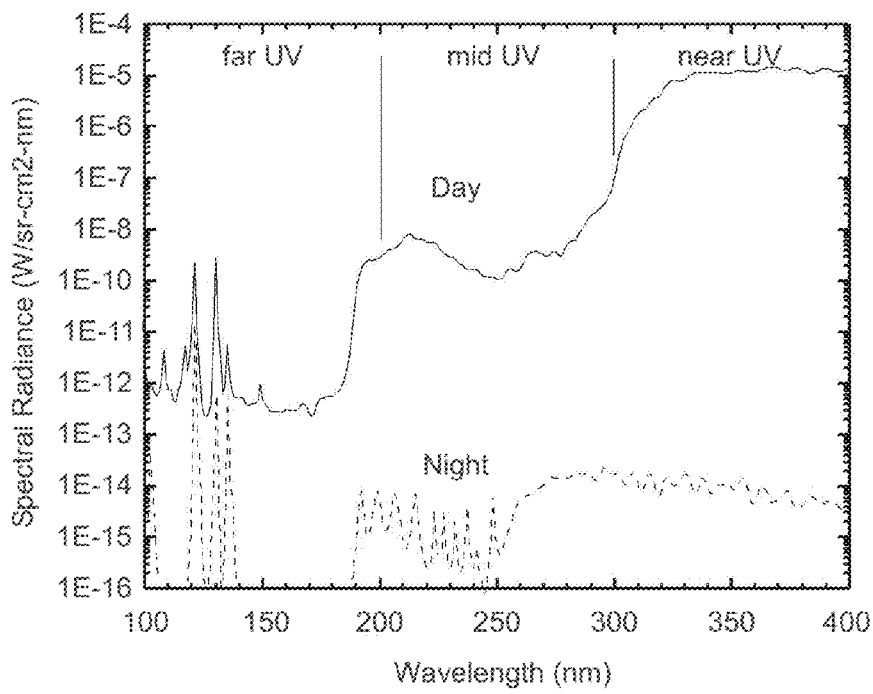
FIG. 20 illustrates a plot of the background spectral radiance of Earth day and night sides viewed from space, according to some embodiments.

The approximate UV spectral background looking at the Earth day and night sides from space is shown in FIG. 20. Relative intensities of the signal and background intensity are overlaid by spatial, temporal, and statistical (shot noise) variations in the background. At 336 nm, the relatively bright day background is dominated by Rayleigh scattering of solar radiation, but, like the blue sky, has little spatial or temporal variation. Likewise, the much dimmer dark Earth is dominated by night airglow, which, aside from auroral emission, has little spatial or temporal variation, although off-axis rejection of bright day-lit Earth needs to be considered for dark Earth viewing scenarios. Atmospheric trans cloud albedo may induce background variations that exceed the shot noise and requires further investigation. Here it is assumed that scene photon counting statistics will dominate the background variations so spatial and temporal variations and off-axis sources have been ignored.

The uncertainty in background photons arriving at a sensor aperture can be expressed as the square root of the average background photons detected by the sensor. The day and night background spectral radiance at 336 nm of 8.80E-6 and 1.75E-13 $W/cm^2$-nm at 336 nm from FIG. 20 convert to 1.49E13 and 2.96E5 photons/s-sr-$cm^2$-nm, respectively.

Figure 21:
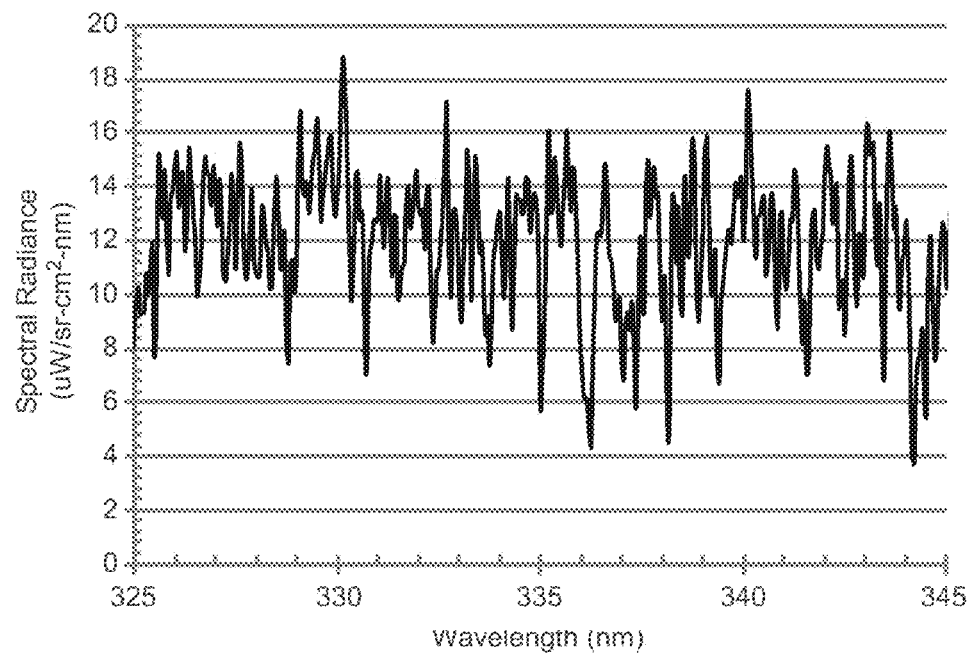
FIG. 21 illustrates a plot of MODTRAN computed near-UV sky spectral radiance at 45° elevation from sea level at noon, according to some embodiments.

The UV spectral background viewing LEO from the ground through a clear sky is also expected to be dominated by Rayleigh scattering and airglow. FIG. 21 illustrates the day spectral radiance in the 336 nm region calculated using the atmospheric radiance and transmittance model MODTRAN (MODerate resolution atmospheric TRANsmission, available from Spectral Sciences, Inc., Burlington, Mass. and the AFRL).

There can be expected to be relatively significant Fraunhofer structure to the background radiance in the 328-346 nm region of the $NH(A \rightarrow X)$ emission spectrum, including a strong absorption coincident with the 336-nm band center, which can result from the NH radical in the sun's atmosphere. The day background sky radiance used in the ground-based sensor scenario is the 328-346 nm average of 1.19E-5 W/sr-cm²-nm from FIG. 21, which converts to 2.01E13 photons/s-sr-cm²-nm.

Figure 22:
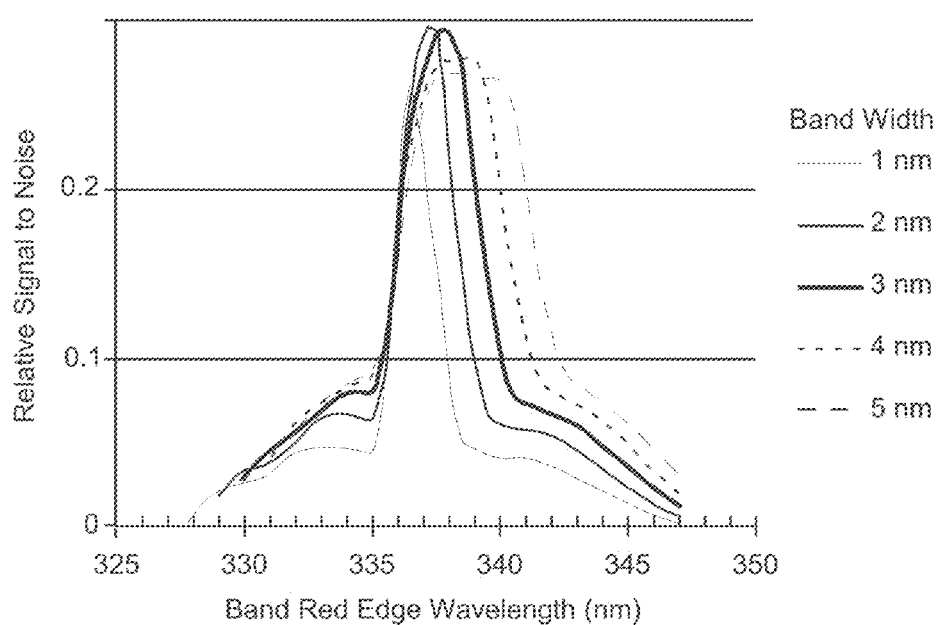
FIG. 22 illustrates a plot of the relative detected NH(A→X) signal-to-noise as a function of bandwidth and location, according to some embodiments.

The collection band can be optimized to maximize signal to noise. FIG. 22 illustrates the estimated relative signal-to-noise ratio for sliding bands of different bandwidths, assuming a constant spectral background throughout the spectral region. The optimum appears to be a 2-nm band from 335 to 337 nm, collecting 42% of the NH(A→X) emission band.

4. Scenario Predictions

In the present example, three separate scenarios have been selected for evaluating the estimated detectability of monopropellant UV emission: observation by (1) 12-in. optic urban Los Angeles ground-based telescope; (2) 5-in. optic LEO sensor, and (3) 10-in. optic GEO sensor. For these scenarios, the signal-to-noise ratio has been computed using the NH(A→X) brightness estimates from Table 6 and the statistical photon noise from the backgrounds described in the previous section.

The detected signal, S, in photons from the brightest pixel column emission, I, given in Table 6 can be expressed as:

$$S(\text{photons}) = \frac{\varphi \tau \pi (D/2)^2}{4\pi R^2} f l t, \quad (4)$$

where $\varphi$ is the detection quantum efficiency of photons impinging the sensor aperture focused on a sensor pixel, T is the transmittance of the atmosphere between the source and the sensor, D is the diameter of the sensor aperture, R is the range between the plume and the sensor, t is the collection dwell time, and f is the fraction of the total NH(A→X) emission that falls within the bandpass. The shot noise, N, from the background radiance, B, described earlier can be expressed as the square root of the detected background photons in a single pixel:

$$N(\text{photons}) = \sqrt{\varphi \Delta \lambda \pi (D/2)^2 (l/R)^2 B t}, \quad (5)$$

where $\Delta \lambda$ is the detector spectral bandpass, and l is the square pixel footprint dimension at the range of the target. These yield a signal-to-noise ratio that can be expressed as:

$$S/N = \frac{\tau D}{8 l R} \sqrt{\frac{\varphi \tau}{\Delta \lambda \pi B}} f l. \quad (6)$$

The estimated values shown in FIGS. 24-27 are for 180° AoA ram burns, which correspond to an uncommon orbit lowering or de-orbiting maneuver. Values for other AoA maneuvers can be estimated using the AoA intensity dependence shown in FIG. 19 although intensities for AoA less than 60° can be relatively uncertain and may be significantly less than relative values indicated by FIG. 19. Orbit raising 0° AoA maneuvers are relatively common maneuvers by LEO satellites. While these are less intense and relatively uncertain, they are frequently accompanied by bursts from attitude control system (ACS) engines to maintain attitude during the maneuver. These ACS engines frequently use the same propellant and are lower in thrust but directed at a 90° AoA. As such, the plumes from these engines can be expected to be brighter than the main engines directed at 0° AoA and can be potentially usable signals for observing orbit raising maneuvers.

4.1 12-in. Optic Ground-Based Telescope Scenario

Figure 23:
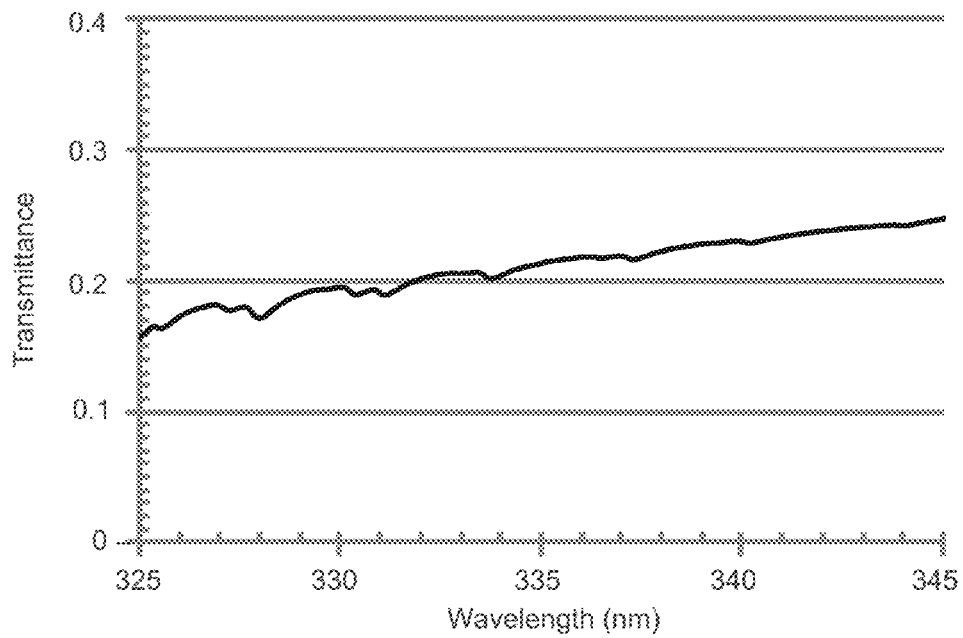
FIG. 23 illustrates a plot of calculated MODTRAN transmittance from sea level to space through mid-latitude atmosphere at 45° elevation, according to some embodiments.

This scenario was selected to represent a capability for using a ground-based sensor, which in the present example was located in El Segundo, Calif. A UV-sensitive 12-in. telescope was used. The MODTRAN-computed transmittance to space from sea level through a mid-latitude atmosphere at 45° elevation angle is 0.22, as shown in FIG. 23.

Because the telescope was located in the greater Los Angeles area, urban light pollution was a potential concern. A cursory search for light pollution spectra did not show any significant background in the near-UV NH(A→X) band region; however, there is a helium atomic emission line at 335.5 nm, which falls within the desired bandpass that could add to the background if present in city lighting.

Figure 24:
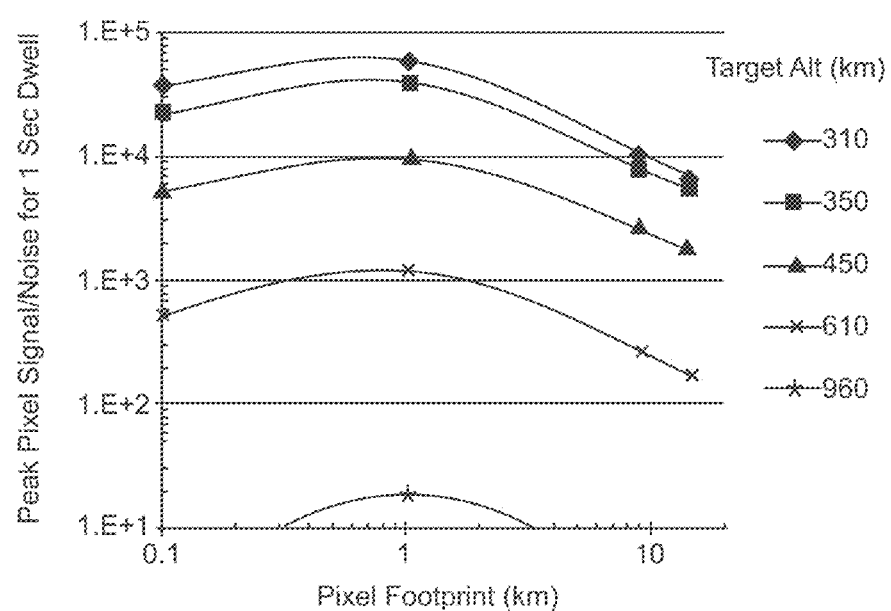
FIG. 24 illustrates a plot of estimated signal-to-noise observing ram burn of 5 lbf monoprop engine burn from a ground-based sensor in El Segundo, Calif. at night, according to some embodiments.

The estimated signal-to-noise for night observations of ram burns computed by Eq. (6) are shown in FIG. 24, using the source intensities from Table 6 and the scenario parameters shown in Table 7. The altitudes represent atmospheric number densities from Table 5 for solar max conditions. The intensities have been adjusted to reflect solar max O-atom density variations with altitude shown in FIG. 18, assuming a linear dependence on relative O-atom mole fraction. The 2 AM time is chosen to represent the lowest altitude for the different number densities over the diurnal variation estimated by the MSIS 90E model.

Figure 25:
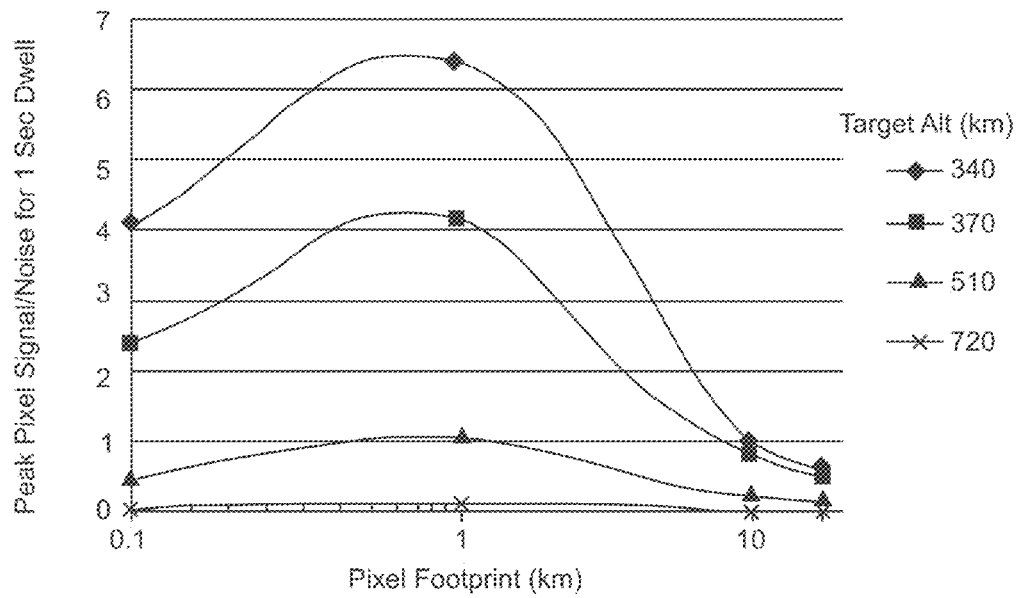
FIG. 25 illustrates a plot of estimated signal-to-noise observing ram burn of 5-lbf monoprop engine burn from a ground-based sensor in El Segundo, Calif. during day, according to some embodiments.

The estimated signal-to-noise for day observations of ram burns are shown in FIG. 25, computed analogously as those for the night. The scenario parameters are those shown in Table 7 except the background is 1.19E-5 W/sr-cm²-nm or 2.01E13 photons/s-sr-cm²-nm, and the ranges are 481, 523, 721, and 1018 km. The different ranges reflect the diurnal minimum altitudes for the different number densities.

TABLE 7

Parameters Used for Estimating Signal-to-Noise for 2 AM Ground Telescope Observation of LEO Spacecraft Ram Burn

| Parameter | Value | |
|---|---|---|
| $\varphi$ | 0.1 | |
| T | 0.22 | |
| D | 12 | in |
| t | 1 | s |
| R | 438, 495, 636, 863, & 1358 | km |
| f | 0.42 | |
| B | 2.96E5 | photons/s-sr-cm²-nm |
| $\Delta \lambda$ | 2 | nm |
| l | 0.1, 1.0, 10., & 15 | km |

4.2 5-in. Optic LEO Sensor Scenario

Figure 26:
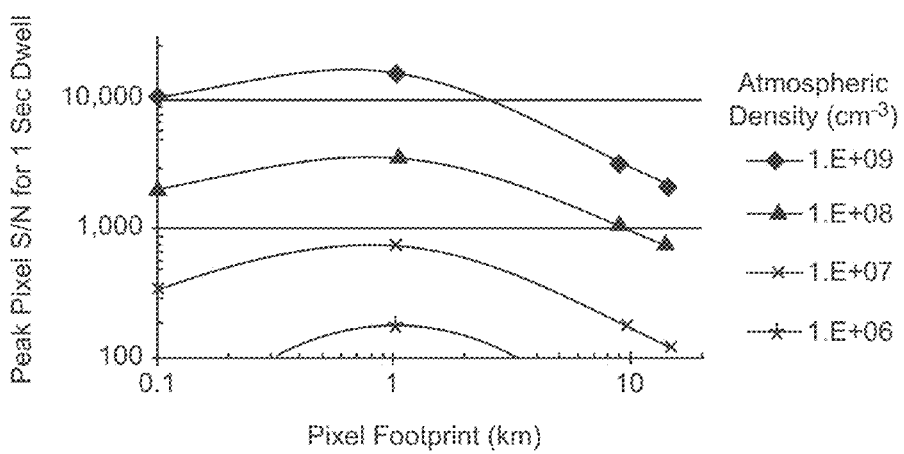
FIG. 26 illustrates a plot of estimated signal-to-noise observing ram burn of 5-lbf monoprop engine burn observed from LEO at 1500 km range against night Earth, according to some embodiments.

This scenario was selected to represent sensors similar to the UVISI imagers carried by the Midcourse Space Experiment (MSX). The UVISI imagers had 5-in. diameter circular apertures. At the 888-km altitude of MSX, 1500 km is approximately the maximum range for observing LEO spacecraft against the Earth. The estimated signal-to-noise for observations of ram burns against the dark Earth computed by Eq. (6) are shown in FIG. 26, using the source intensities from Table 6 and the scenario parameters shown in Table 8. Associated altitudes for the ambient number densities can be obtained from FIG. 17. Note that care may be taken to correct source intensities for ambient O-atom mole fraction, as shown in FIG. 18, if it is significantly less than 0.89.

TABLE 8

Parameters Used for Estimating Signal-to-Noise for LEO
Platform Observation of LEO Spacecraft Ram Burn

| Parameter | Value |
|---|---|
| φ | 0.1 |
| T | 1.0 |
| D | 5 in |
| t | 1 s |
| R | 1500 km |
| f | 0.42 |
| B | 2.96E5 photons/s-sr-cm$^2$-nm |
| Δλ | 2 nm |
| l | 0.1, 1.0, 10., & 15 km |

4.3 10-in. Optic GEO Sensor Scenario

Figure 27:
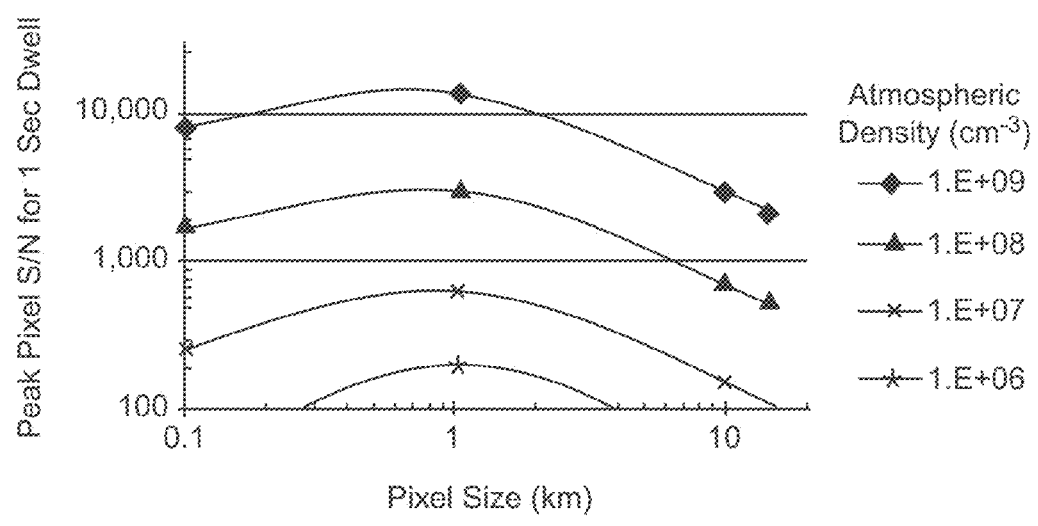
FIG. 27 illustrates a plot of estimated signal-to-noise observing ram burn of 5 lbf monoprop engine burn observed from GEO against night Earth, according to some embodiments.

This scenario was selected because of the relative attributes of a GEO orbit and can be considered to represent a sensor similar to the VUE sensor that was mounted on a DSP flight. The signal-to-noise estimates for observations of ram burns against the dark Earth computed by Eq. (6) are shown in FIG. 27, using the source intensities from Table 6 and the scenario parameters shown in Table 9. As in the previous scenario, associated altitudes for the ambient number densities can be obtained from FIG. 17. Care may be taken to correct source intensities for ambient O-atom mole fraction, as shown in FIG. 18, if it is significantly less than 0.89.

These estimated values indicate that observing spacecraft orbit-lowering or de-orbiting ram burns of monoprop-fueled LEO spacecraft against a night or dark Earth background likely are feasible from ground- or spacebased sensors. Analysis of radiance distributions indicate the optimum sensor foot-print is on the order of 1 km, although much smaller footprints are also feasible, allowing valuable imaging of plume morphology. Observing during the day or against a sunlit Earth are marginal at best for small 5-lbf engines. The ability to see posigrade orbit-raising burns can be expected to be somewhat more uncertain, although associated burns of ACS engines at 90° AoA can be anticipated to produce a detectable signal.

TABLE 9

Parameters Used for Estimating Signal-to-Noise for
GEO Platform Observation of LEO Ram Burn

| Parameter | Value |
|---|---|
| φ | 0.1 |
| T | 1.0 |
| D | 10 in |
| t | 1 s |
| R | 35786 km |
| f | 0.42 |
| B | 2.96E5 photons/s-sr-cm$^2$-nm |
| Δλ | 2 nm |
| l | 0.1, 1.0, 10., & 15 km |

5. Considerations

As provided herein, the utility of UV surveillance of spacecraft monopropellant maneuvers includes determination of spacecraft mass or an intended rendezvous or intercept target or assessing the remaining propellant on a threat spacecraft. While these capabilities can utilize complex algorithm development for interpretation of observed plumes, it can be expected that a more accurate value of the rate constant Arrhenius pre-exponential factor, A, shown in Eq. 2 (currently assigned the value of 2.4E-16 cm$^3$/molecule-s for the estimates shown here), for Reaction (R1) can further enhance the accuracy of the estimates. The temperature exponent value in Eq. (2), n=1.4, is currently derived through a fit to three data points from the above-described experiment and may be improved by careful consideration of experiment design through pre-experiment modeling.

Such parameters can be measured in the laboratory, but the hyperthermal activation energy for the reaction (R1) can make it relatively difficult to obtain the collision velocities required to overcome the 62-kcal/mole activation energy. Imaging radiance from gas releases or engine burns at orbital velocity to compare with DSMC modeling is a straight-forward method for establishing such parameters. See Dimpfl et al. Here, different potential sources of ammonia release in LEO suitable for accurately establishing the Arrhenius A and n parameters for the Reaction (R1) rate constant and two options for sensors locations are considered: ground based or space based.

5.1 Sources of LEO Ammonia Release

For establishing the rate constant parameters for Reaction (R1), it can be useful to have a source of ammonia in LEO that provides a steady gaseous flow with a known flow rate, a flow velocity over 1 km/s, and a rotatable platform to be oriented relative to the ram. All these characteristics are provided by LEO spacecraft with hydrazine-fueled monopropellant engines. Particularly useful orientations are for AoAs from 90° to 180° because these orientations can be expected to produce the brightest radiance from well-understood exhaust flow, suitable for DSMC modeling with sensitivity to both the A and n Arrhenius parameters. An experiment could include an orbit-lowering, de-orbiting, or out-of-plane maneuver by a spacecraft coordinated with a suitable sensor. Another source of ammonia release would be that of liquid or gaseous ammonia from a tank, such as is available from the International Space Station (ISS) cooling system.

5.2 Ground Observation

As mentioned above, observation from the ground by AMOS of NH(A→X) emission from NFIRE engine burns and ammonia release from the ISS potentially can be used. Ground observations of dedicated high-AoA burns are also an option. The estimates presented above in Subsection 4.1 indicate that high AoA burns of small 5-lbf monopropellant engines in LEO can be expected to be easily detectable at night from a ground-based telescope, e.g., in El Segundo, Calif. or the AMOS telescope. Such an observation can be expected to provide data useful to more accurately establish the Reaction (R1) Arrhenius parameters.

5.3 Space Observation

Observation from an orbiting sensor can overcomes the interference of tropospheric weather and can allow the very dark background provided by deep space. A space-based option is the use of a cubesat, which can include a one to three 4-in. cube volume element and has a relatively compact size and a relatively low power requirement.

It can be expected that the estimated maximum range R of such a sensor can be expressed by rearranging Eq. (4) as follows:

$$R = \frac{D}{4}\sqrt{\frac{\varphi \tau f l t}{S}}. \quad (7)$$

Table 10 shows the computed estimated maximum range using the source intensities from Table 6 and parameter values shown in Table 11.

TABLE 10

Estimated Maximum Range (km) for Cubesat Observing NH(A→X) from 5-lbf Engine Ram Burn with Detecting at Least 1000 photons/s in the Brightest Pixel

| Detector footprint | Ambient Number Density (cm$^{-3}$) | | | |
|---|---|---|---|---|
| (km) | 1E6 | 1E7 | 1E8 | 1E9 |
| 15 | 1797 | 3278 | 7730 | 13048 |
| 10 | 1784 | 3249 | 7653 | 12827 |
| 1 | 1210 | 2191 | 4722 | 10072 |
| 0.1 | 176 | 466 | 1123 | 2560 |

TABLE 11

Parameters Used for Estimating the Maximum Range for Cubesat Observation of a LEO Ram Burn

| Parameter | Value |
|---|---|
| $\varphi$ | 0.1 |
| T | 1.0 |
| t | 1 s |
| D | 4 in |
| f | 1.0 |
| S | 1000 photons/s |

6. Comments

Estimates used in this example that are believed to lead to the estimates of monopropellant NH(A→X) emission intensity have been purposely conservative. Without wishing to be bound by any theory, the positive result from the above-described experiment is believed to provide evidence that the assignment of Reaction (R1) is correct.

ALTERNATIVE EMBODIMENTS

It should be noted that the present systems and methods can be implemented using various types of data processor environments (e.g., on one or more data processors) which execute instructions (e.g., software instructions) to perform operations disclosed herein. Non-limiting examples include implementation on a single general purpose computer or workstation, or on a networked system, or in a client-server configuration, or in an application service provider configuration. For example, the methods and systems described herein can be implemented on many different types of processing devices by program code that includes program instructions that are executable by the device processing subsystem. The software program instructions can include source code, object code, machine code, or any other stored data that is operable to cause a processing system to perform the methods and operations described herein. Other implementations also can be used, however, such as firmware or even appropriately designed hardware configured to carry out the methods and systems described herein. For example, a computer can be programmed with instructions to perform the various steps of the methods or process flows illustrated in FIGS. 5-8.

It is further noted that the present systems and methods can include data signals conveyed via networks (e.g., local area network, wide area network, internet, combinations thereof, etc.), fiber optic medium, carrier waves, wireless networks, etc. for communication with one or more data processing devices. The data signals can carry any or all of the data disclosed herein that is provided to or from a device.

Additionally, the present systems' and methods' data (e.g., lookup table, data input, data output, intermediate data results, final data results, etc.) can be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other non-transitory computer-readable media for use by a computer program.

The present systems and methods can be provided on many different types of computer-readable storage media including computer storage mechanisms (e.g., non-transitory media, such as CD-ROM, diskette, RAM, flash memory, computer's hard drive, etc.) that contain instructions (e.g., software) for use in execution by a processor to perform the methods' operations and implement the systems described herein.

The computer components, software modules, functions, data stores, and data structures such as lookup tables described herein can be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality can be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise.

While various illustrative embodiments of the invention are described above, it will be apparent to one skilled in the art that various changes and modifications may be made therein without departing from the invention. For example the present systems and methods suitably could be implemented to estimate the parameters of any moving or stationary body that emits an atomic or molecular species that interacts with a gas as to generate a product having a detectable spectroscopic emission. Such a body can be natural or artificial. Additionally, note that although the present lookup tables primarily have been described as storing information about simulated plumes, it should be understood that the lookup tables instead, or additionally, can store information about actual plumes, and the processor can be configured to estimate a parameter of a spacecraft based on such information. The appended claims are intended to cover all such changes and modifications that fall within the true spirit and scope of the invention.

What is claimed:

1. A method for estimating an orbit of an actual spacecraft implemented by one or more data processors forming a computing device, the actual spacecraft being characterized by a set of values of at least N parameters, the method comprising:
   obtaining, by a sensor coupled to at least one data processor, a spectroscopic image of an emission from an atomic or molecular product of an interaction between an atmospheric gas and an atomic or molecular species in a plume from the actual spacecraft maneuvering in space;
   obtaining, by at least one data processor, an N-dimensional lookup table stored in a non-transitory computer-readable medium, the N-dimensional lookup table storing information about a plurality of different simulated emissions, each simulated emission being from the atomic or molecular product of a simulated interaction between the atmospheric gas and the atomic or molecular species in a plume from a simulated spacecraft characterized by a corresponding set of values of the N parameters selected from the group consisting of: burn duration, view angle, range, spacecraft mass, engine thrust, engine lip angle, remaining propellant, angle of attack, atmospheric relative speed, plume velocity, atmospheric composition adjacent to the spacecraft, atmospheric density adjacent to the spacecraft, ambient temperature, and amount of the atomic or molecular species in the plume;
   selecting, by at least one data processor, a simulated emission based on comparisons between the information about the simulated emissions and the spectroscopic image;
   estimating, by at least one data processor, a thrust vector and an impulse vector of the actual spacecraft based on at least one of the N parameters of the actual spacecraft in the selected simulated emission; and
   providing, by at least one data processor, the impulse vector for use in characterizing the actual spacecraft.

2. The method of claim 1, wherein the estimating includes interpolating, by at least one data processor, the value of at least one of the N parameters of the actual spacecraft based on the information about the simulated emission and the spectroscopic image.

3. The method of claim 1, wherein the information about the plurality of simulated emissions includes a simulated image of each of the simulated emissions.

4. The method of claim 3, wherein the spectroscopic image and the simulated image each are two-dimensional, the method further comprising selecting, by at least one data processor, the simulated emission having a simulated image that most closely matches the spectroscopic image.

5. The method of claim 3, wherein the simulated image includes a simulated three-dimensional radiant field.

6. The method of claim 5, wherein the spectroscopic image includes a spectroscopic three-dimensional radiant field, the method further comprising constructing, by at least one data processor, the spectroscopic three-dimensional radiant field based on a pair of stereo spectroscopic images of the emission, and selecting, by at least one data processor, the simulated emission having a simulated three-dimensional radiant field that most closely matches the spectroscopic three-dimensional radiant field.

7. The method of claim 5, wherein the spectroscopic image is two-dimensional, the method further comprising generating, by at least one data processor, a plurality of two-dimensional simulated images at different view angles, and selecting, by at least one data processor, the simulated emission having a two-dimensional simulated image that most closely matches the spectroscopic image.

8. The method of claim 1, further comprising selecting, by at least one data processor, the simulated emission based on an a priori known value of at least one of the N parameters of the actual spacecraft.

9. The method of claim 1, wherein the emission includes a wavelength of approximately 336 nm.

10. The method of claim 9, wherein the atomic or molecular product is nitrogen monohydride.

11. The method of claim 1, wherein the emission is selected from the group consisting of: OH(A→X) electronic emission resulting from interaction between atmospheric gas and an atomic or molecular species in the plume, plume CO vibrational infrared emission excited by collisions with atmospheric atomic oxygen, CO(a→X) Cameron band ultraviolet emission resulting from a two-step interaction of plume methane with atmospheric atomic oxygen, plume $H_2O$ vibrational bend mode infrared emission excited by collisions with the atmospheric gas, and plume $H_2O$ asymmetric stretch mode infrared emission excited by collisions with the atmospheric gas.

12. A system for estimating an orbit of an actual spacecraft, the actual spacecraft being characterized by a set of values of at least N parameters, the system comprising:
   a non-transitory computer-readable memory storing an N-dimensional lookup table storing information about a plurality of different simulated emissions, each simulated emission being from the atomic or molecular product of the interaction between the atmospheric gas and the atomic or molecular species in a plume from a simulated spacecraft characterized by a corresponding set of values of the N parameters selected from the group consisting of: burn duration, view angle, range, spacecraft mass, engine thrust, engine lip angle, remaining propellant, angle of attack, atmospheric relative speed, plume velocity, atmospheric composition adjacent to the spacecraft, atmospheric density adjacent to the spacecraft, ambient temperature, and amount of the atomic or molecular species in the plume; and
   a processor coupled to the non-transitory computer-readable memory and configured to obtain, from a sensor, a spectroscopic image of an emission from an atomic or molecular product of an interaction between an atmospheric gas and an atomic or molecular species in a plume from the actual spacecraft maneuvering in space, select a simulated emission based on comparisons between the information about the simulated emissions and the spectroscopic image, to estimate a thrust vector and an impulse vector of the actual spacecraft based on at least one of the N parameters of the actual spacecraft based in the selected simulated emission, and to provide the impulse vector for use in characterizing the actual spacecraft.

13. The system of claim 12, wherein the processor is further configured to estimate the value based on interpolating the value of at least one of the N parameters of the actual spacecraft based on the information about the simulated emission and the spectroscopic image.

14. The system of claim 12, wherein the information about the plurality of simulated emissions includes a simulated image of each of the simulated emissions.

15. The system of claim 14, wherein the spectroscopic image and the simulated image each are two-dimensional, the processor being further configured to select the simulated emission having a simulated image that most closely matches the spectroscopic image.

16. The system of claim 14, wherein the simulated image includes a simulated three-dimensional radiant field.

17. The system of claim 16, wherein the spectroscopic image includes a spectroscopic three-dimensional radiant field, the processor further being configured to construct the spectroscopic three-dimensional radiant field based on a pair of stereo spectroscopic images of the emission, and to select the simulated emission having a simulated three-dimensional radiant field that most closely matches the spectroscopic three-dimensional radiant field.

18. The system of claim 16, wherein the spectroscopic image is two-dimensional, the processor being further configured to generate a plurality of two-dimensional simulated images at different view angles, and to select the simulated plume having a two-dimensional simulated image that most closely matches the spectroscopic image.

19. The system of claim 12, the processor further being configured to select the simulated emission based on an a priori known value of at least one of the N parameters of the actual spacecraft.

20. The system of claim 12, wherein the emission includes a wavelength of approximately 336 nm.

21. The system of claim 20, wherein the atomic or molecular product is nitrogen monohydride.

22. The system of claim 12, wherein the emission is selected from the group consisting of: OH(A→X) electronic emission resulting from interaction between atmospheric gas and an atomic or molecular species in the plume, plume CO vibrational infrared emission excited by collisions with atmospheric atomic oxygen, CO(a→X) Cameron band ultraviolet emission resulting from a two-step interaction of plume methane with atmospheric atomic oxygen, plume $H_2O$ vibrational bend mode infrared emission excited by collisions with the atmospheric gas, and plume $H_2O$ asymmetric stretch mode infrared emission excited by collisions with the atmospheric gas.

* * * * *